Figure 1A:
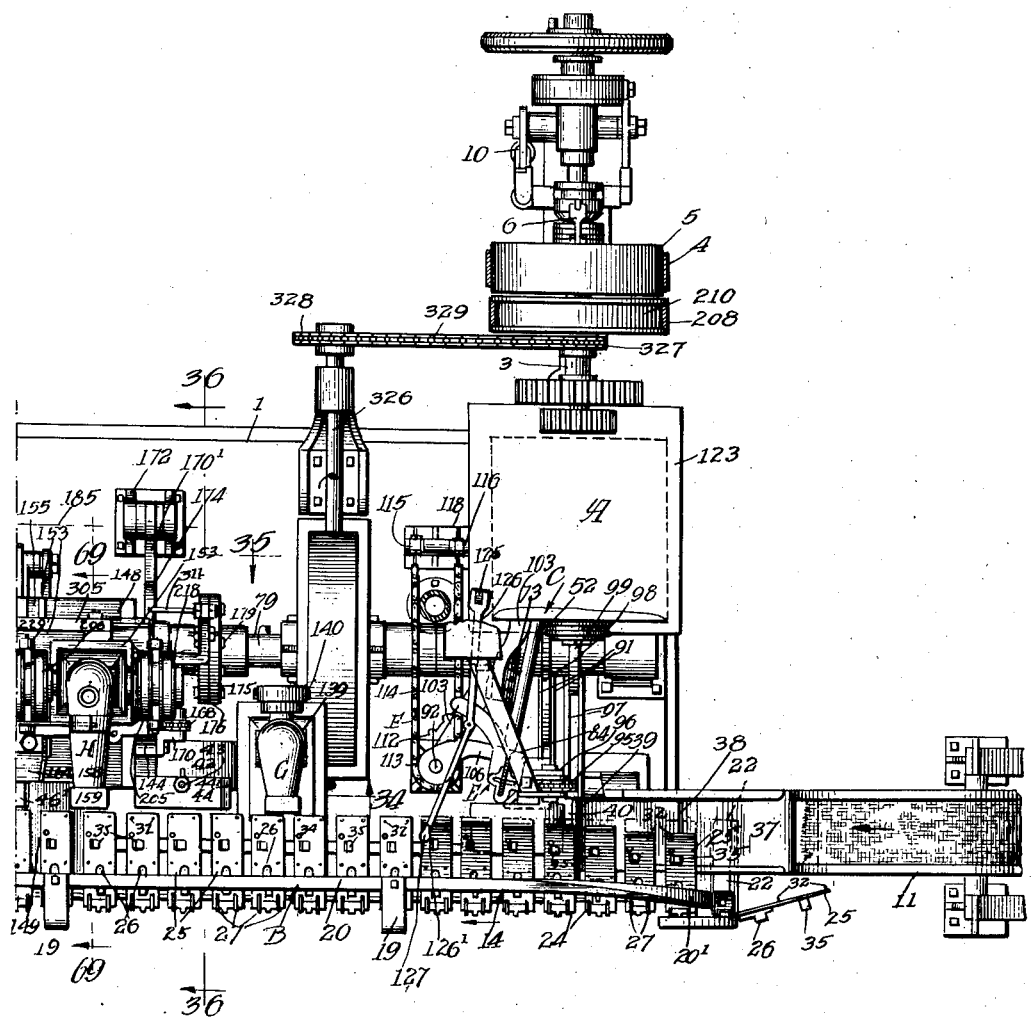

July 14, 1931. J. F. GAIL 1,813,993
MACHINE FOR AND METHOD OF ASSEMBLING SPRINGS
Original Filed Feb. 26, 1926 47 Sheets-Sheet 1
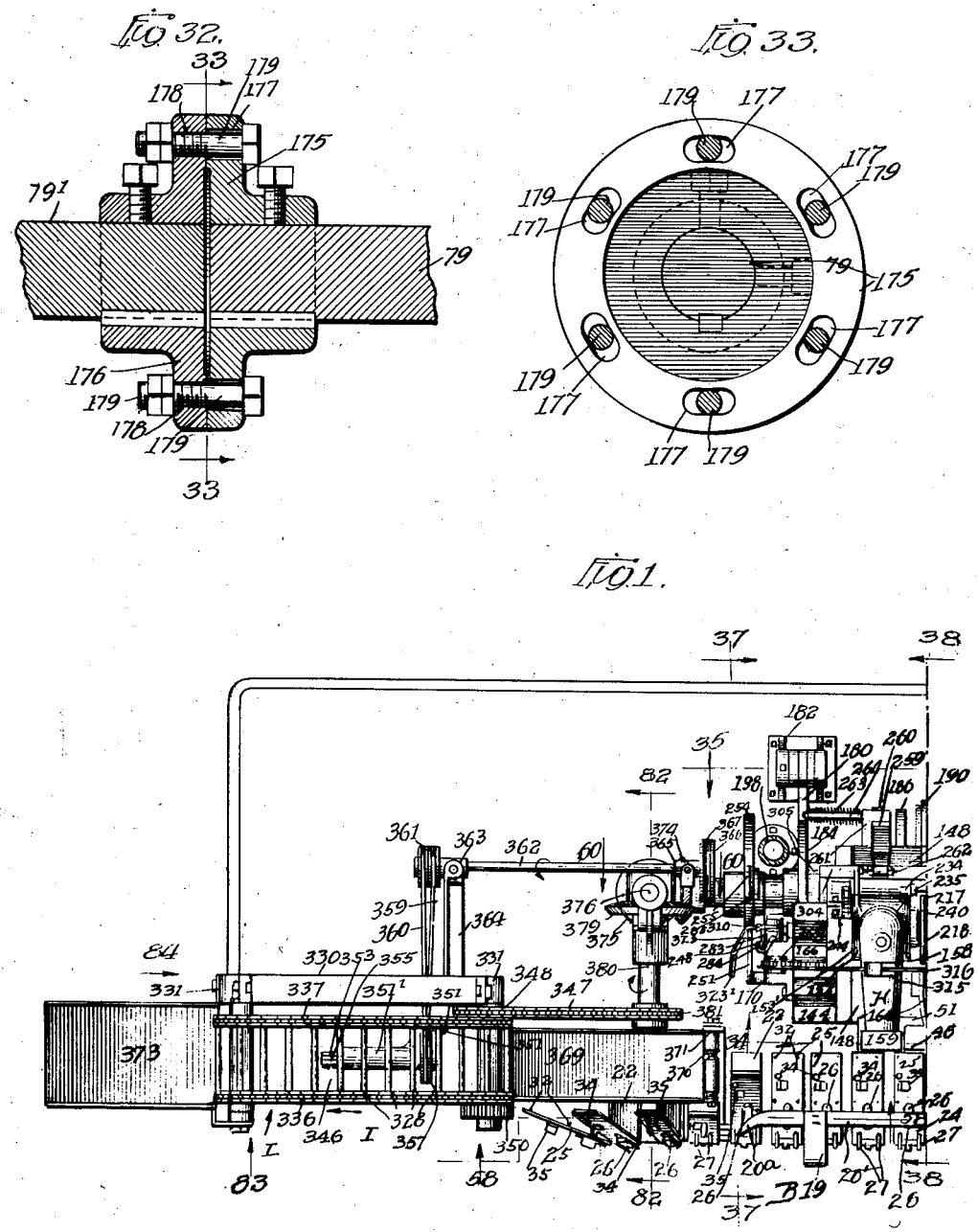

July 14, 1931.     J. F. GAIL     1,813,993
MACHINE FOR AND METHOD OF ASSEMBLING SPRINGS
Original Filed Feb. 26, 1926     47 Sheets-Sheet 2

July 14, 1931. J. F. GAIL 1,813,993
MACHINE FOR AND METHOD OF ASSEMBLING SPRINGS
Original Filed Feb. 26, 1926 47 Sheets-Sheet 3
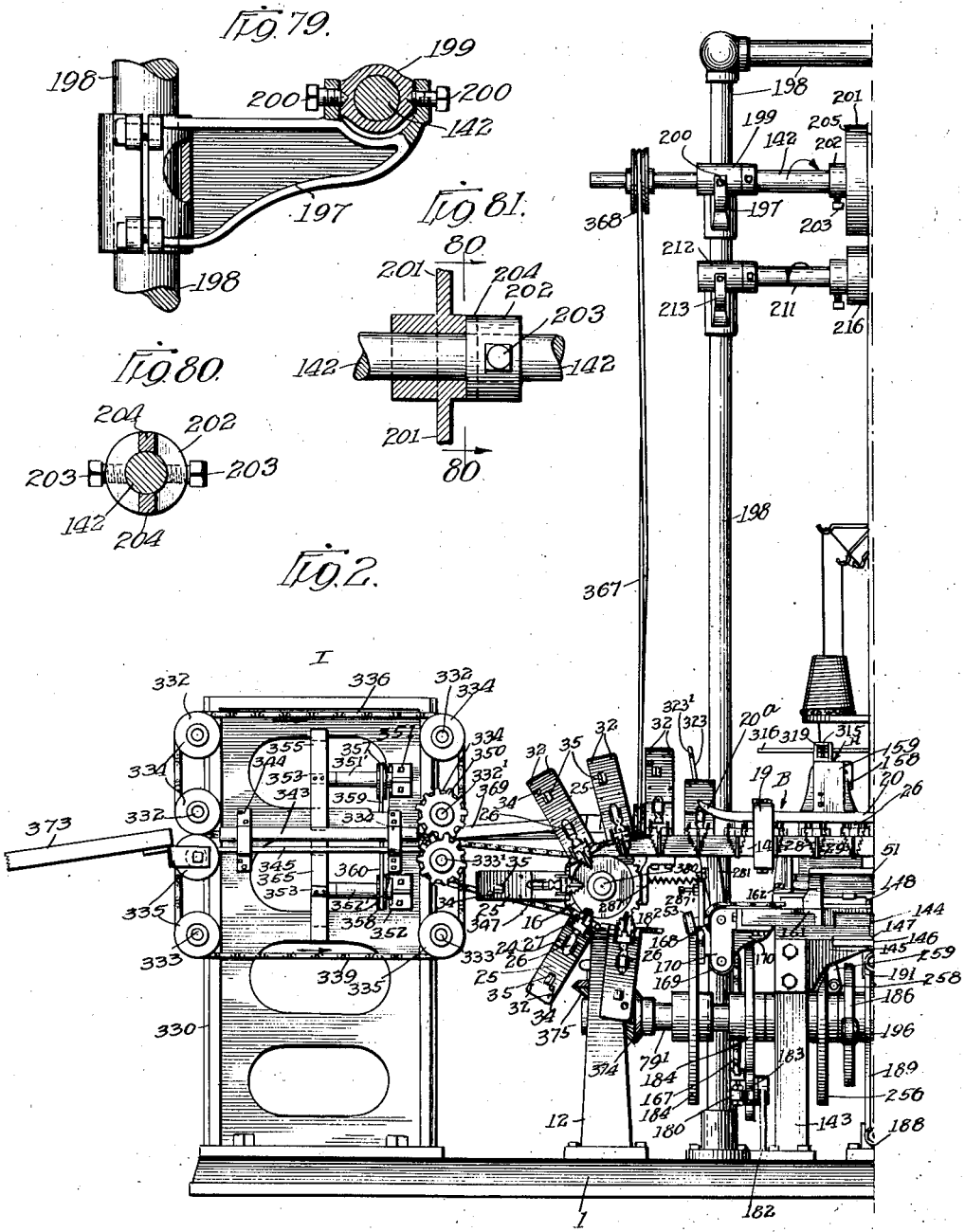

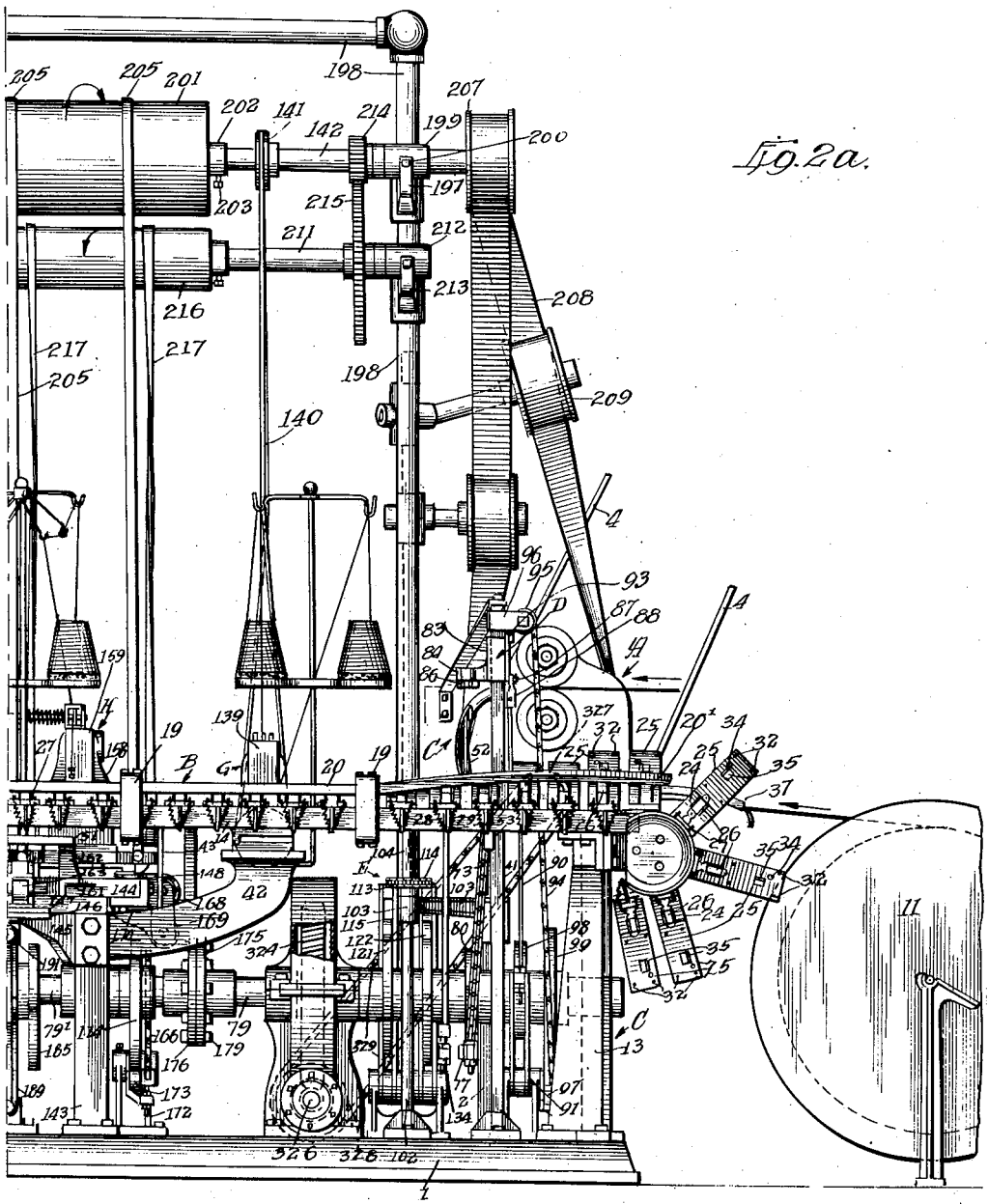

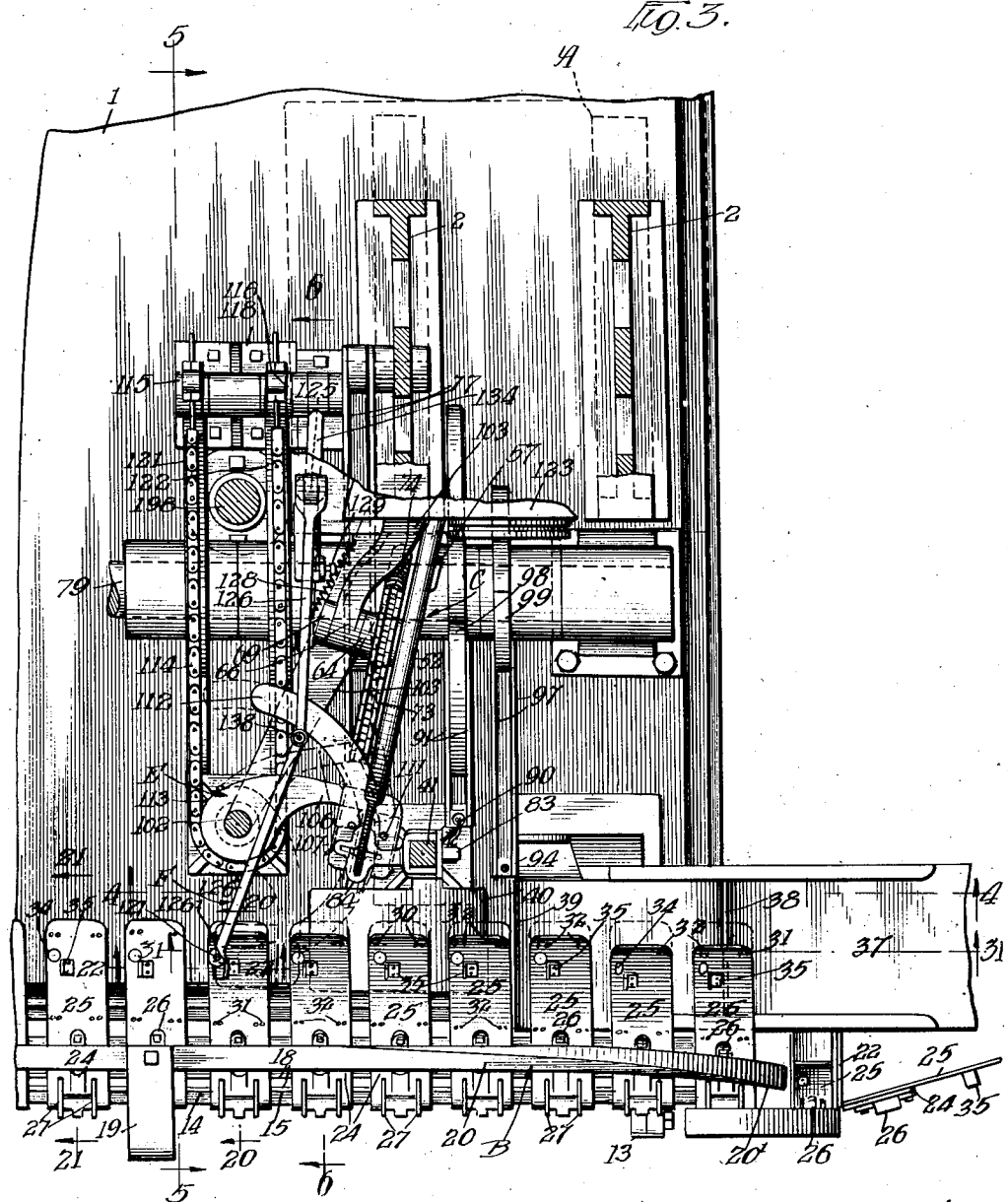

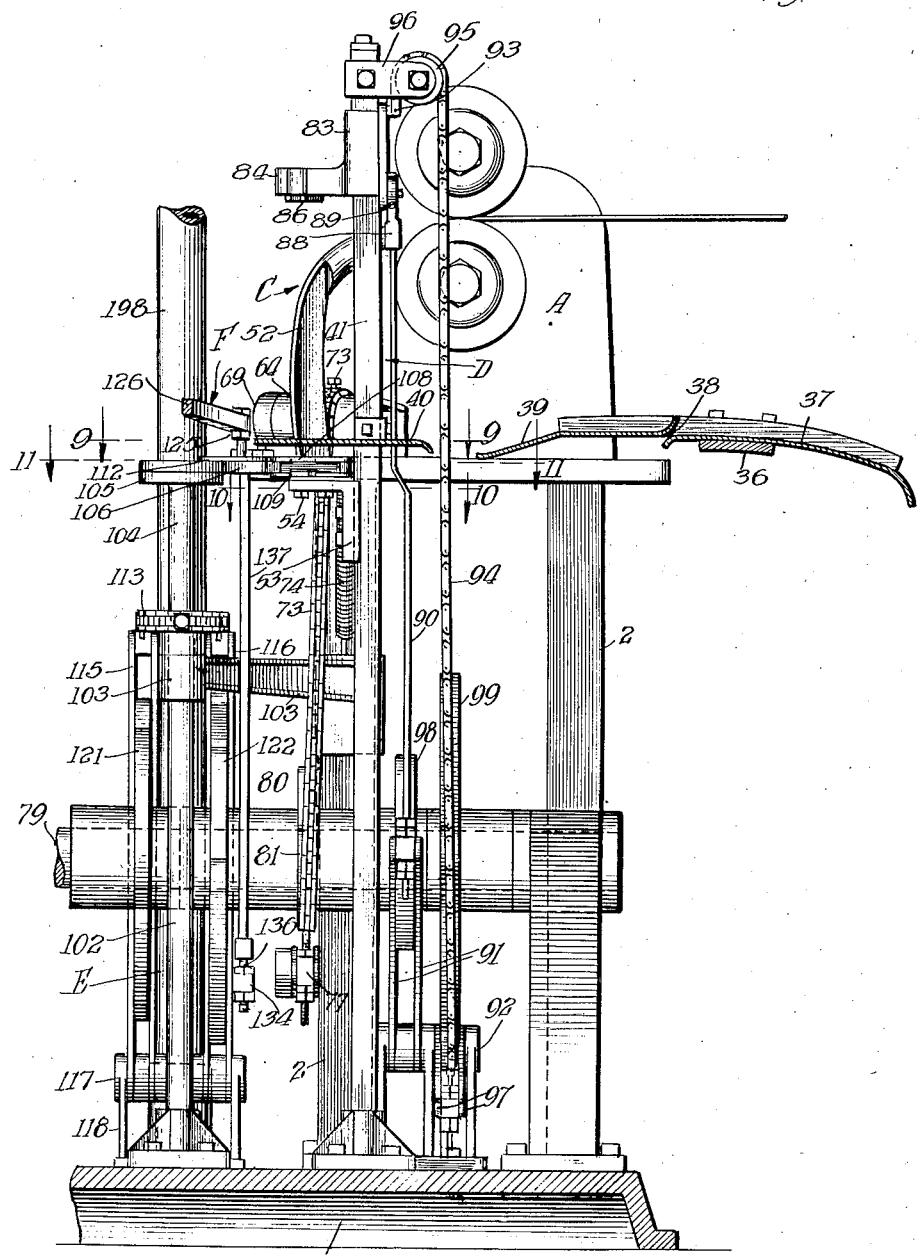

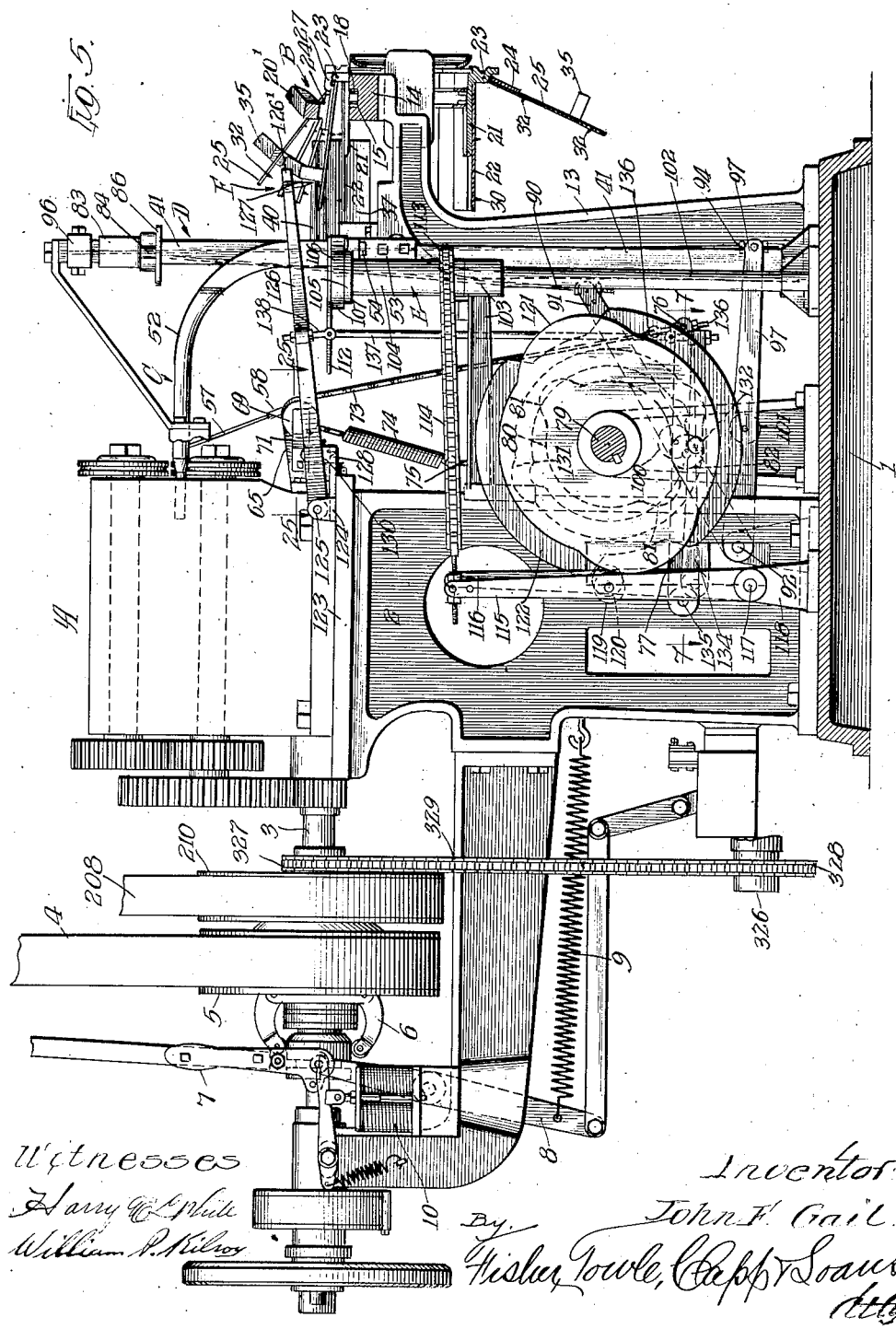

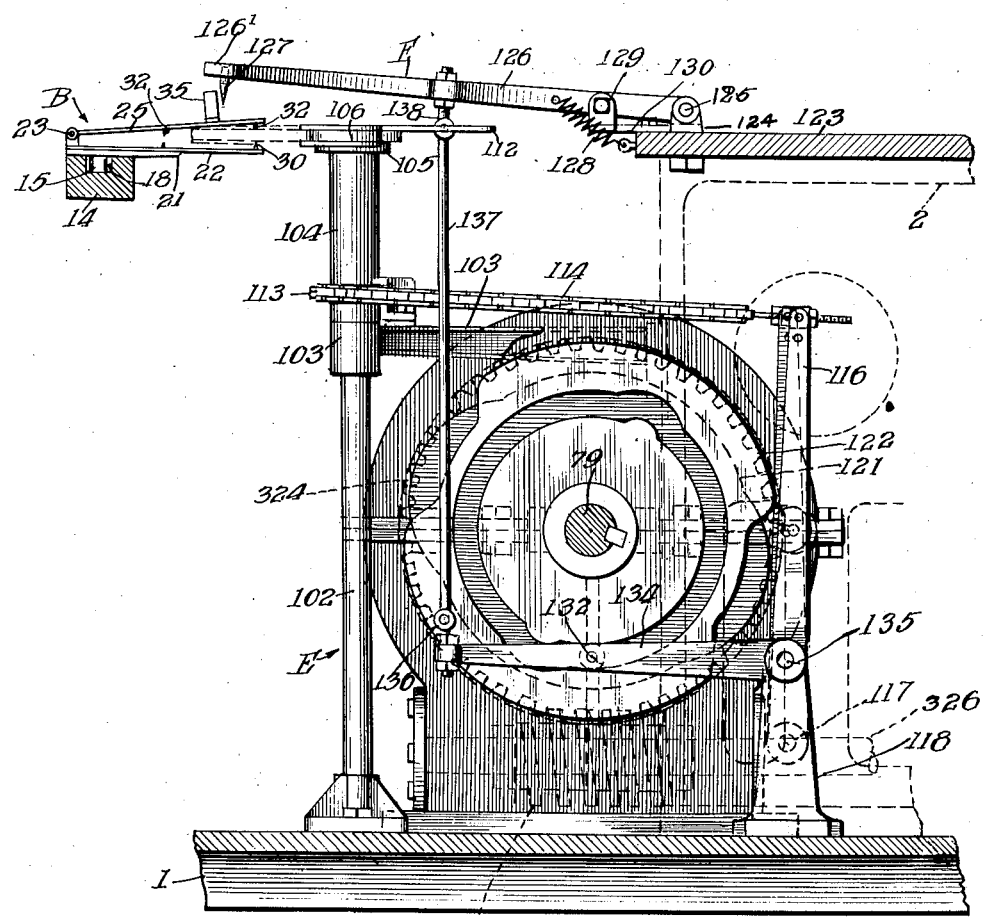

July 14, 1931.   J. F. GAIL   1,813,993
MACHINE FOR AND METHOD OF ASSEMBLING SPRINGS
Original Filed Feb. 26, 1926   47 Sheets-Sheet 9
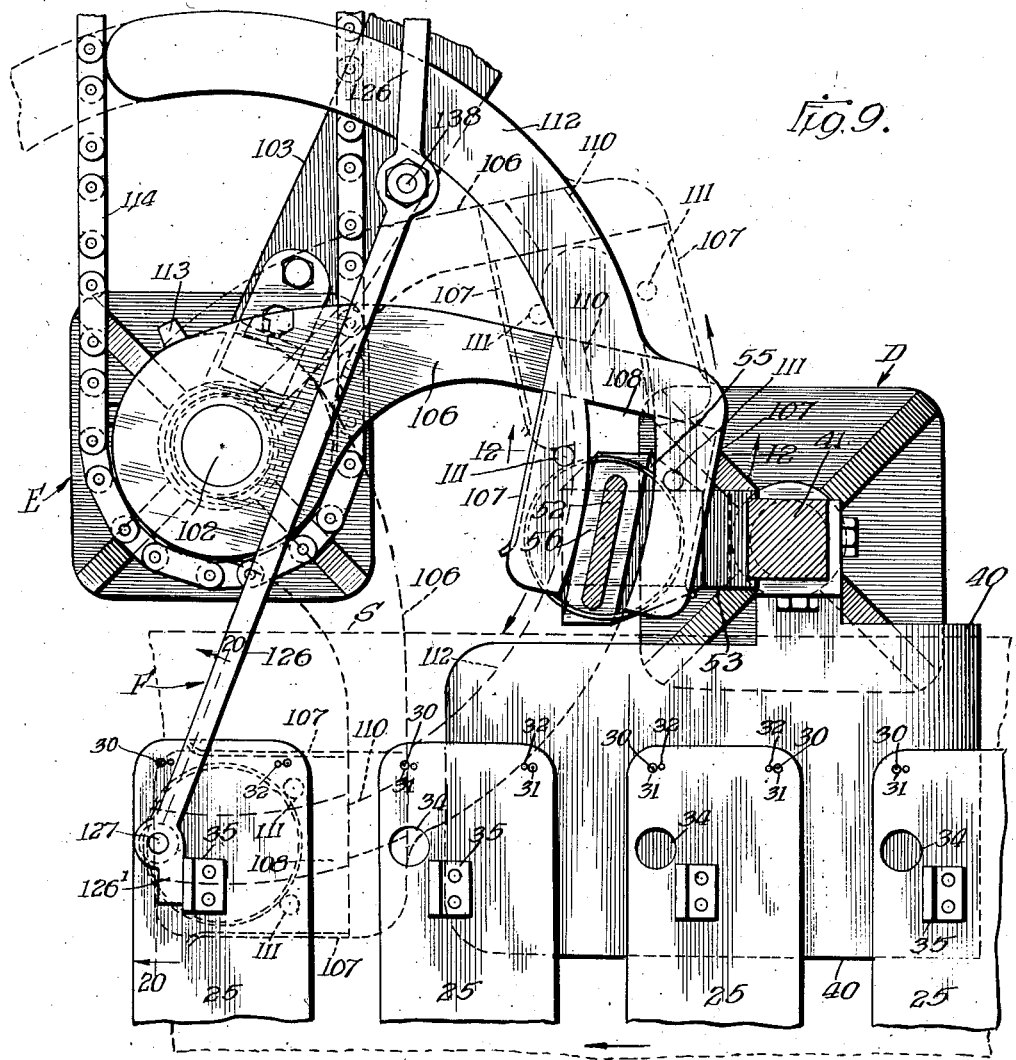
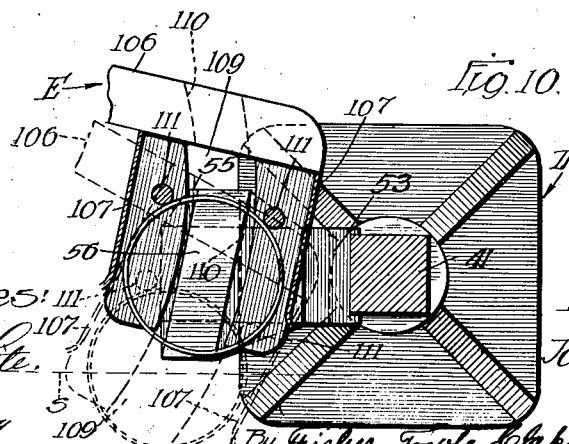

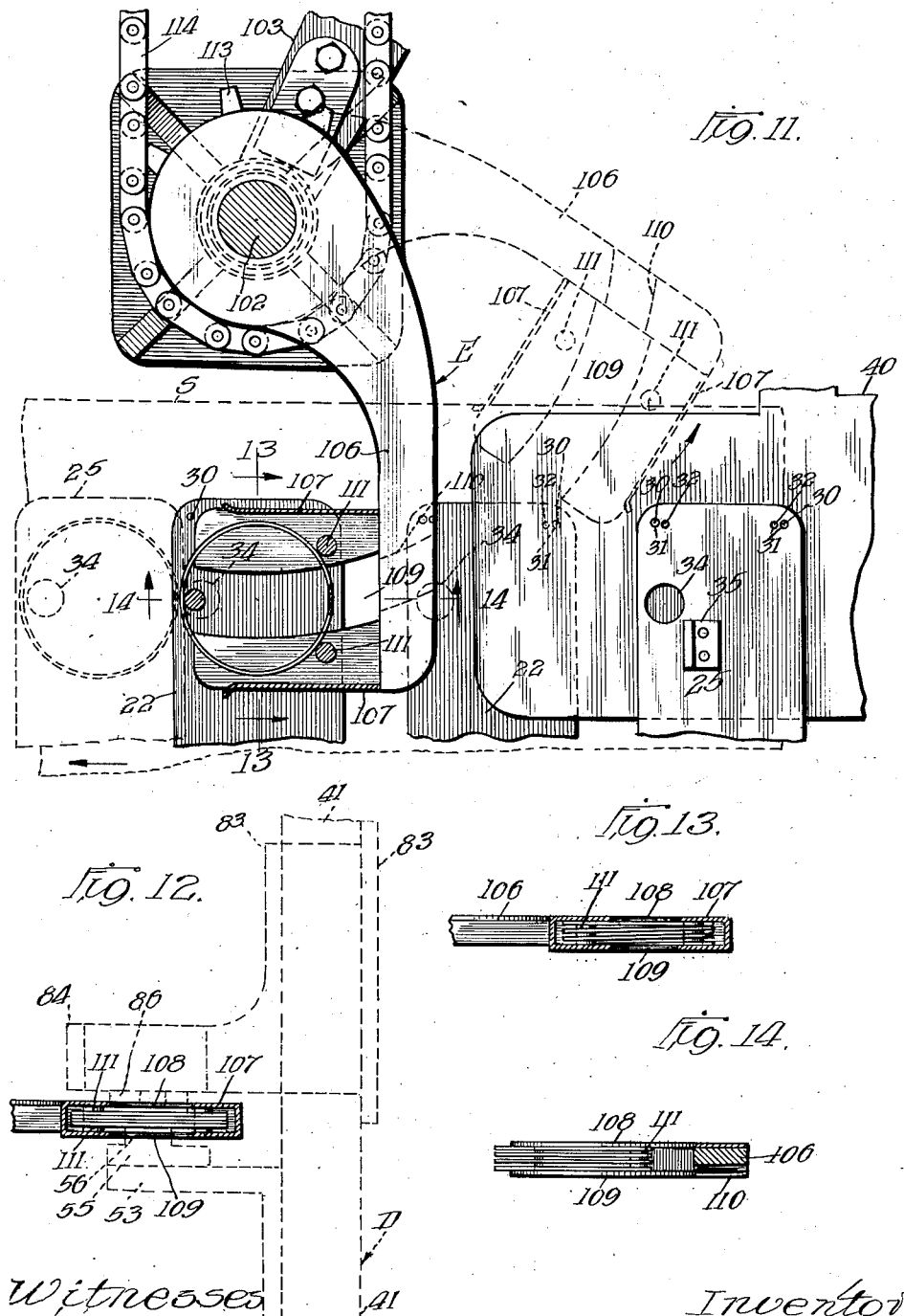

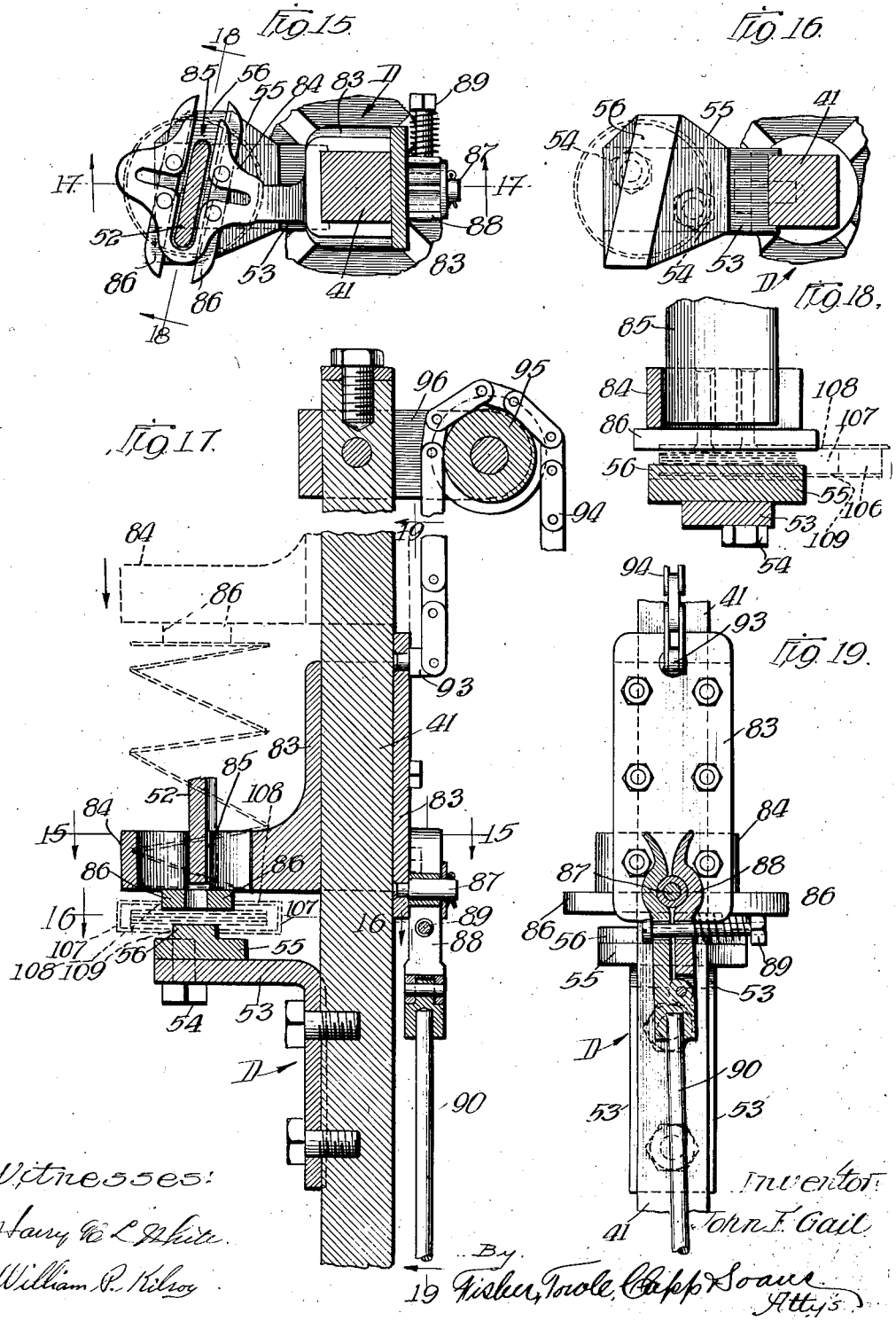

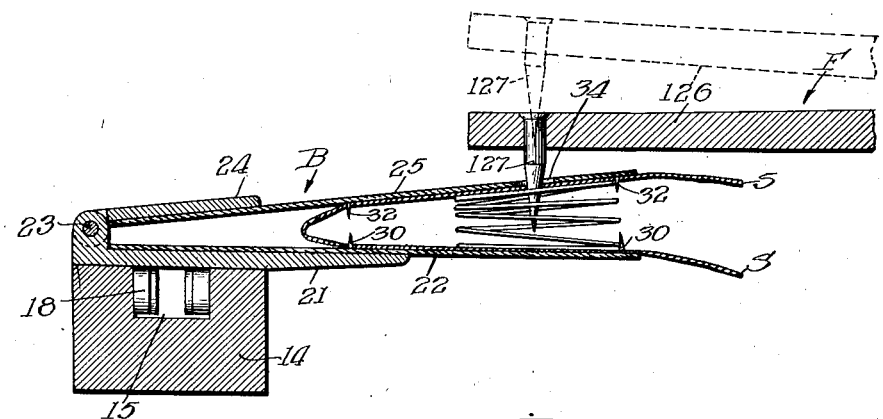
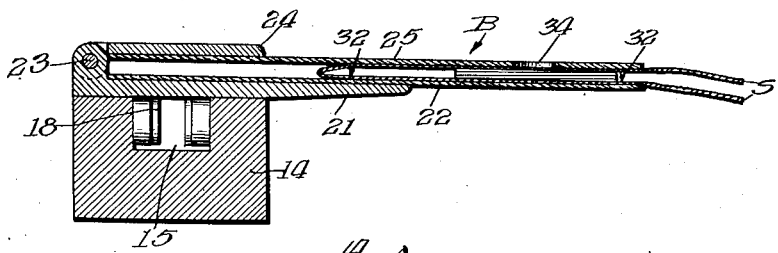
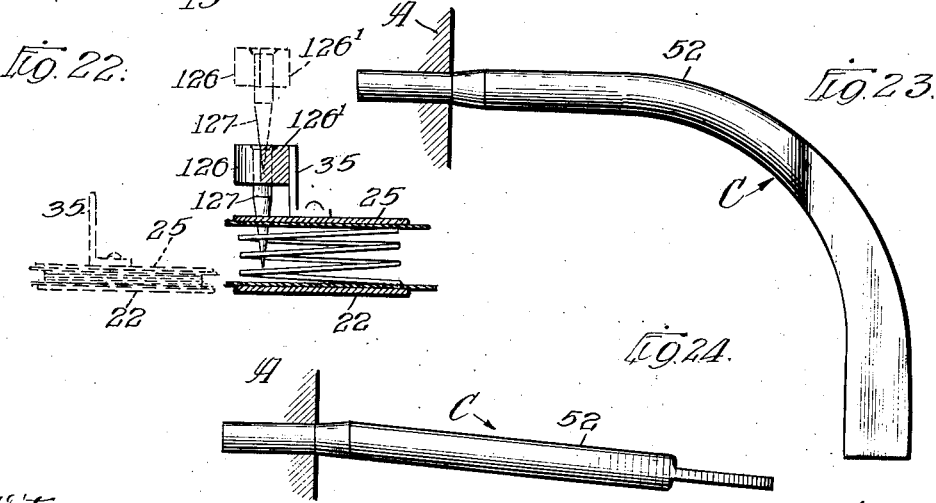

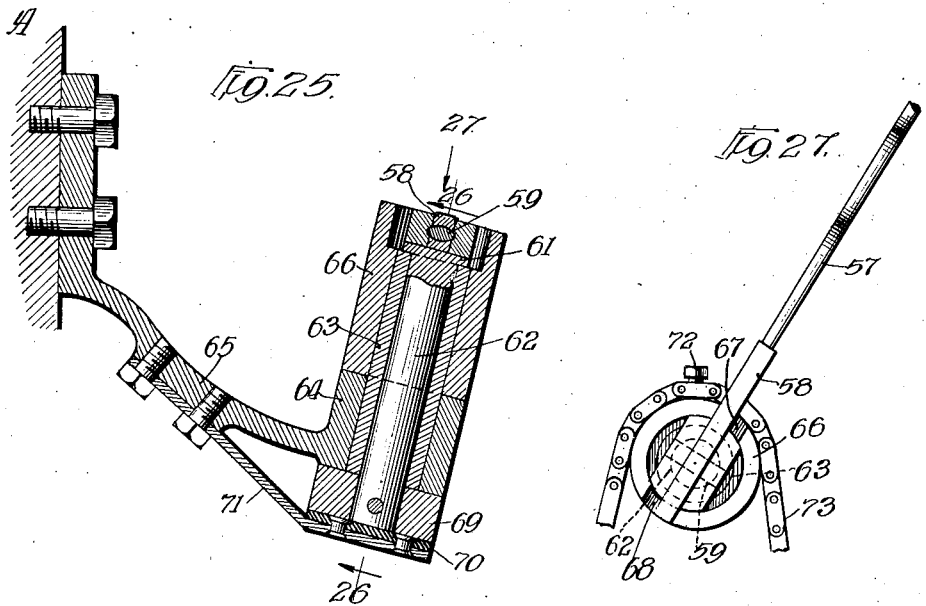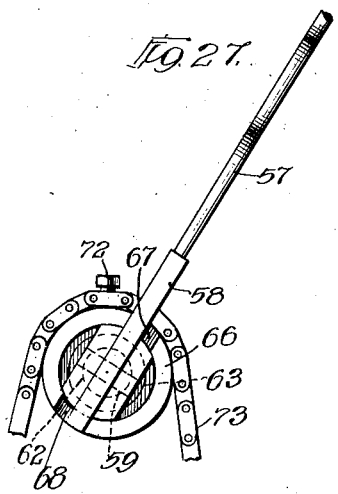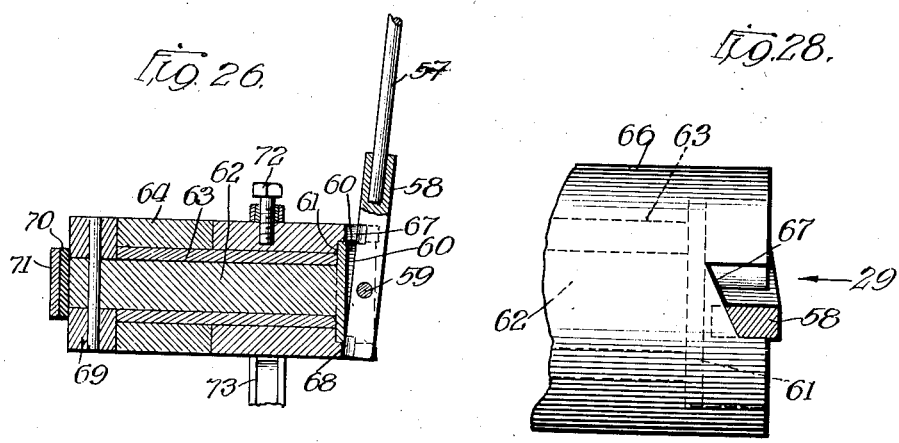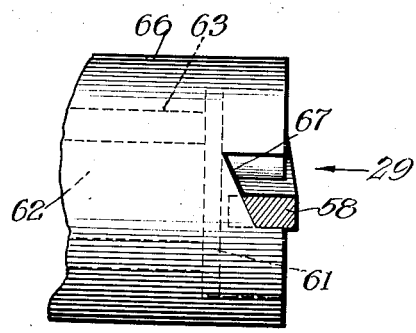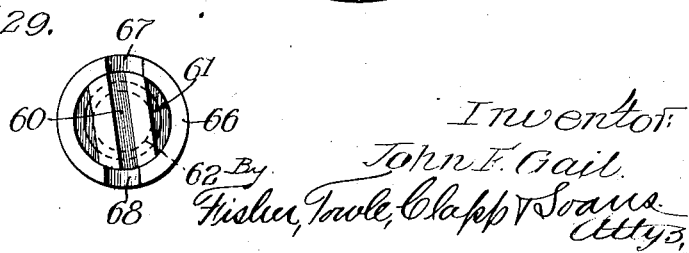

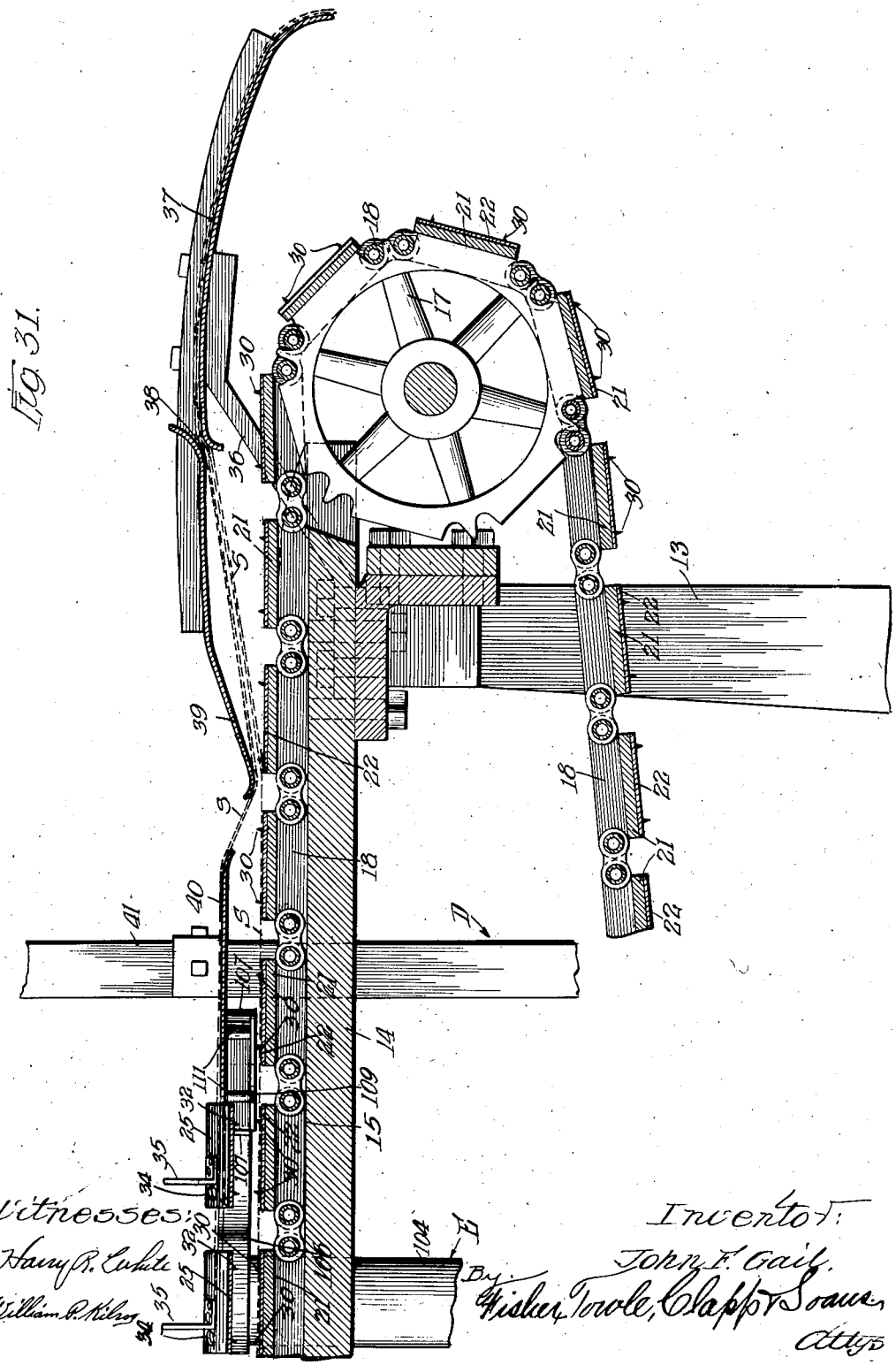

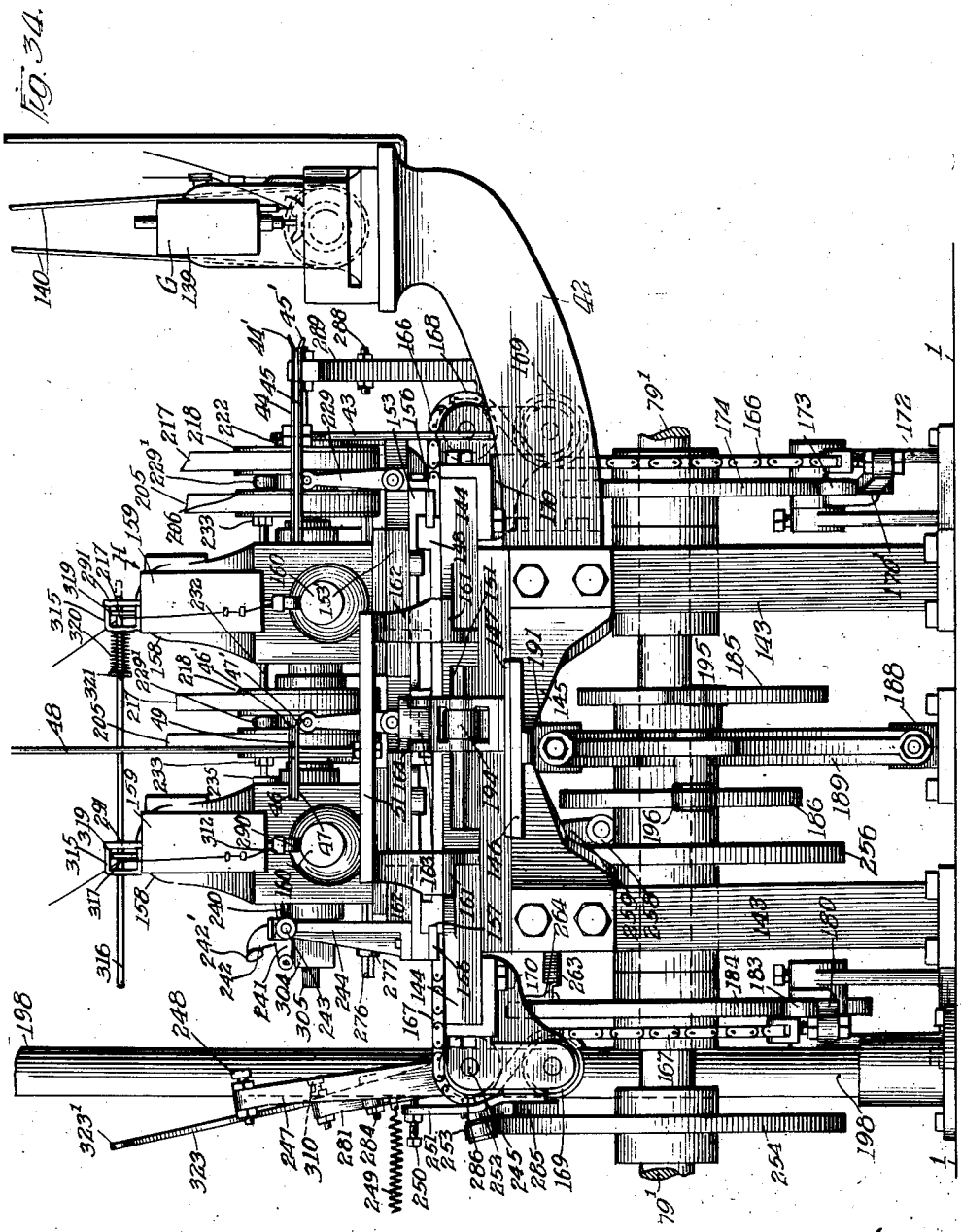

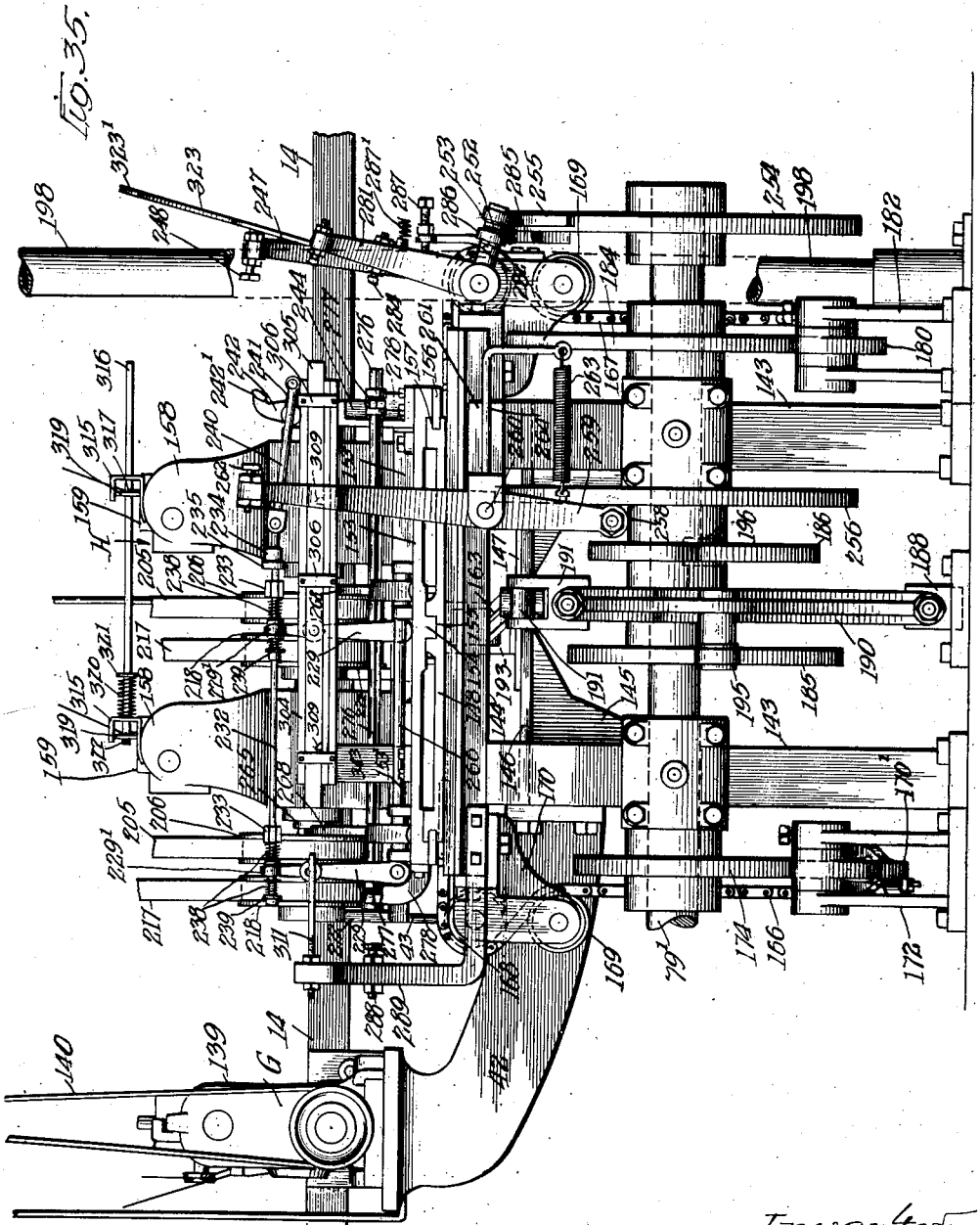

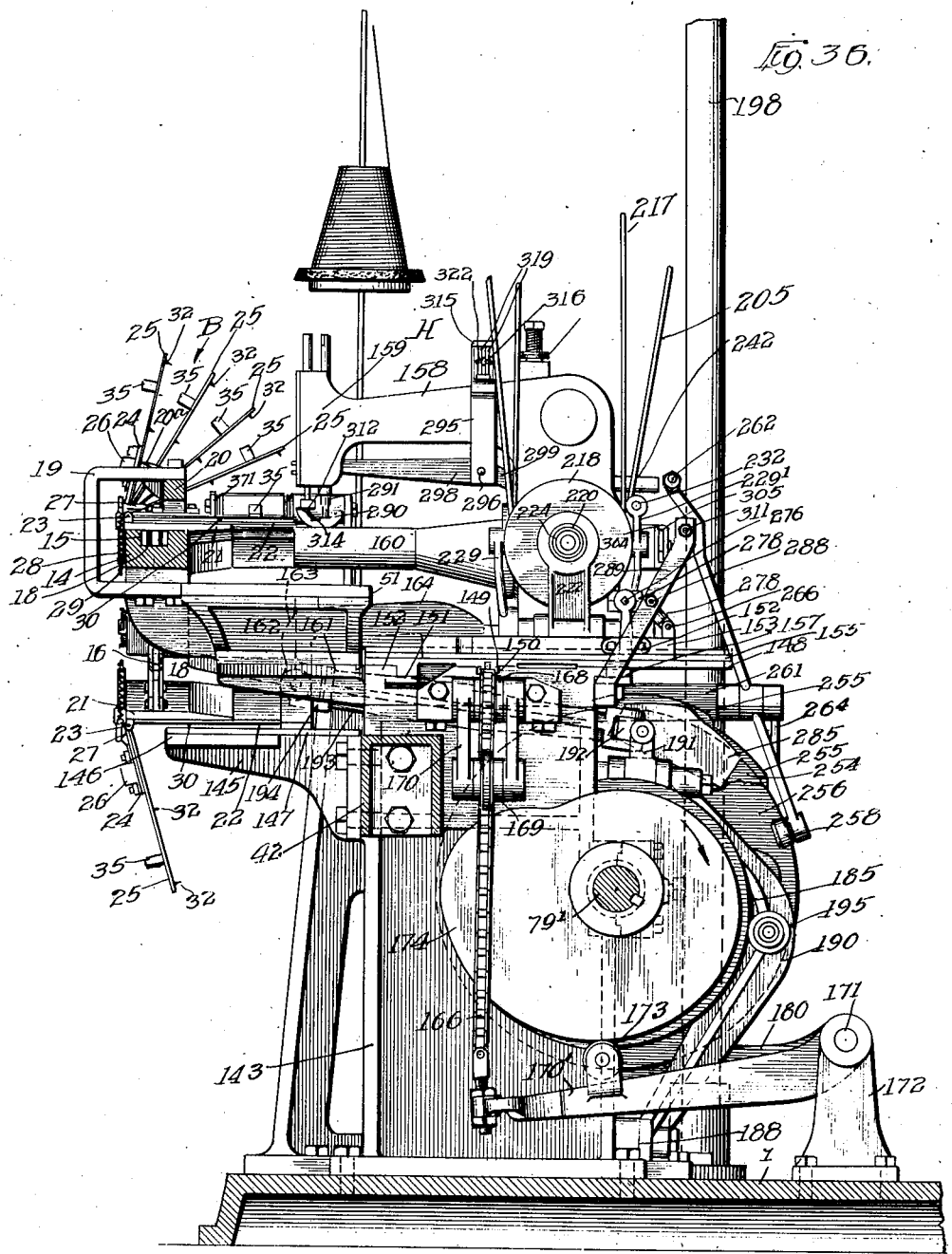

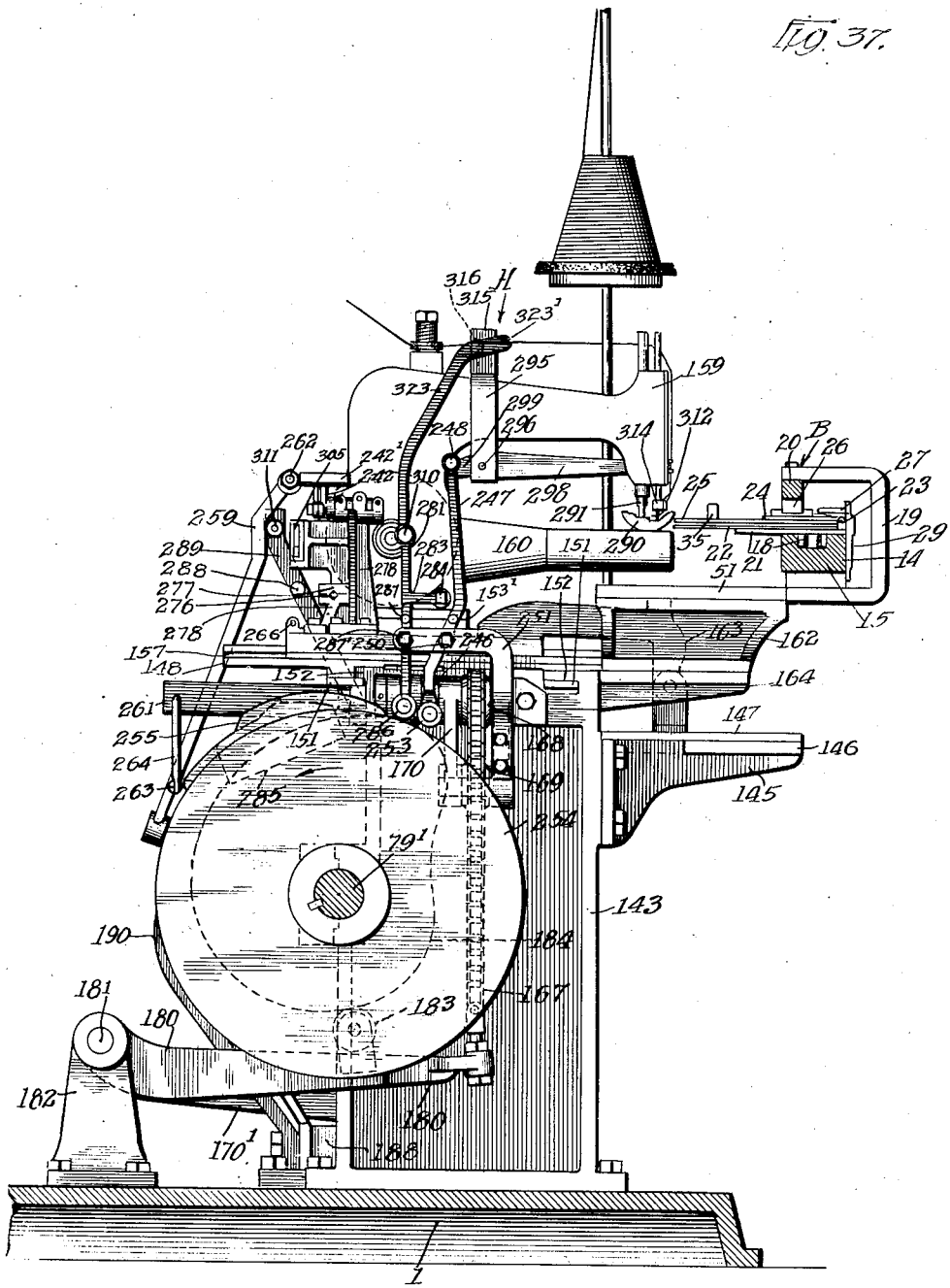

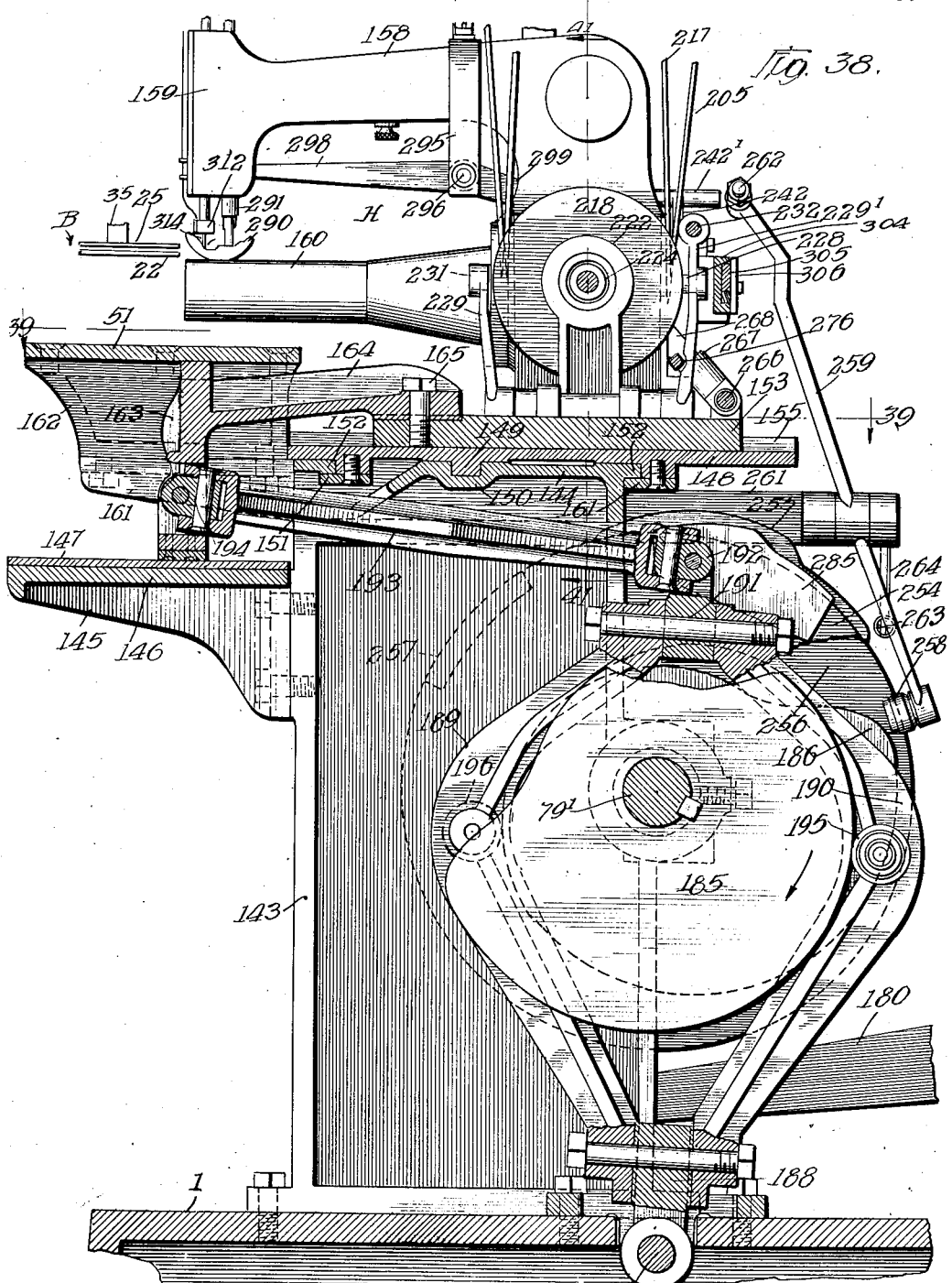

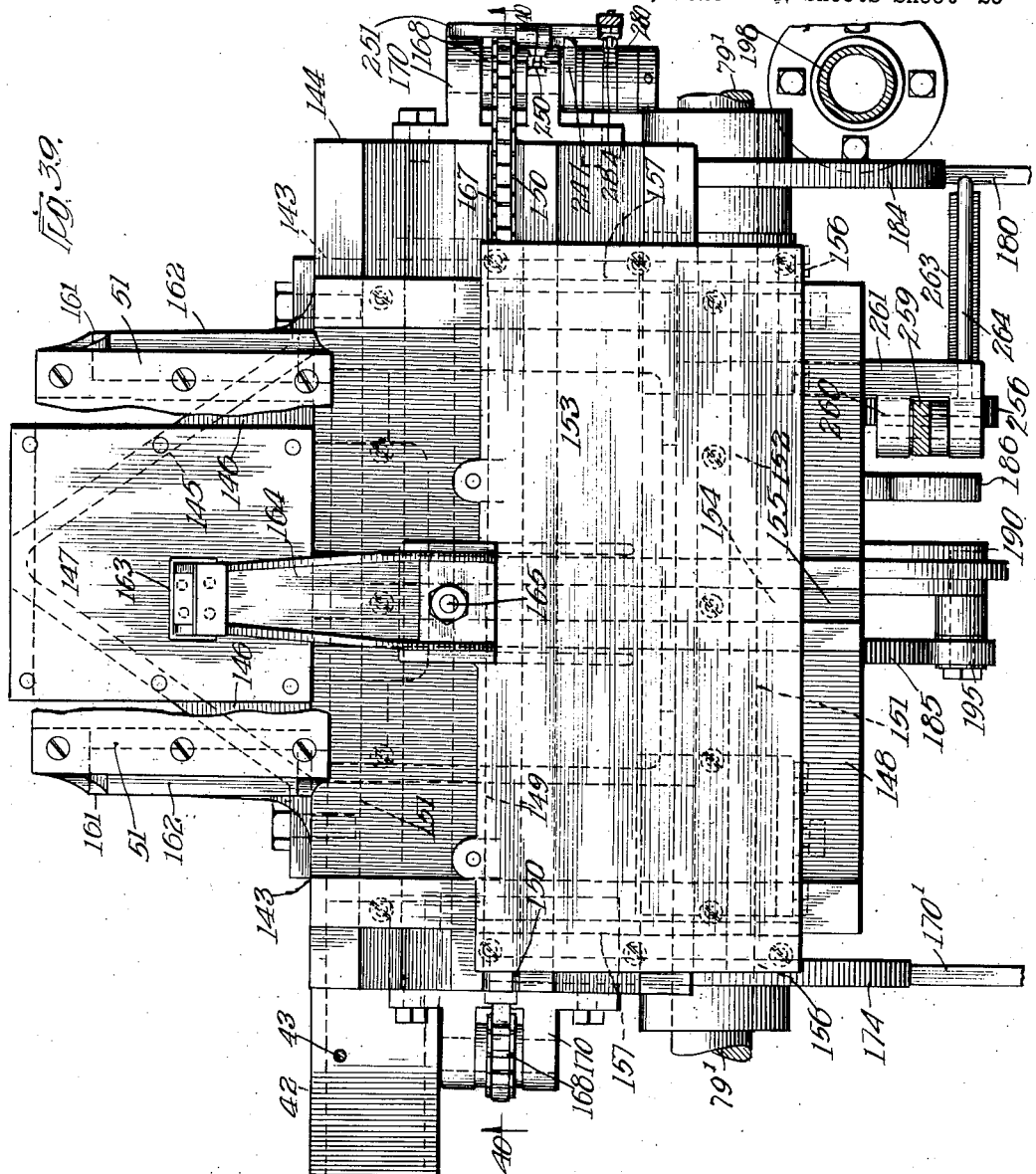

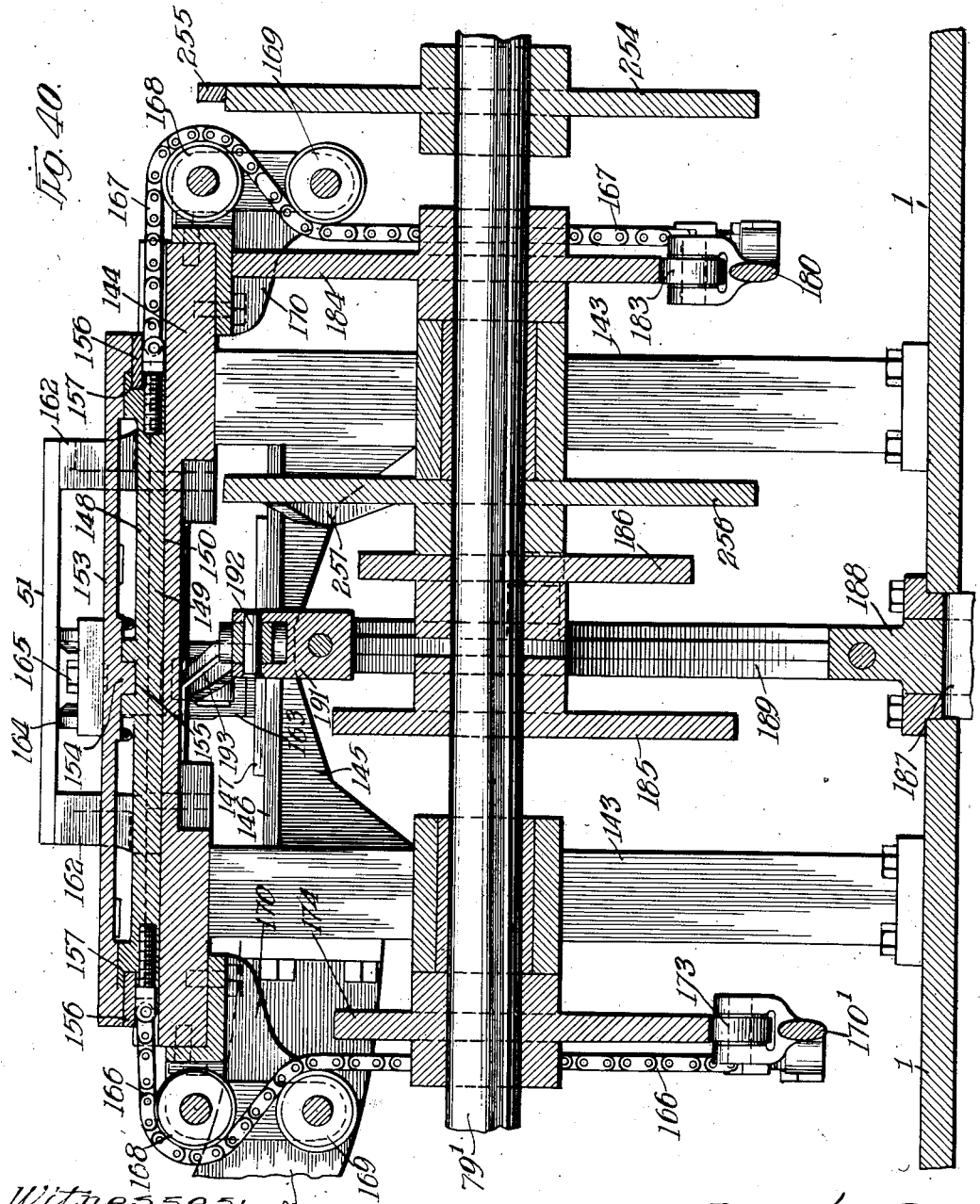

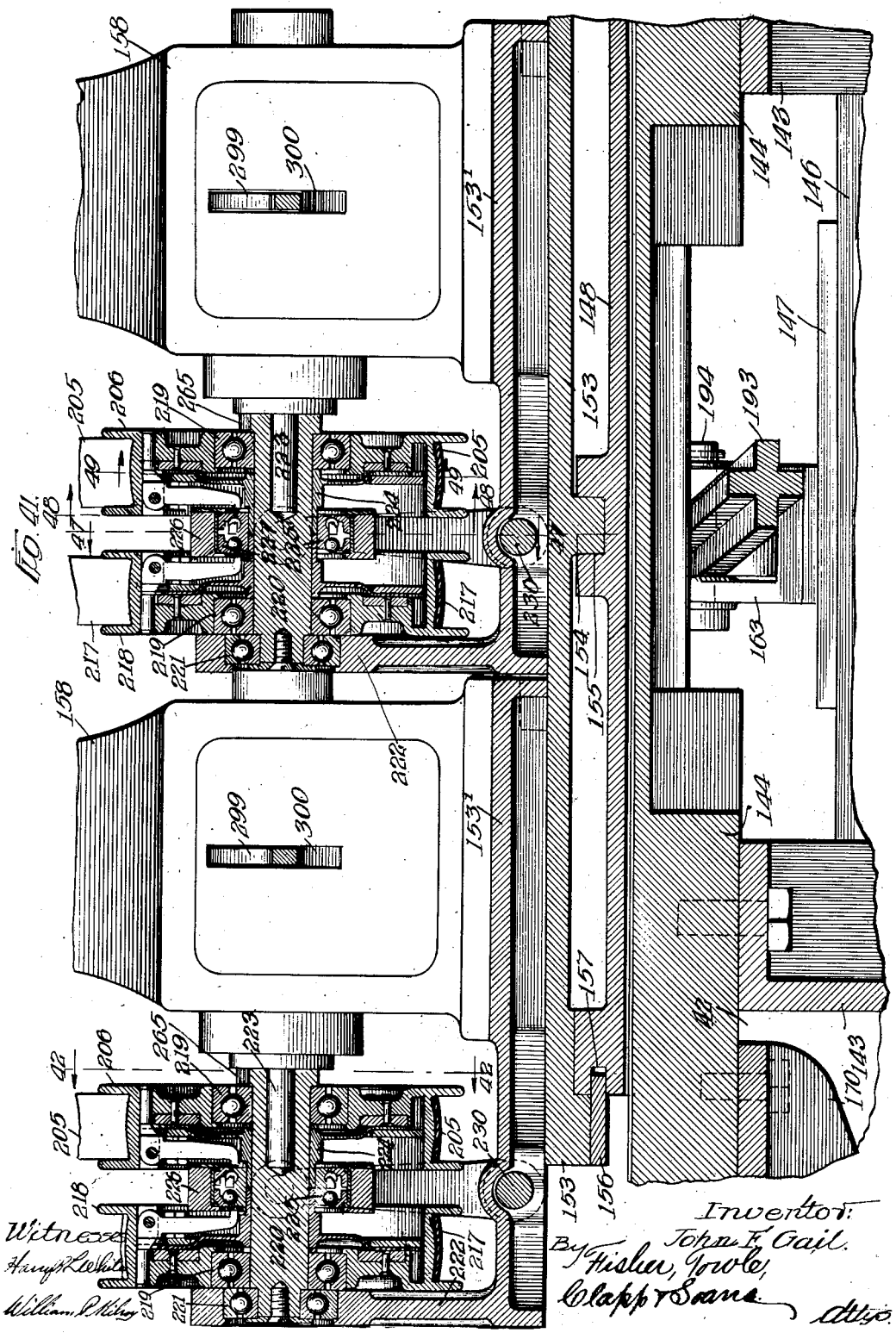

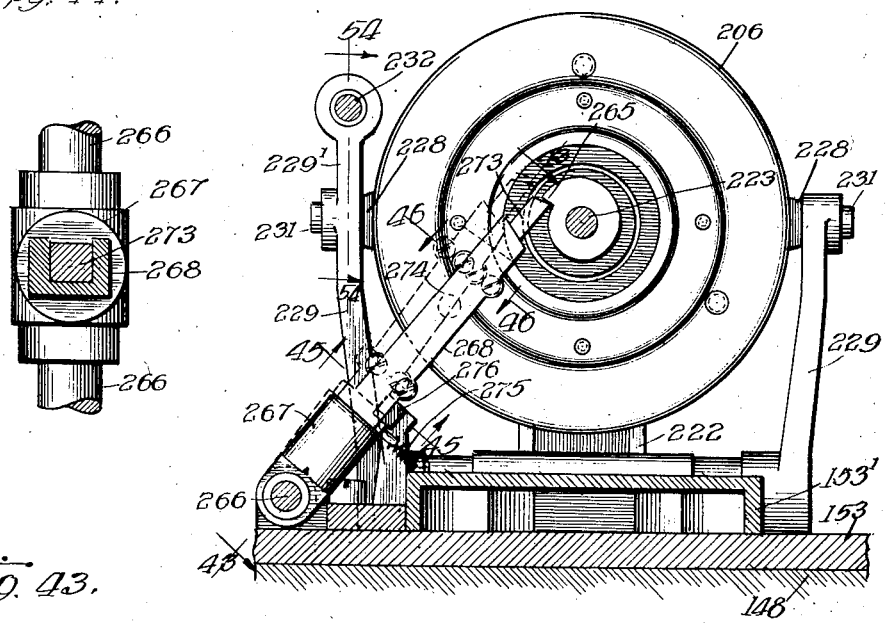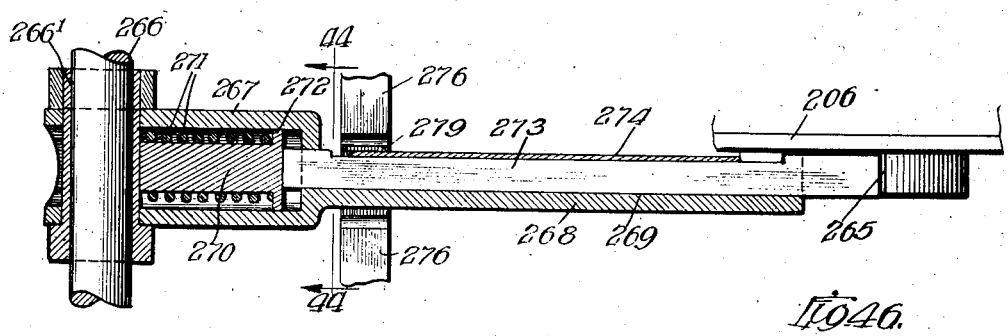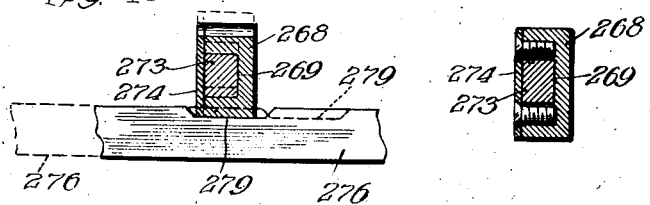

July 14, 1931. J. F. GAIL 1,813,993
MACHINE FOR AND METHOD OF ASSEMBLING SPRINGS
Original Filed Feb. 26, 1926 47 Sheets-Sheet 24
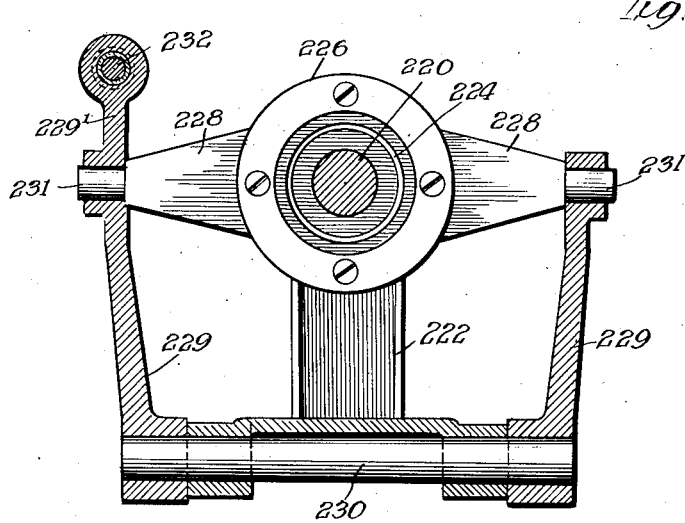
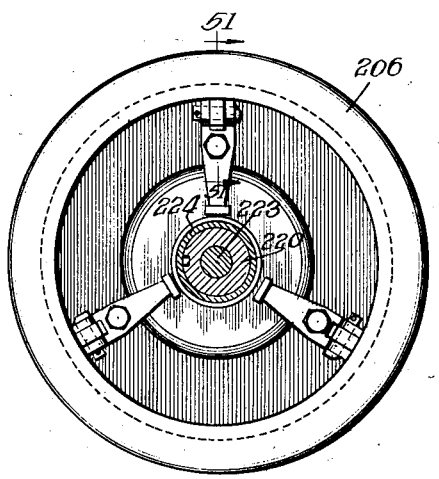
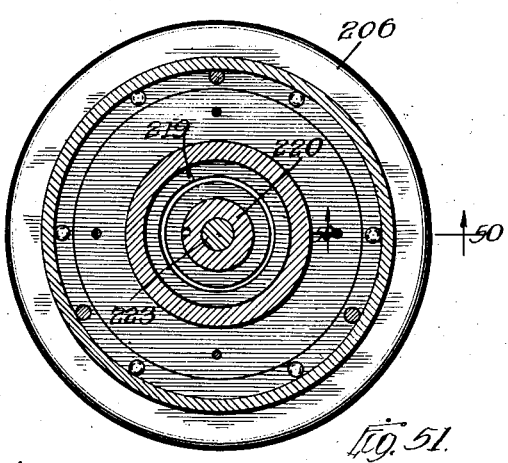
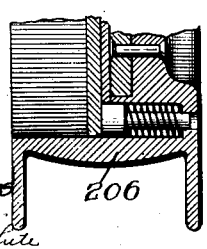
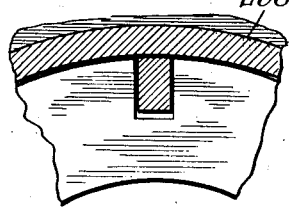
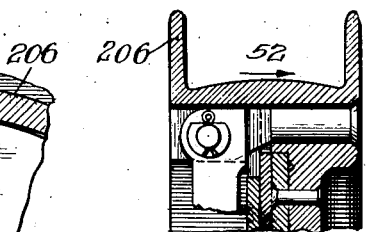

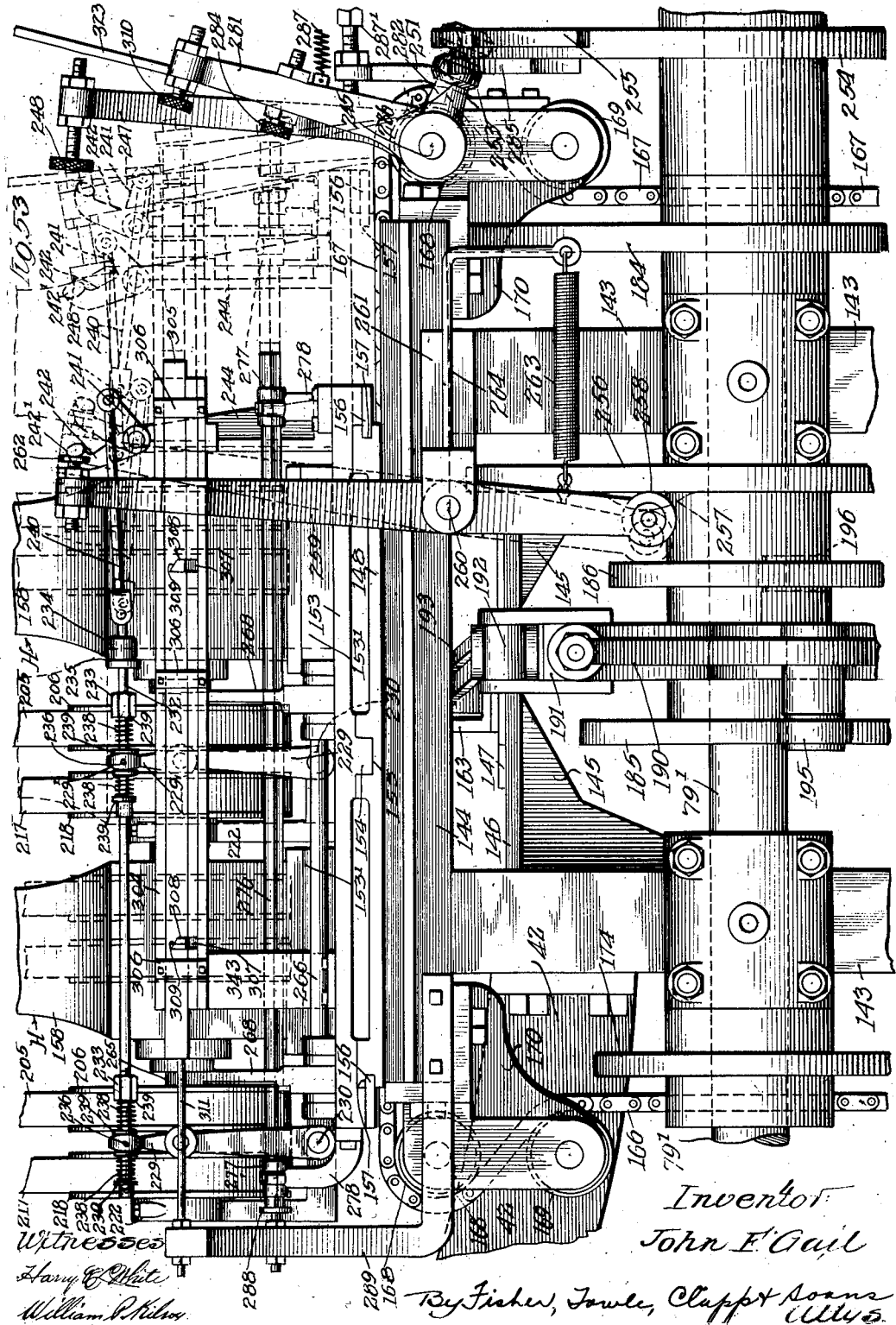

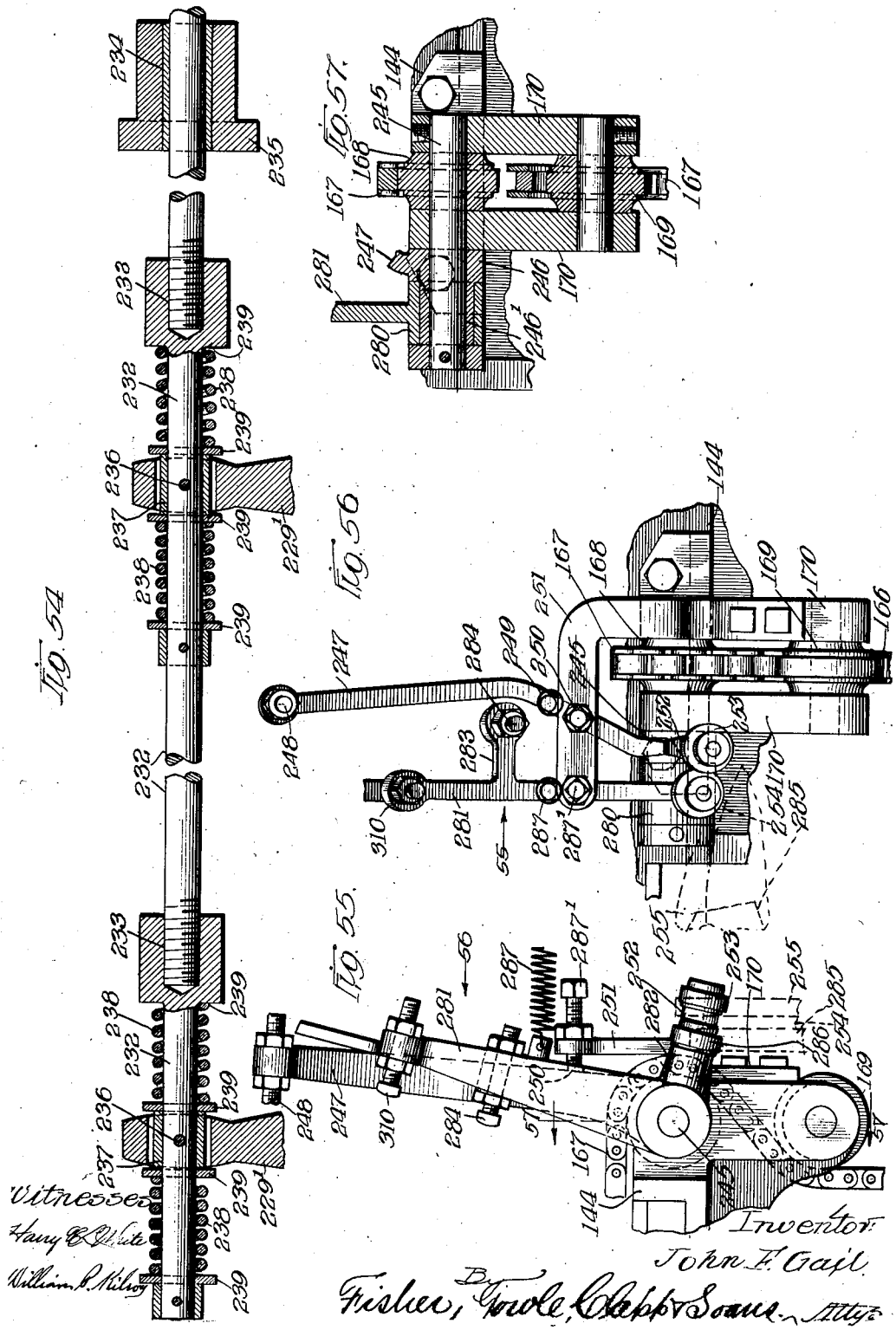

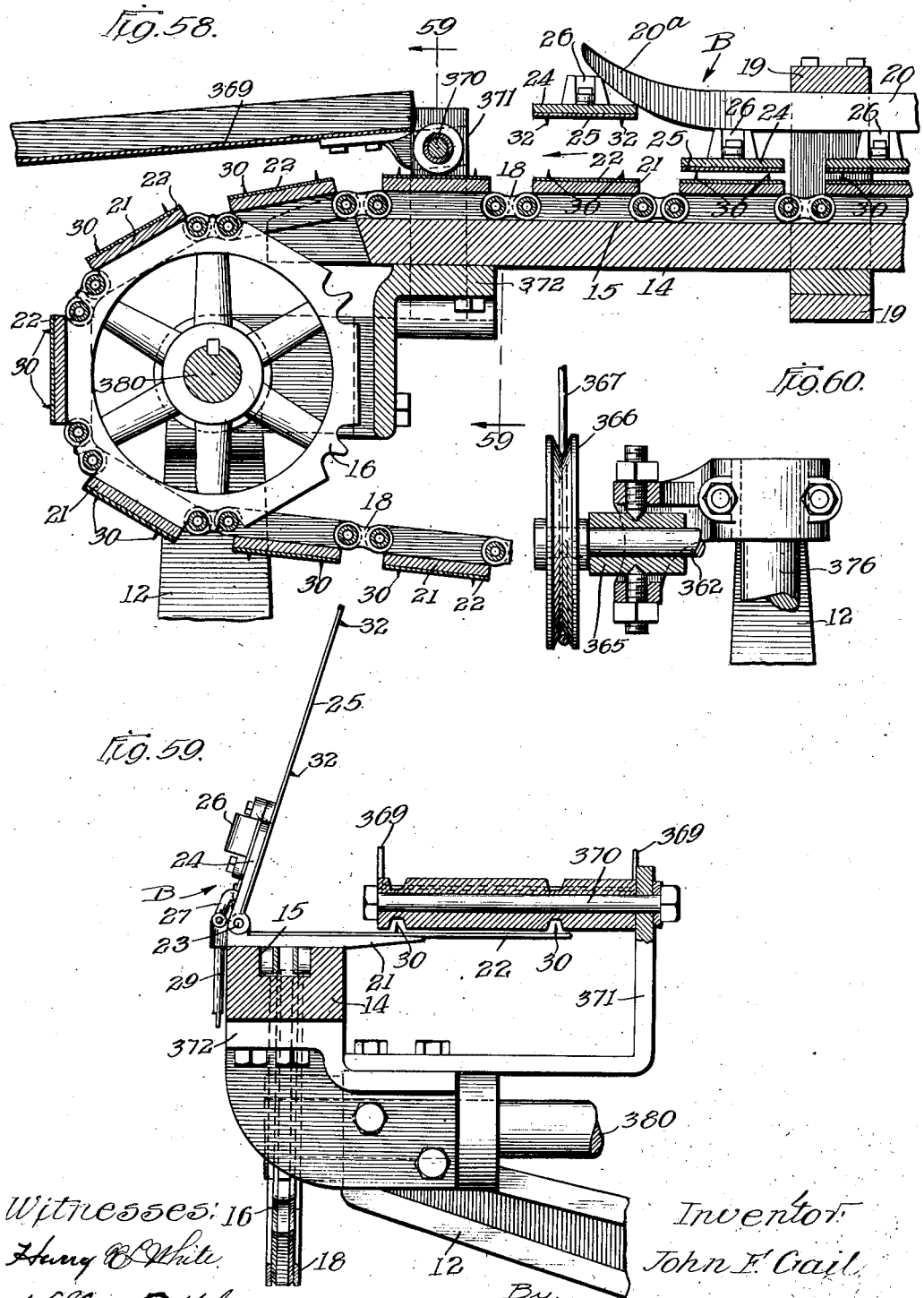

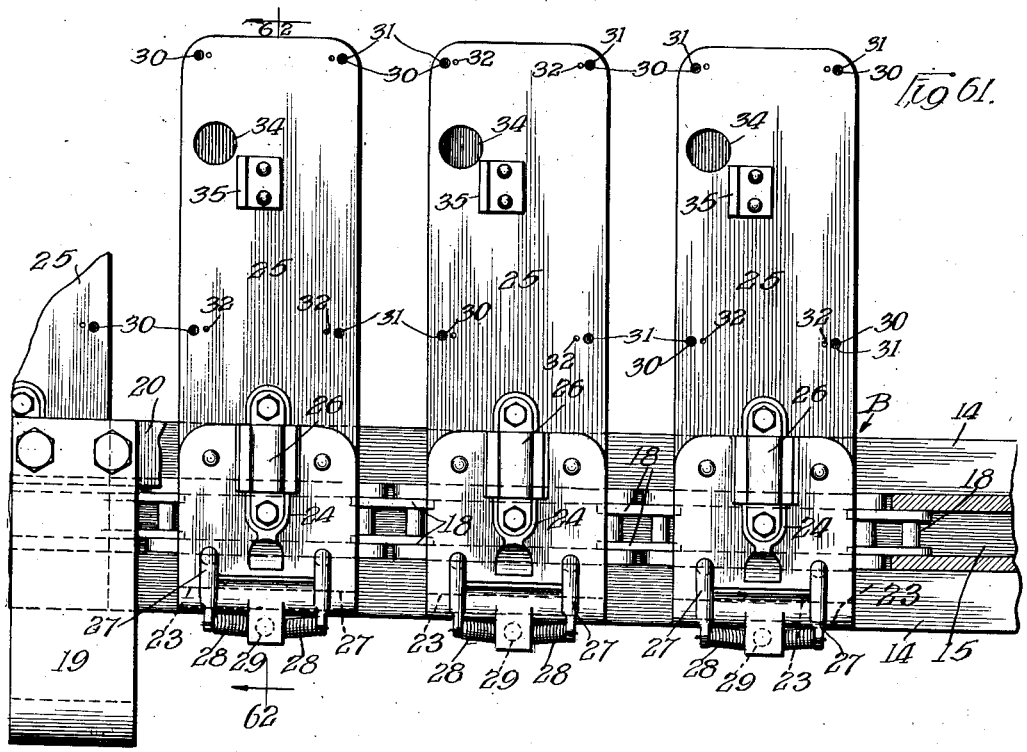
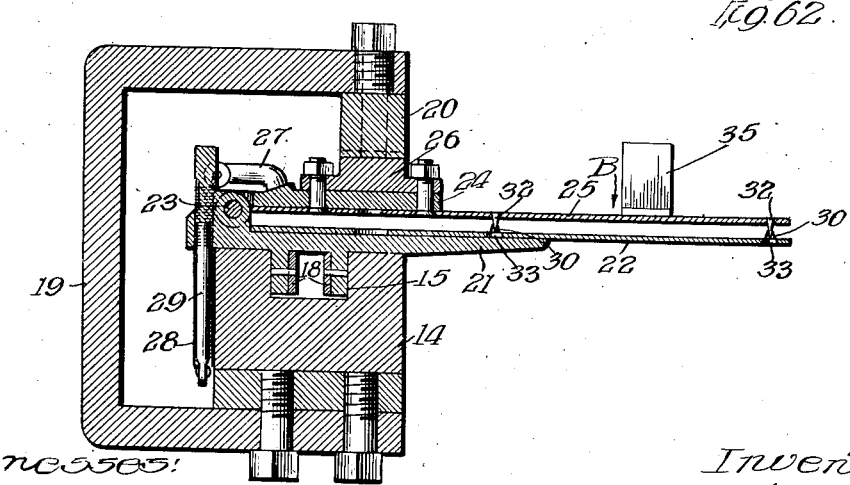

July 14, 1931. J. F. GAIL 1,813,993
MACHINE FOR AND METHOD OF ASSEMBLING SPRINGS
Original Filed Feb. 26, 1926 47 Sheets-Sheet 29
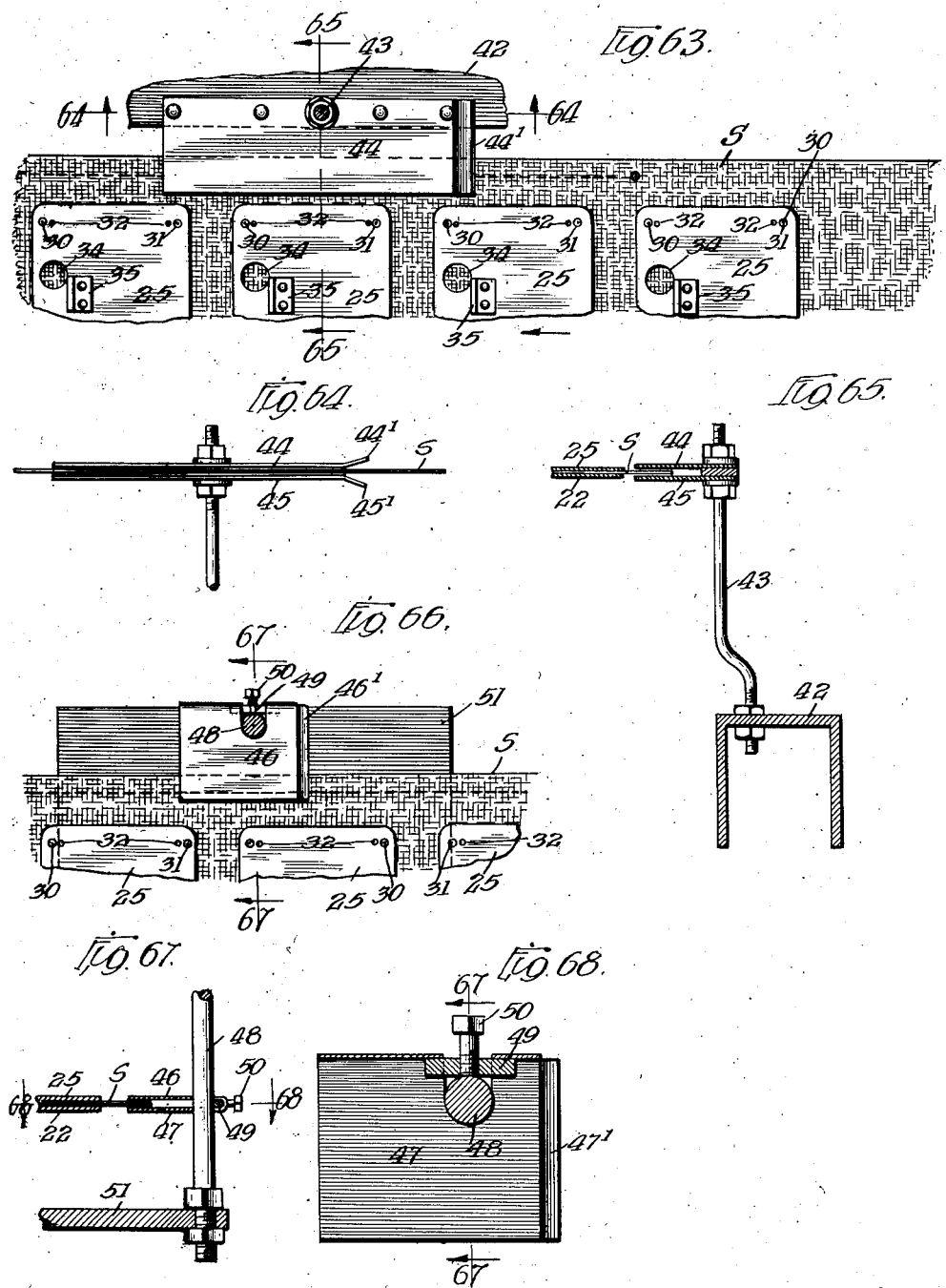

July 14, 1931.  J. F. GAIL  1,813,993
MACHINE FOR AND METHOD OF ASSEMBLING SPRINGS
Original Filed Feb. 26, 1926  47 Sheets-Sheet 30
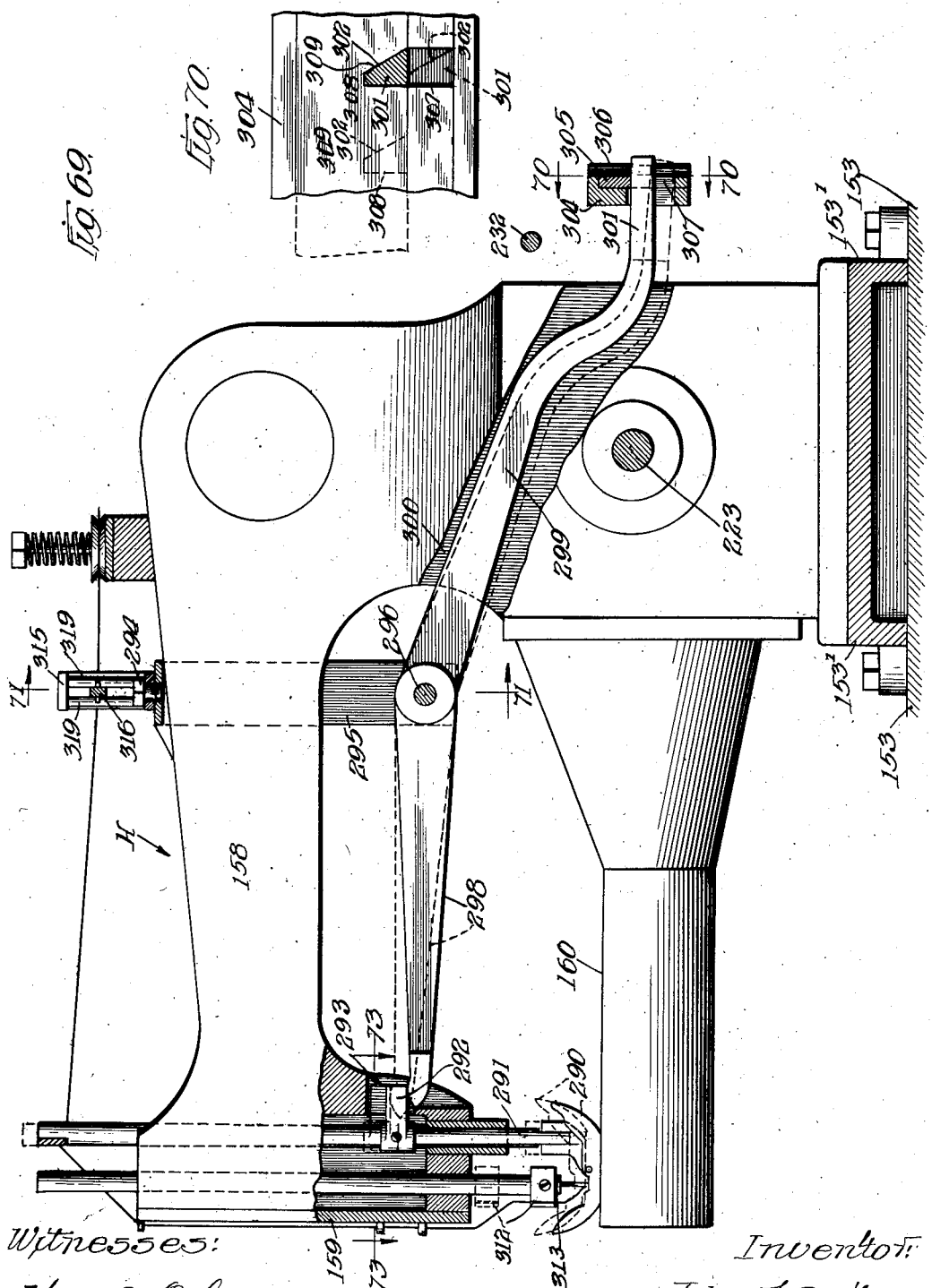

July 14, 1931.  J. F. GAIL  1,813,993
MACHINE FOR AND METHOD OF ASSEMBLING SPRINGS
Original Filed Feb. 26, 1926   47 Sheets-Sheet 31
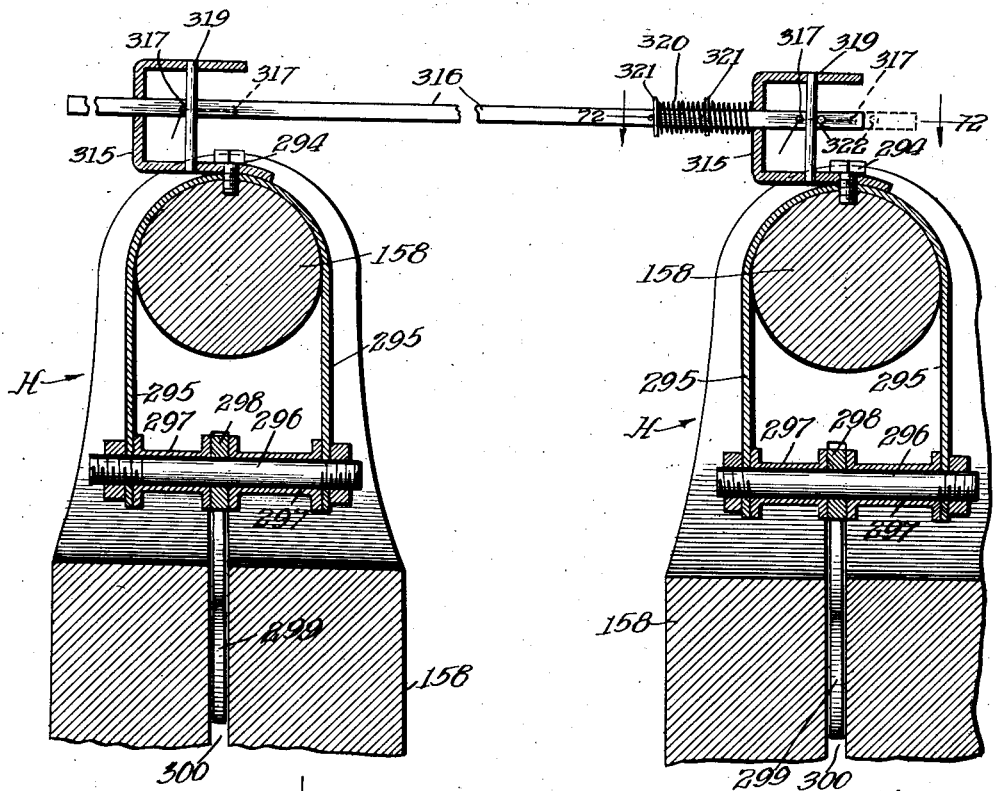
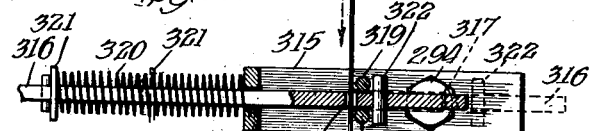
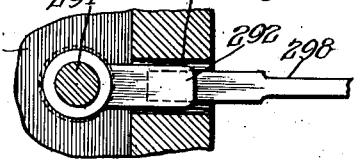
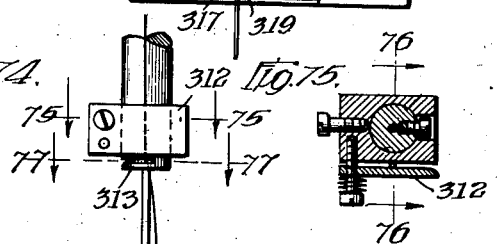
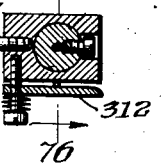
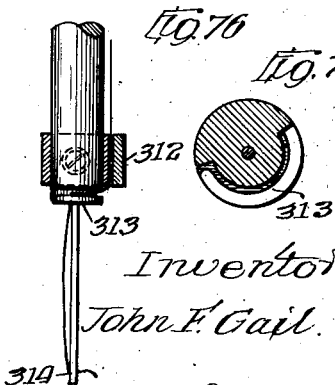

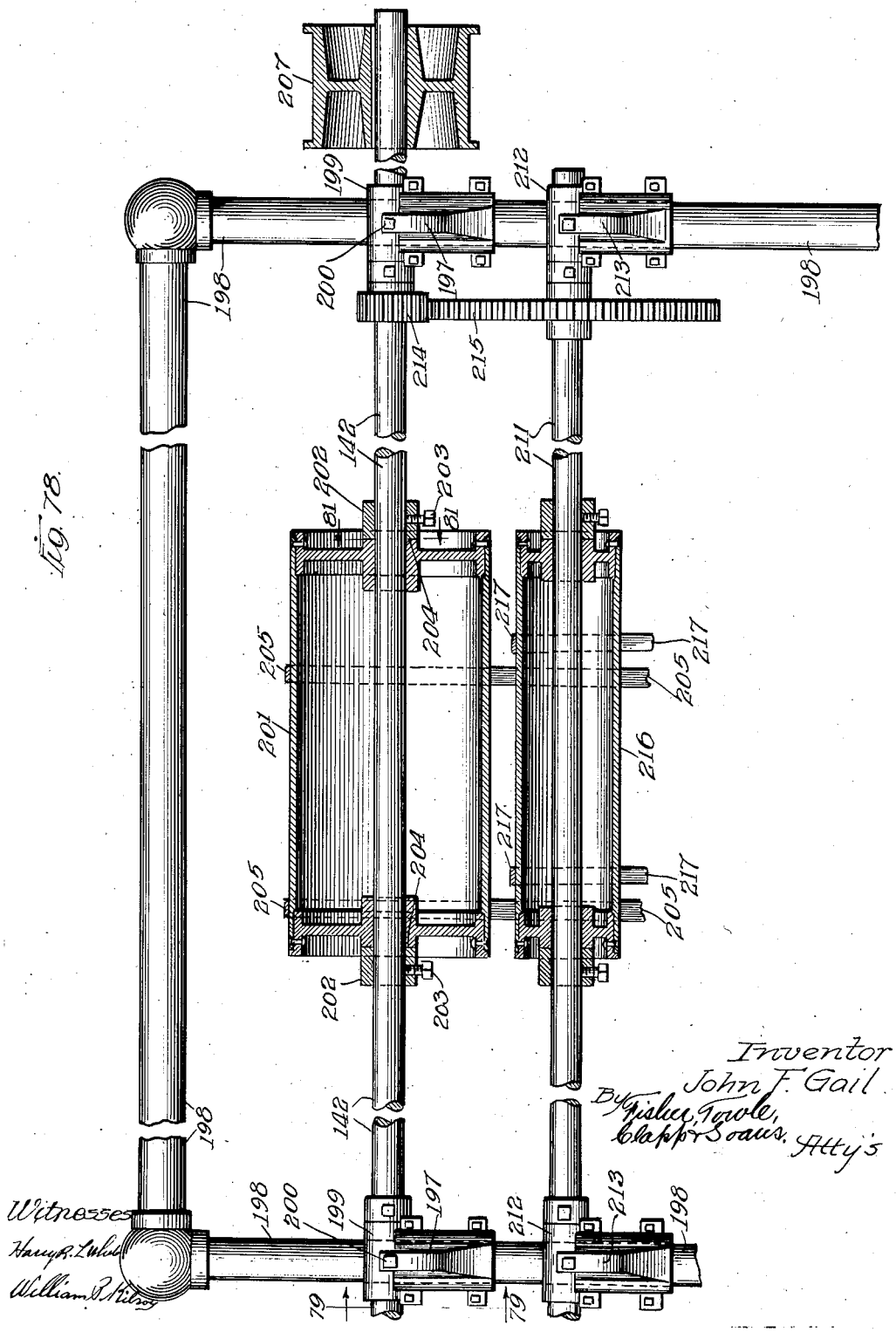

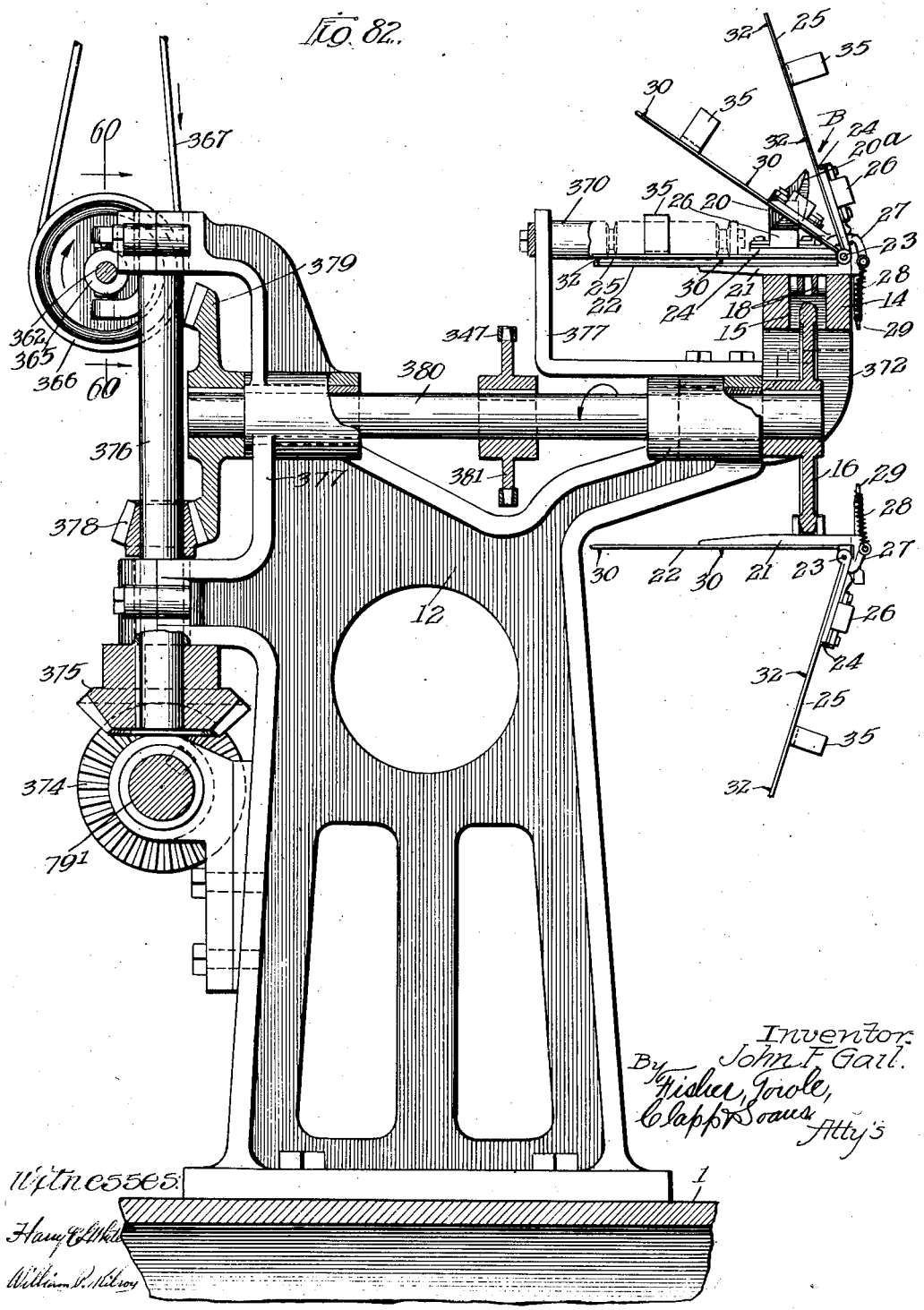

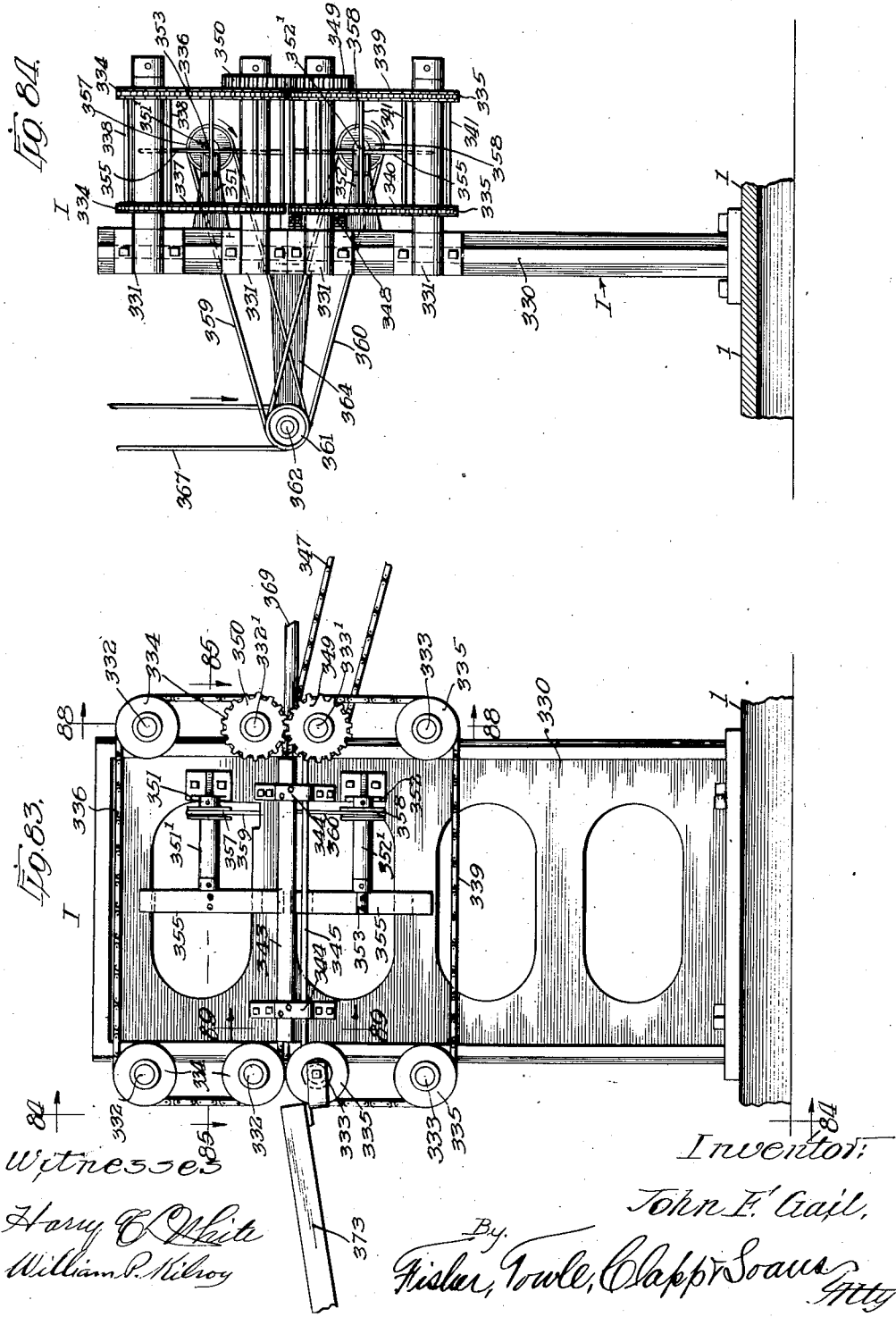

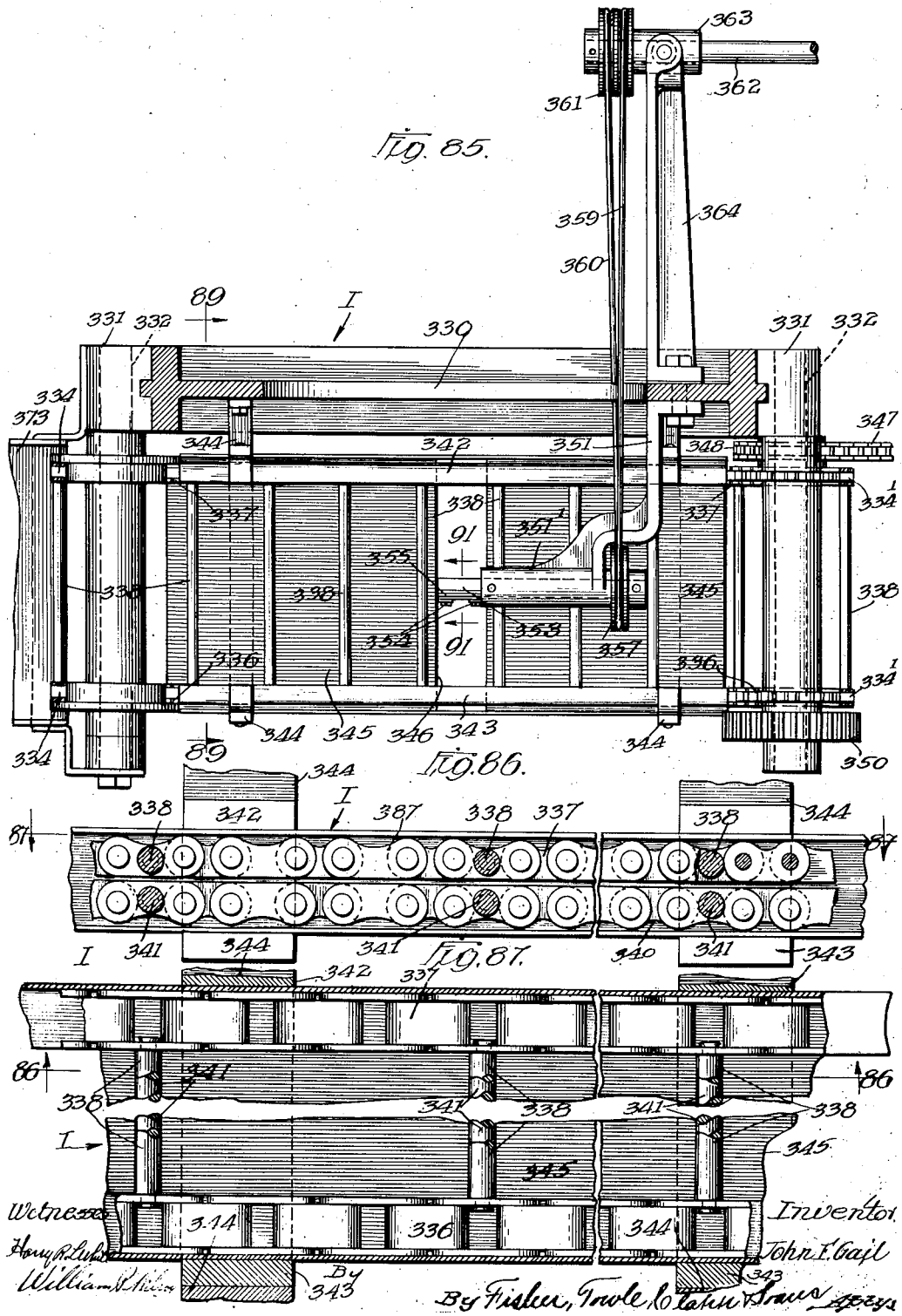

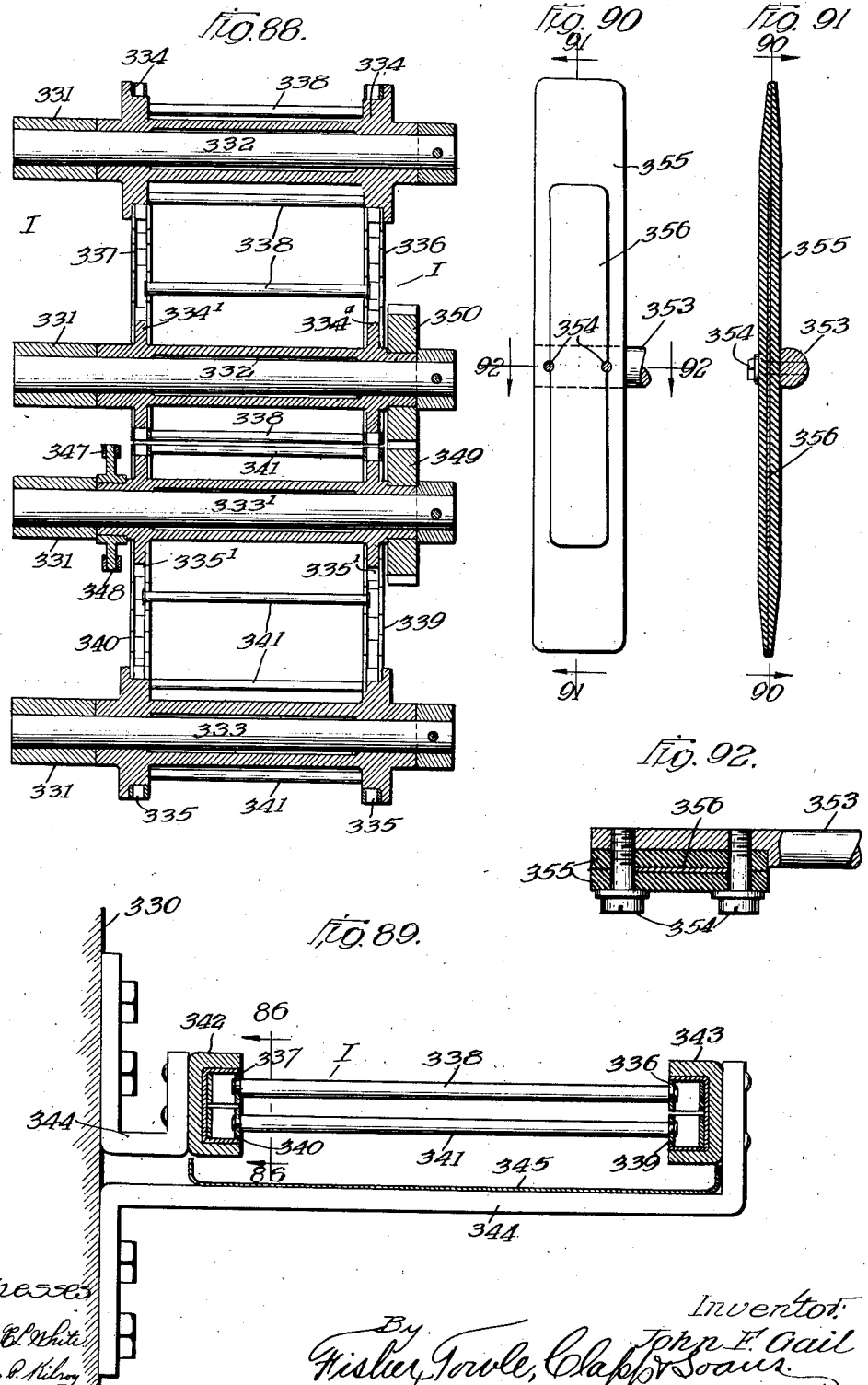

July 14, 1931.  J. F. GAIL  1,813,993
MACHINE FOR AND METHOD OF ASSEMBLING SPRINGS
Original Filed Feb. 26, 1926  47 Sheets-Sheet 37
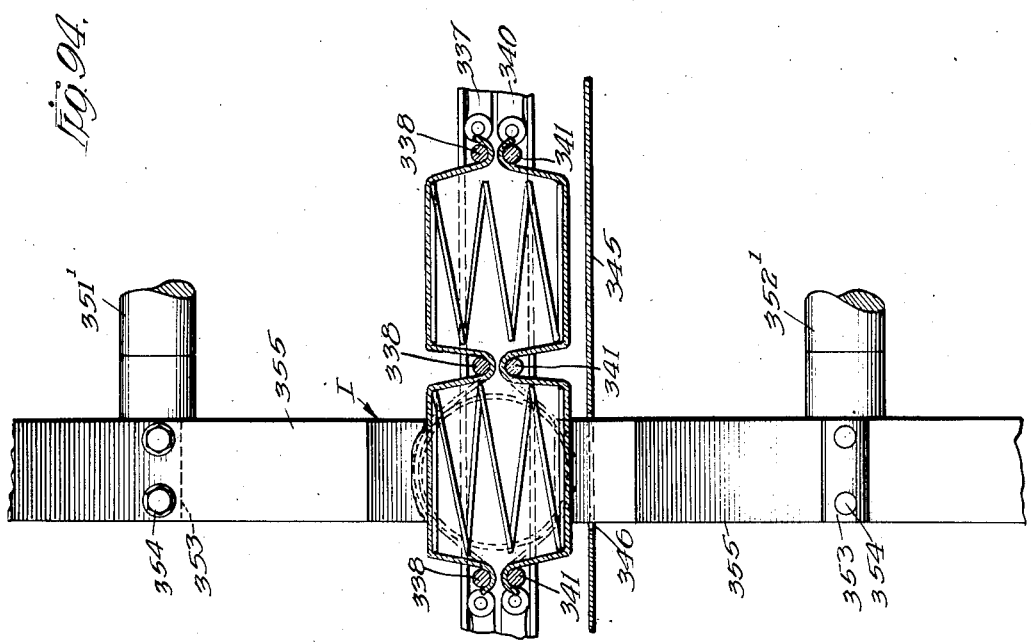
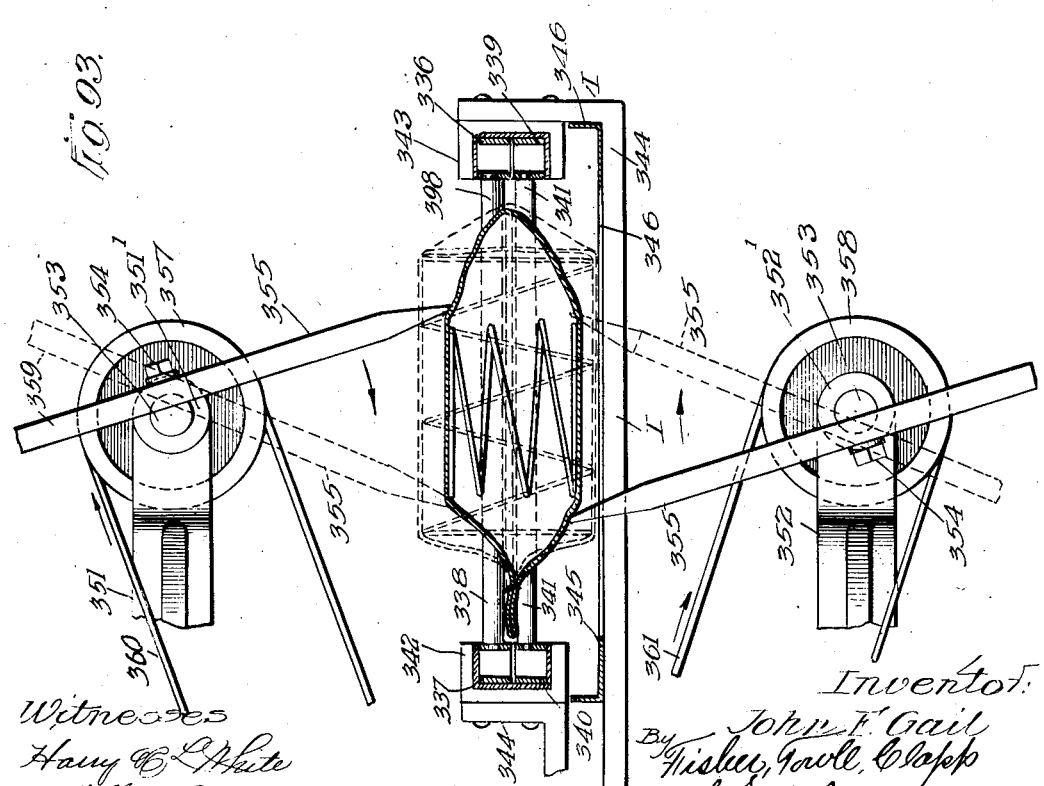

July 14, 1931. J. F. GAIL 1,813,993
MACHINE FOR AND METHOD OF ASSEMBLING SPRINGS
Original Filed Feb. 26, 1926 47 Sheets-Sheet 38
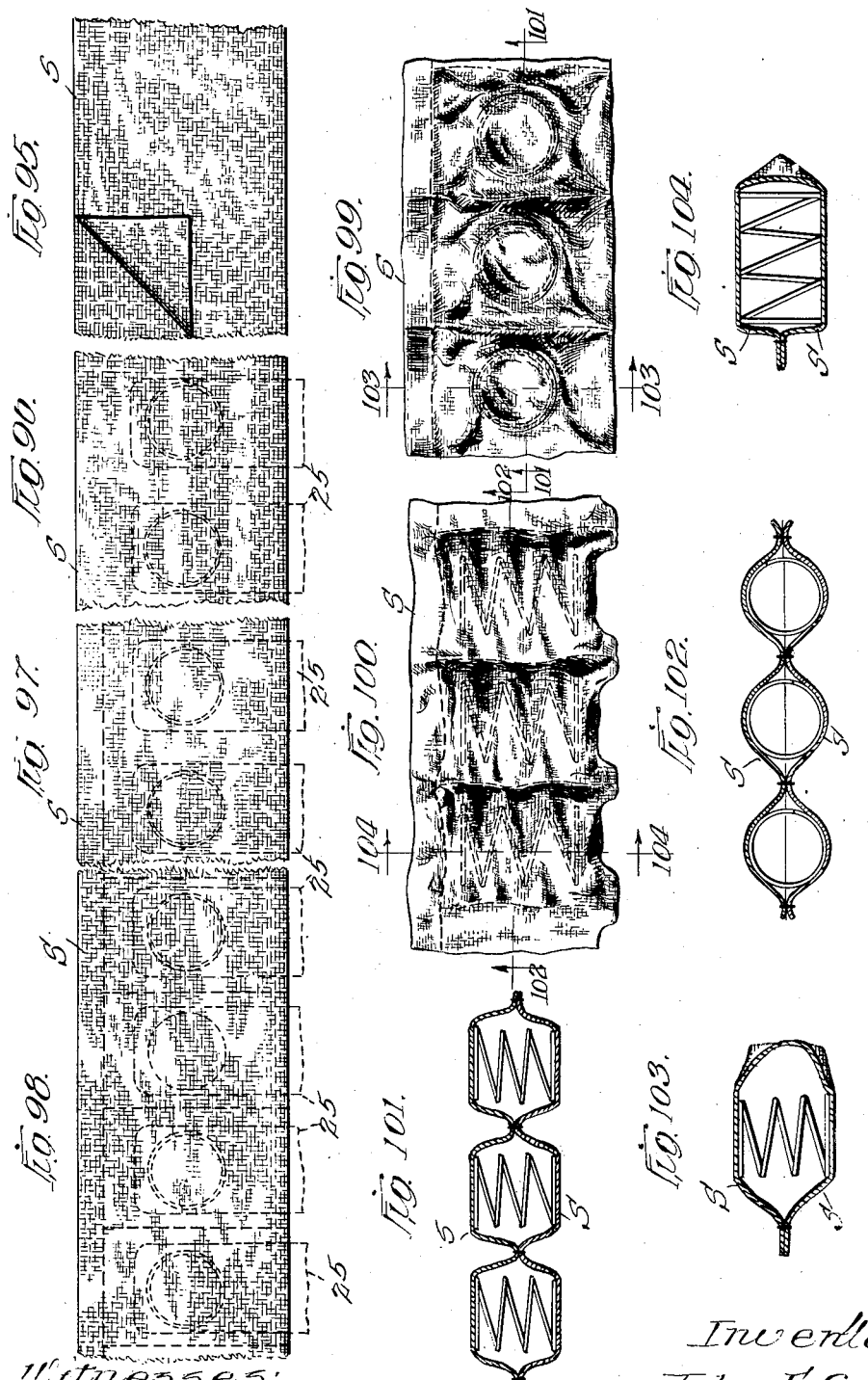

July 14, 1931.  J. F. GAIL  1,813,993
MACHINE FOR AND METHOD OF ASSEMBLING SPRINGS
Original Filed Feb. 26, 1926  47 Sheets-Sheet 39
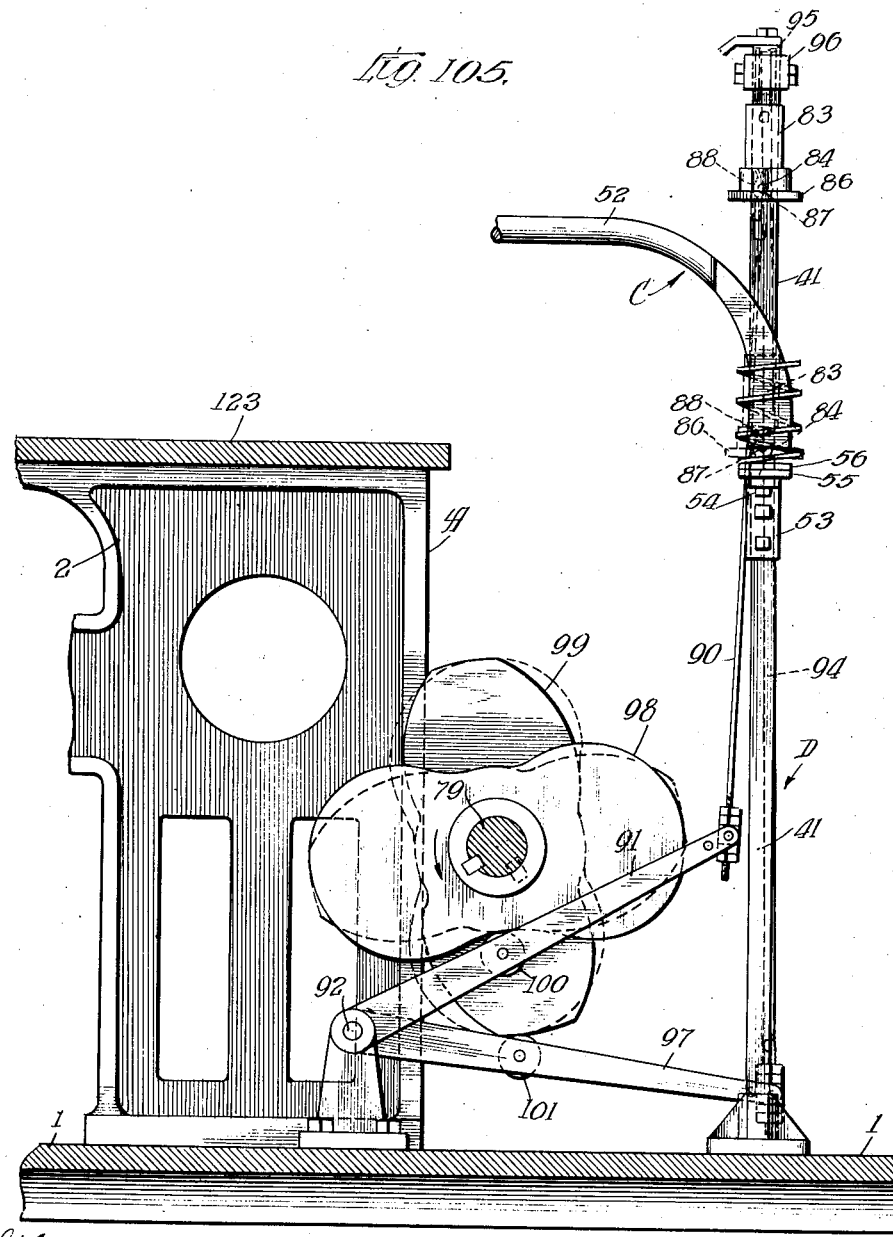

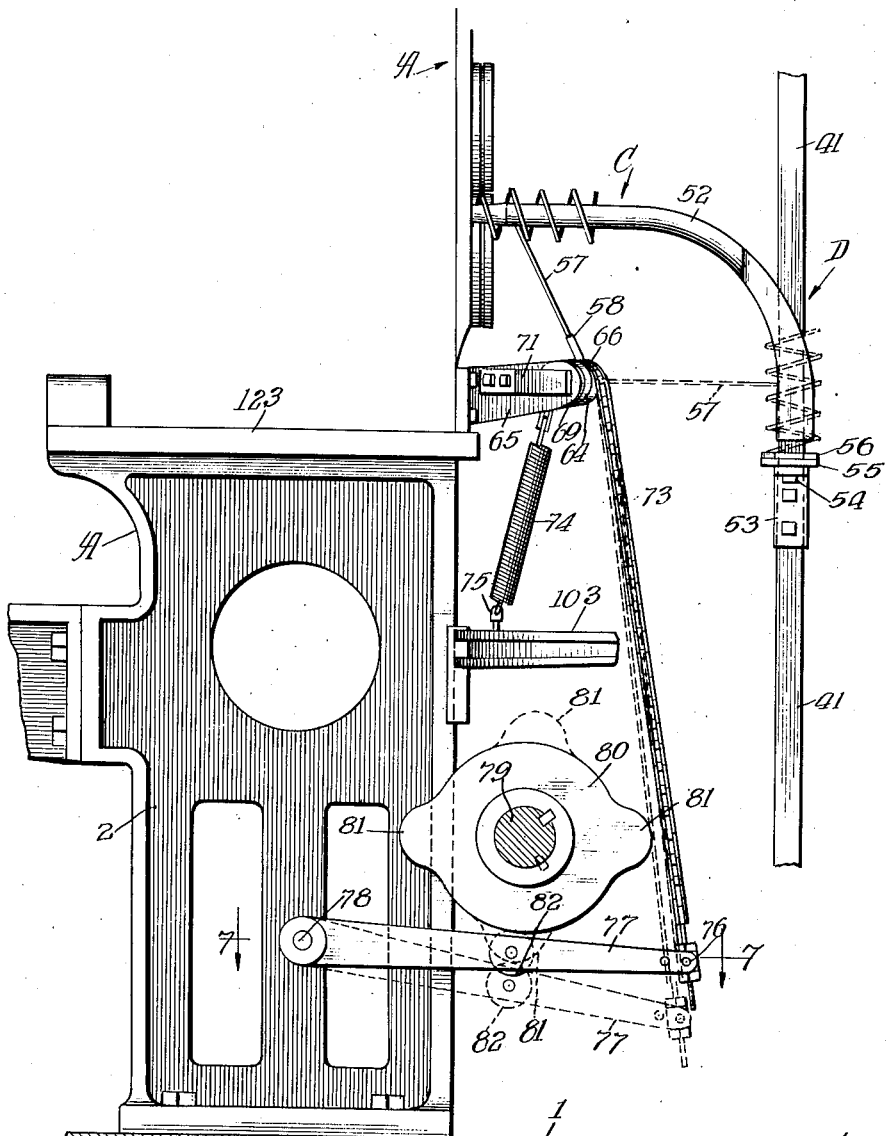

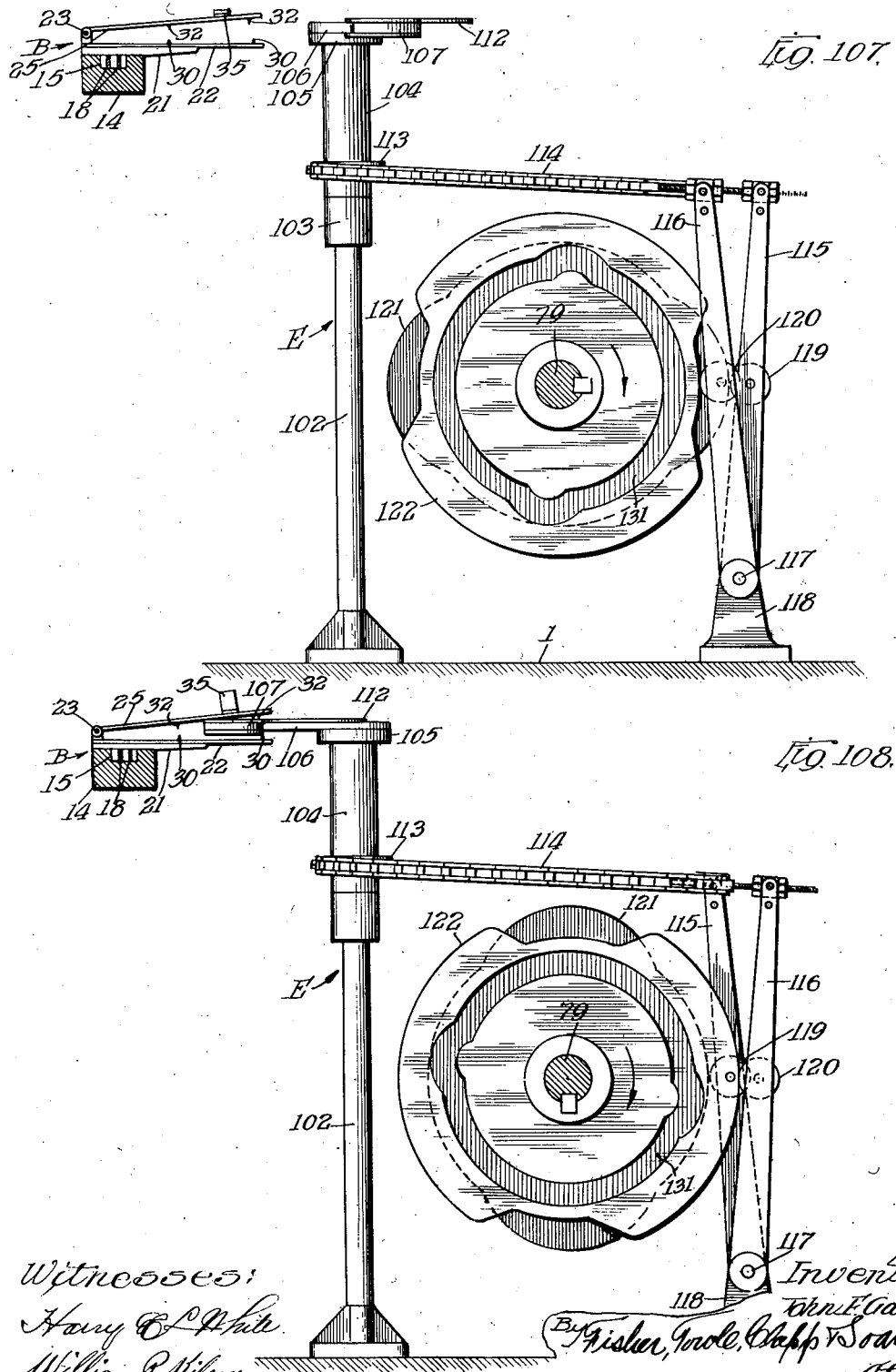

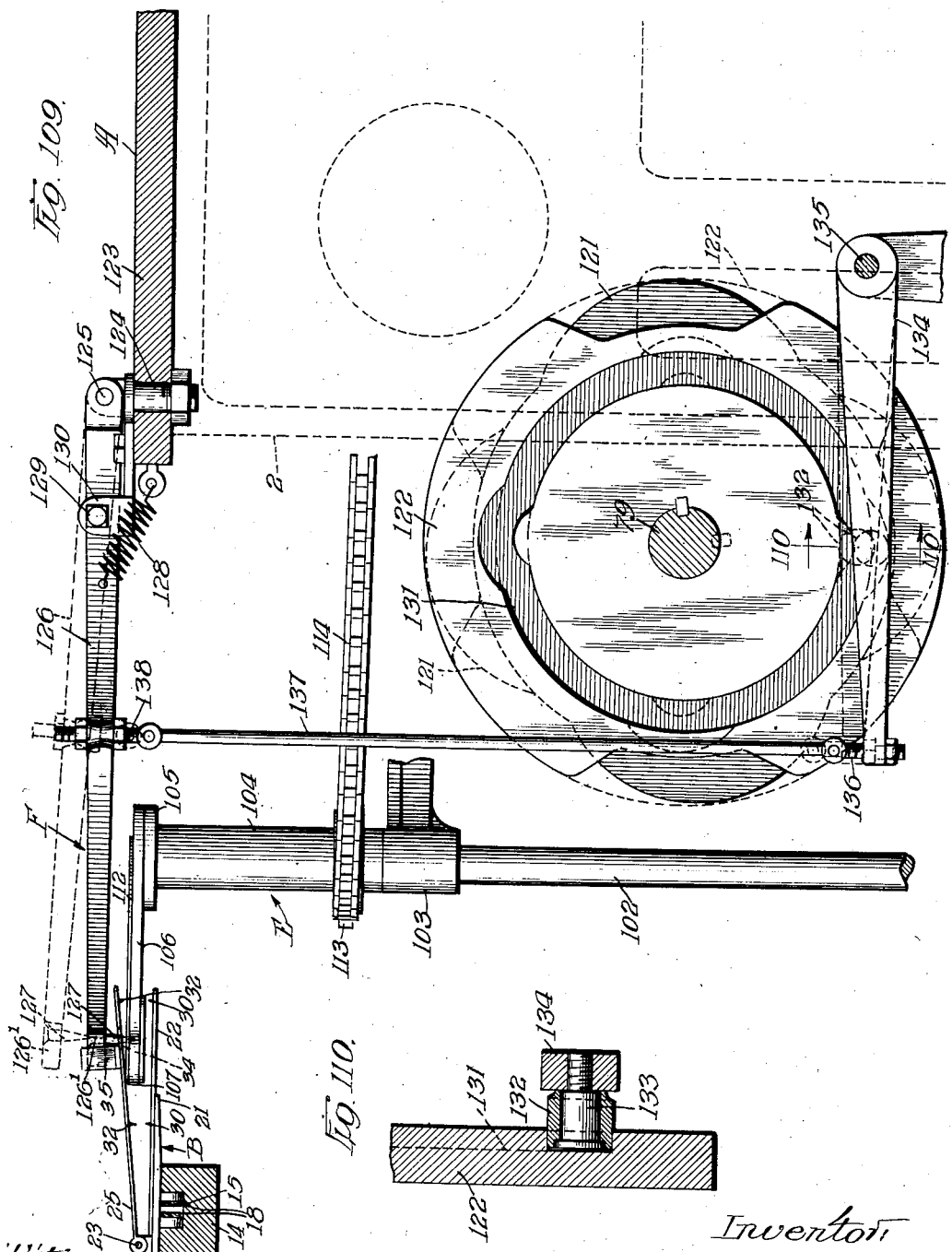

July 14, 1931. J. F. GAIL 1,813,993
MACHINE FOR AND METHOD OF ASSEMBLING SPRINGS
Original Filed Feb. 26, 1926  47 Sheets-Sheet 43
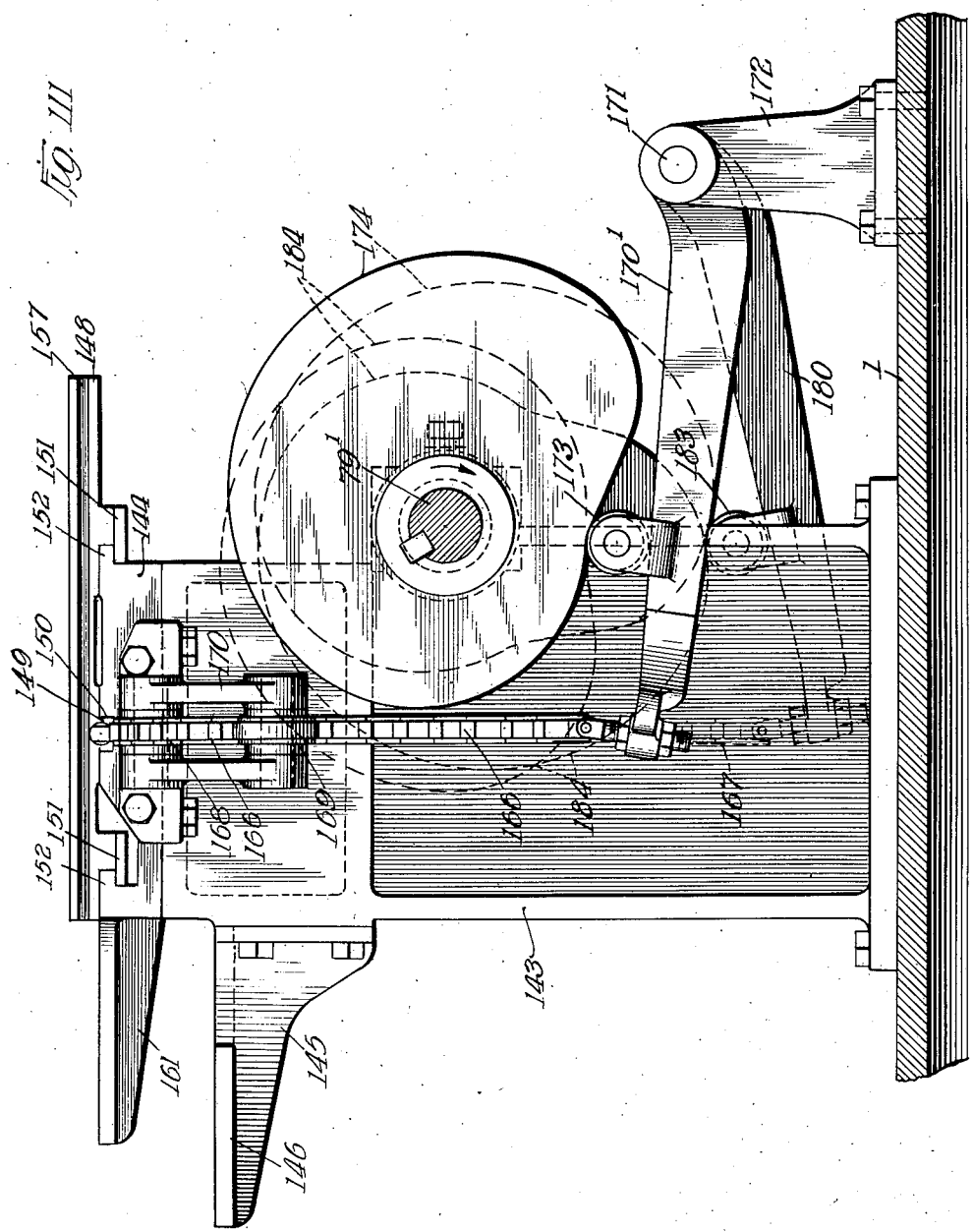

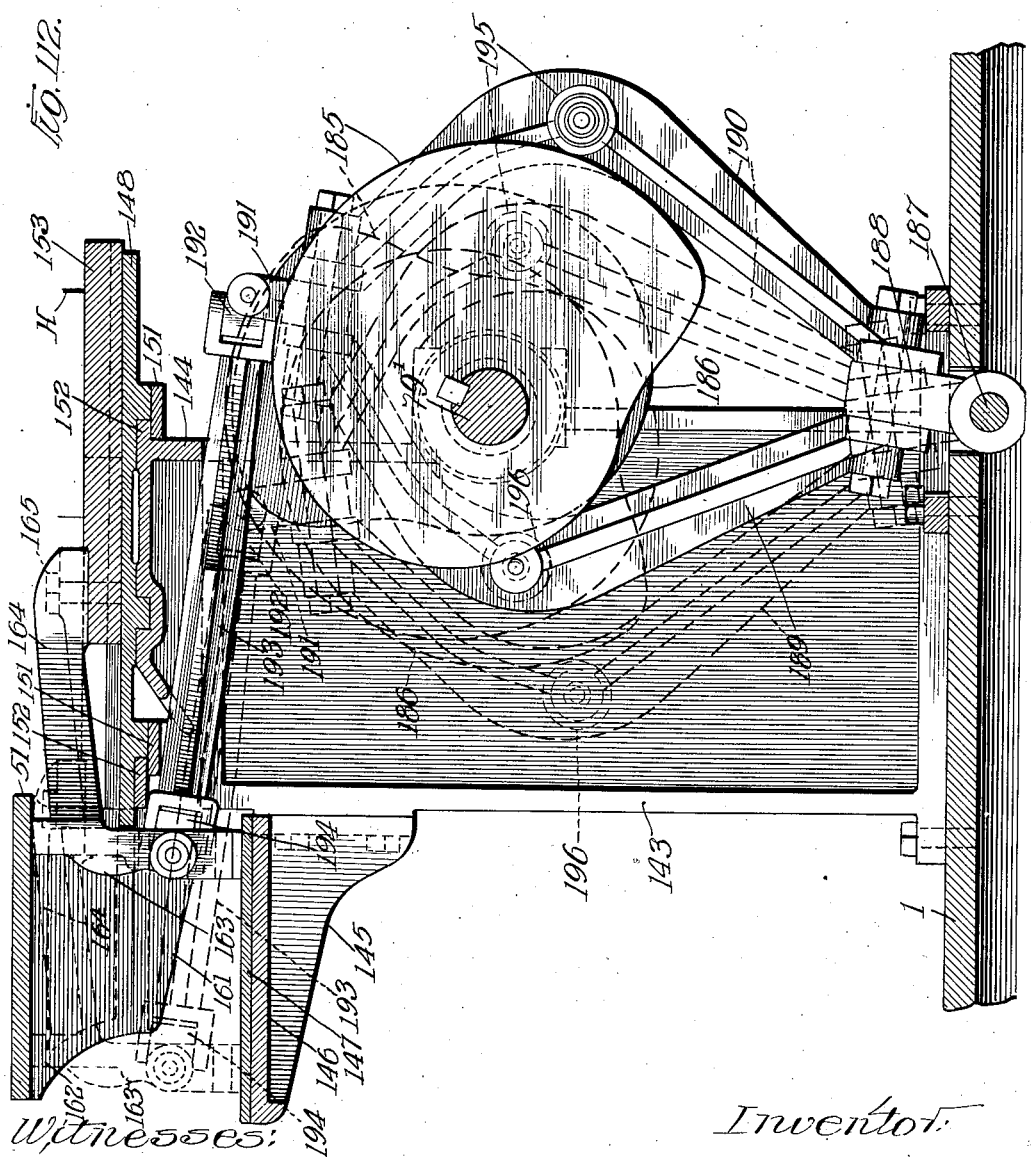

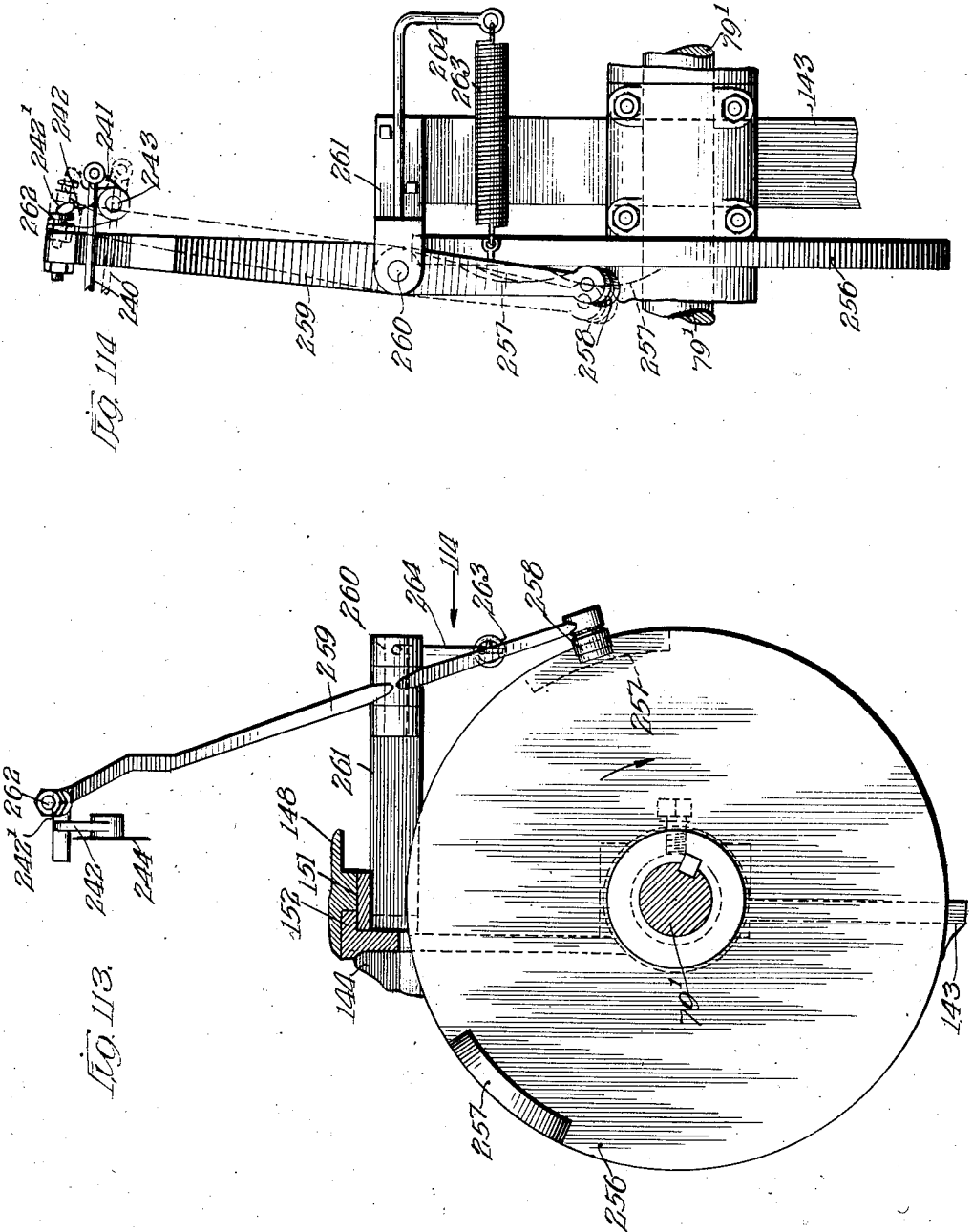

July 14, 1931. J. F. GAIL 1,813,993
MACHINE FOR AND METHOD OF ASSEMBLING SPRINGS
Original Filed Feb. 26, 1926 47 Sheets-Sheet 46
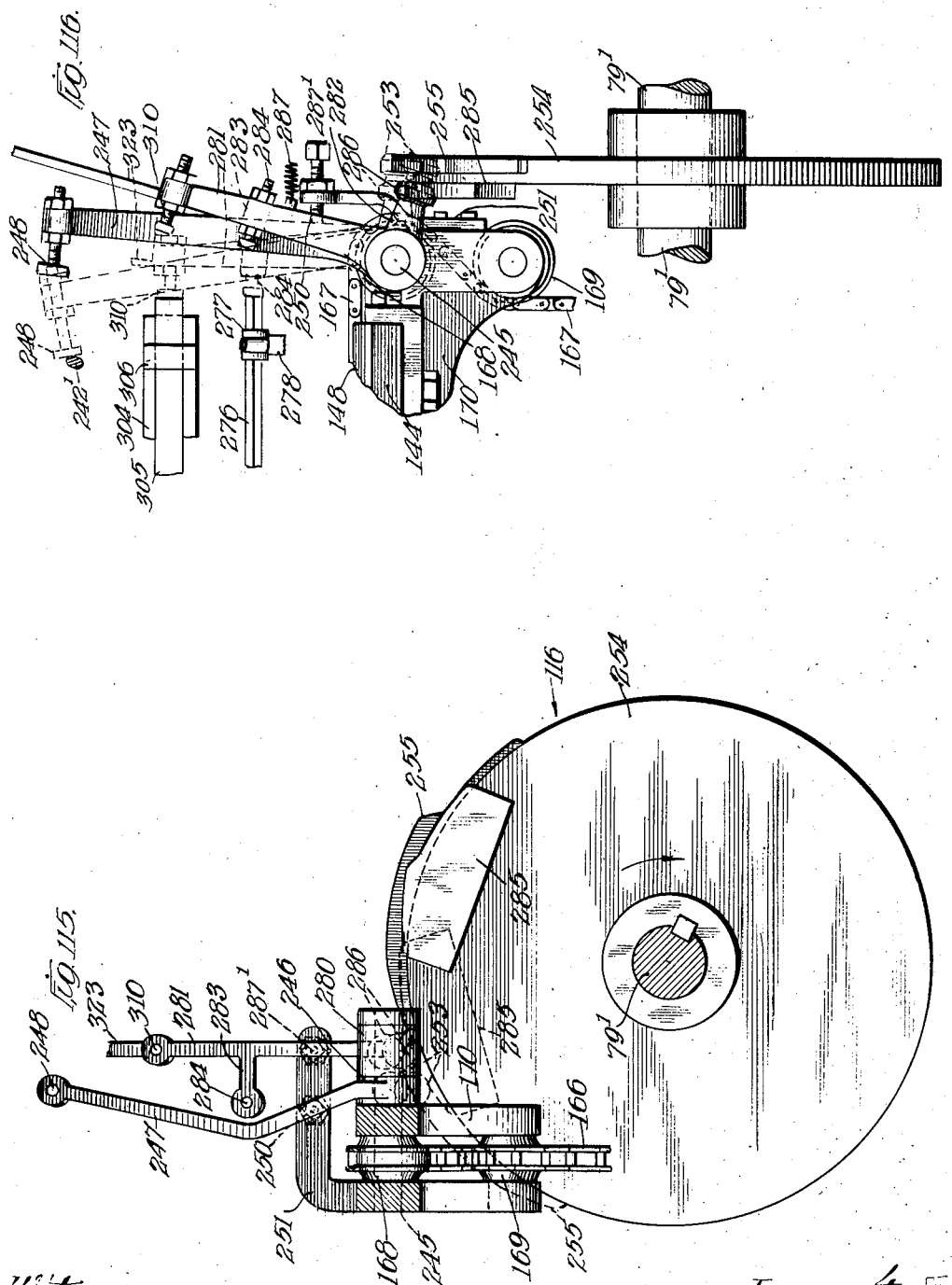

July 14, 1931.  J. F. GAIL  1,813,993
MACHINE FOR AND METHOD OF ASSEMBLING SPRINGS
Original Filed Feb. 26, 1926  47 Sheets-Sheet 47
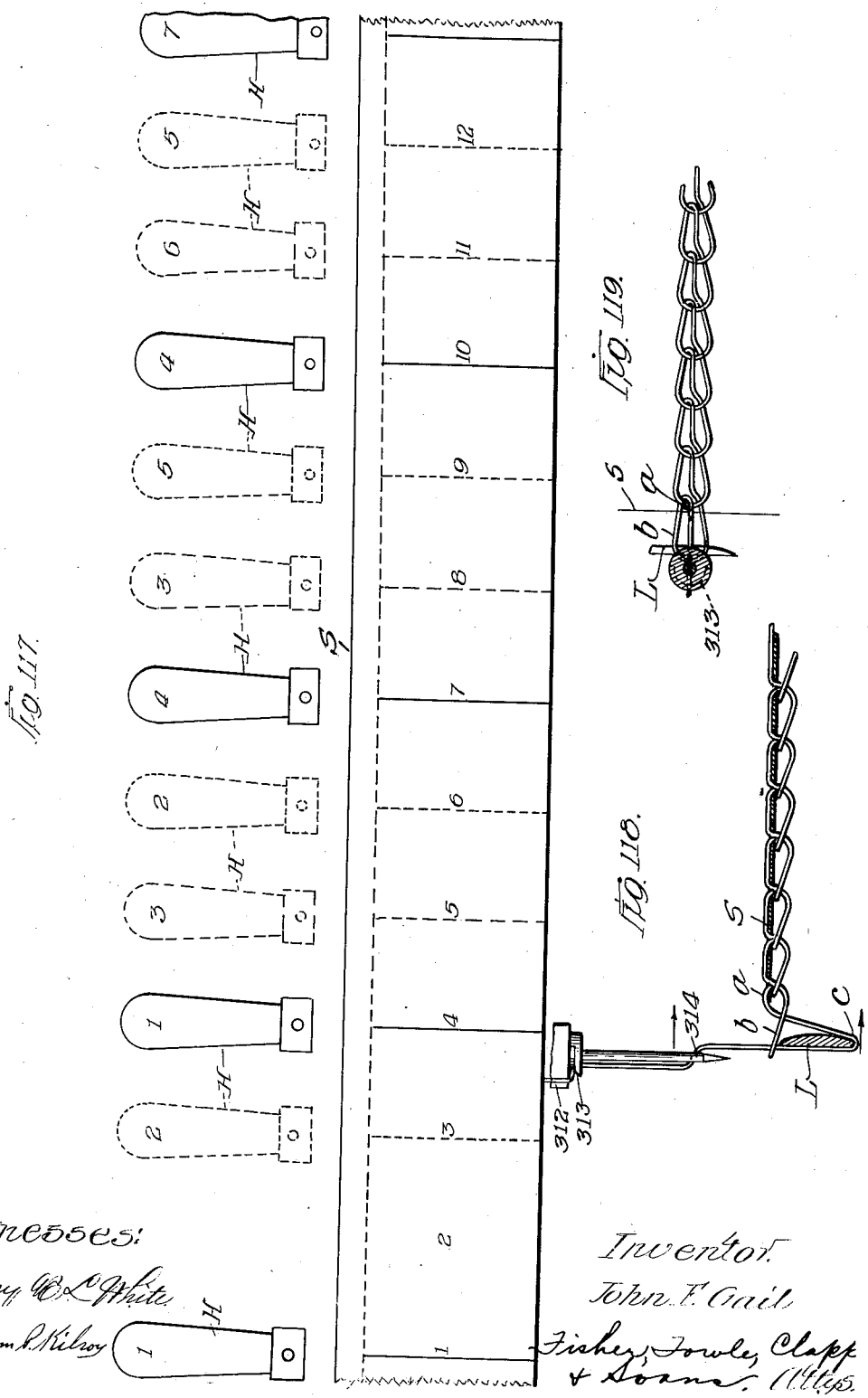

Patented July 14, 1931

1,813,993

UNITED STATES PATENT OFFICE

JOHN F. GAIL, OF EVANSTON, ILLINOIS, ASSIGNOR TO SIMMONS COMPANY, OF NEW YORK, N. Y., A CORPORATION OF DELAWARE

MACHINE FOR AND METHOD OF ASSEMBLING SPRINGS

Application filed February 26, 1926, Serial No. 90,892. Renewed April 8, 1929.

This invention relates to the art of spring assembling, and has reference more particularly to machines and methods of the type employed in the manufacture of spring mattresses, cushions, and the like, such, for instance, as the well-known Marshall mattress disclosed in U. S. Letters Patent to James Marshall No. 685,160, October 22, 1901. Mattresses and cushions of this type comprise a plurality of two-ply strips of fabric that are stitched transversely at intervals to form pockets having closed ends, coil springs being housed in the pockets, and the rows of filled strips being arranged side by side and stitched together, and the whole enclosed in a suitable cover or casing.

Various machines for performing individual operations involved in the manufacture of such mattresses and cushions are known, such as both hand and power operated devices for placing the springs in the pockets and subsequently closing the open ends of the latter; but, so far as I am aware, no complete organized machine for holding the two-ply fabric strip, forming the pockets therein, forming the springs and inserting the latter in the pockets, and completely closing the latter leaving the springs distended in operative position within the pockets has hitherto been produced, and in view of the large number of springs used in a single mattress, and the large number of operations involved in the manufacture of the latter, most of which have heretofore been performed by hand, the desirability of such a complete unitary machine, which it is the principal object of the present invention to produce, is manifest.

In accordance with one embodiment of my invention hereinafter described in detail, I have assembled and brought into intimate cooperative relation, a group of mechanisms, through the combined action of which, starting with a reel of wire for the coiling of the springs and a reel of suitable fabric, such as burlap or gunny sack, folded upon itself lengthwise to form a two-ply strip, the strip is advanced endwise, the coil springs are formed, then compressed axially into substantially flat form, then inserted edgewise into the open side of the two-ply strip and held flat between the sides of the strip while the latter is closed by a seam along its open edge and the spring-containing pockets are completed by transverse seams between adjacent springs, and finally the springs, lying crosswise of the pockets, are turned to bring their axes lengthwise of the pockets and allowed to expand in and fill the latter, thereby forming in continuous lengths, which are later cut into suitable lengths for the mattress, the complete spring-loaded strips which are subsequently assembled and attached side by side and form the filling of the mattress casing. In order that my invention may be clearly understood by persons skilled in the art, I have, in the accompanying drawings, fully illustrated a complete unitary machine for performing the above-described operations in proper order or sequence, and referring thereto—

Figs. 1 and 1a, on Sheets 1 and 2, together form a top plan view of the complete machine;

Figs. 2 and 2a, on Sheets 3 and 4, together constitute a front elevation of the machine;

Fig. 3, Sheet 5, is an enlarged view, partly in top plan and partly in horizontal section, of the right hand end of the machine shown in Fig. 1ª, illustrating more particularly the spring compressing and inserting mechanisms;

Fig. 4, Sheet 6, is a vertical section taken in the plane of the line 4—4 of Fig. 3;

Fig. 5, Sheet 7, is a view partly in elevation and partly in transverse vertical section on the line 5—5 of Fig. 3;

Fig. 6, Sheet 8, is a vertical transverse section taken on the line 6—6 of Fig. 3;

Fig. 7, Sheet 8, is a detail view, in horizontal section on the line 7—7 of Fig. 5, through the cam-actuated lever that operates a spring transfer finger;

Fig. 8, Sheet 8, is a vertical section on the line 8—8 of Fig. 7;

Fig. 9, Sheet 9, is an enlarged horizontal section taken on the line 9—9 of Fig. 4;

Fig. 10, Sheet 9, is an enlarged horizontal section through the spring inserter mechanism on the line 10—10 of Fig. 4;

Fig. 11, Sheet 10, is an enlarged horizontal section on the line 11—11 of Fig. 4;

Fig. 12, Sheet 10, is a vertical section on the line 12—12 of Fig. 9 through the spring inserter box, the spring compressor being indicated in dotted lines;

Figs. 13 and 14, Sheet 10, are sectional details on the lines 13—13 and 14—14 of Fig. 11;

Fig. 15, Sheet 11, is a horizontal section on the line 15—15 of Fig. 17;

Fig. 16, Sheet 11, is a horizontal section on the line 16—16 of Fig. 17;

Fig. 17, Sheet 11, is a vertical section on the line 17—17 of Fig. 15;

Fig. 18, Sheet 11, is a vertical section on the line 18—18 of Fig. 15;

Fig. 19, Sheet 11, is a vertical section on the line 19—19 of Fig. 17;

Fig. 20, Sheet 12, is an enlarged vertical section transversely of the conveyor and one of its spring clamps on the line 20—20 of Fig. 3;

Fig. 21, Sheet 12, is a similar view to Fig. 20 taken on the line 21—21 of Fig. 3, showing the spring clamp fully closed on the spring and the spring detainer removed;

Fig. 22, Sheet 12, is a sectional detail on the line 22—22 of Fig. 3 at right angles to the planes of Figs. 20 and 21;

Fig. 23, Sheet 12, is a detail of the guide constituting an element of the mechanism for transferring the springs from the coiling machine to the compressing and inserting mechanisms;

Fig. 24, Sheet 12, is a top plan view of Fig. 23;

Fig. 25, Sheet 13, is an enlarged section through the rock-shaft and bearing of the spring transfer finger which forces the spring from the coiler to the compressing and inserting mechanisms taken on the line 25—25 of Fig. 5;

Fig. 26, Sheet 13, is a section on the line 26—26 of Fig. 25;

Fig. 27, Sheet 13, is an outer end view of the transfer finger and its bearing viewed in the direction of the arrow 27, Fig. 25;

Fig. 28, Sheet 13, is a fragmentary outer end view of the transfer finger bearing, showing the cams for oscillating the finger at the inception of the down and up strokes of the latter;

Fig. 29, Sheet 13, is an end elevation of Fig. 28, viewed from the right, with the finger omitted;

Fig. 30, Sheet 13, is an isolated detail of the spring transfer finger;

Fig. 31, Sheet 14, is an enlarged longitudinal section through the entrance end of the fabric conveyor taken on the line 31—31 of Fig. 3;

Fig. 32, Sheet 1, is a longitudinal section through an adjustable coupling of the main cam shaft;

Fig. 33, Sheet 1, is a transverse section on the line 33—33 of Fig. 32;

Fig. 34, Sheet 15, is an enlarged front elevation of the gang sewing machine and its operating mechanism viewed on the line 34—34 of Figs. 1, 1a;

Fig. 35, Sheet 16, is a rear elevation of the parts shown in Fig. 34 viewed on the line 35—35 of Figs. 1, 1a;

Fig. 36, Sheet 17, is a vertical transverse section taken on the line 36—36 of Fig. 1a;

Fig. 37, Sheet 18, is a vertical transverse section viewed on the line 37—37 of Fig. 1;

Fig. 38, Sheet 19, is an enlarged vertical section on the line 38—38 of Fig. 1, showing the mechanism for effecting the transverse reciprocations of the sewing machine;

Fig. 39, Sheet 20, is a plan section of the two relatively sliding plates carrying the sewing machine on the line 39—39 of Fig. 38;

Fig. 40, Sheet 21, is a vertical longitudinal axial section through the main cam shaft, the sewing machine slides, and the actuating cams thereof;

Fig. 41, Sheet 22, is a vertical section, viewed from the rear, through the gang sewing machine drive shafts and the clutches thereon;

Fig. 42, Sheet 23, is a vertical transverse section on the line 42—42 of Fig. 41, showing the automatic stop mechanism for the sewing machine drive shaft;

Fig. 43, Sheet 23, is a longitudinal section through the stop bar and its mounting on the line 43—43 of Fig. 42;

Fig. 44, Sheet 23, is a transverse section on the line 44—44 of Fig. 43;

Fig. 45, Sheet 23, is a transverse section on the line 45—45 of Fig. 42;

Fig. 46, Sheet 23, is a transverse section on the line 46—46 of Fig. 42;

Fig. 47, Sheet 24, is an enlarged transverse section through the clutch shifter, taken on the line 47—47 of Fig. 41;

Fig. 48, Sheet 24, is a transverse section through the clutch taken on the line 48—48 of Fig. 41;

Fig. 49, Sheet 24, is a transverse section through the clutch taken on the line 49—49 of Fig. 41;

Fig. 50, Sheet 24, is a sectional detail on the line 50—50 of Fig. 49;

Fig. 51, Sheet 24, is a sectional detail on the line 51—51 of Fig. 48;

Fig. 52, Sheet 24, is a sectional detail on the line 52—52 of Fig. 51;

Fig. 53, Sheet 25, is an enlarged rear elevation of the gang sewing machine and its actuating and controlling mechanisms;

Fig. 54, Sheet 26, is an enlarged longitudinal section through the slidable clutch shifting rod taken on the line 54—54 of Fig. 42;

Fig. 55, Sheet 26, is an elevation of strikers that actuate the clutch shifting rod, the presser foot raising lever, the sewing machine stop device, and the thread loop former, viewed in the direction of the arrow 55, Fig. 56;

Fig. 56, Sheet 26, is an elevation of the parts shown in Fig. 55; viewed in the direction of the arrow, Fig. 56, Fig. 55;

Fig. 57, Sheet 26, is a vertical section on the line 57—57 of Fig. 55;

Fig. 58, Sheet 27, is an enlarged vertical section through the delivery end of the fabric strip conveyor;

Fig. 59, Sheet 27, is a vertical section on the line 59—59 of Fig. 58;

Fig. 60, Sheet 27, is a detail section through the bearing of one of the drive pulleys of the beater mechanism on the line 60—60 of Figs. 1 and 82;

Fig. 61, Sheet 28, is an enlarged plan view of a portion of the spring compressor clamps;

Fig. 62, Sheet 28, is a vertical section on the line 62—62 of Fig. 61;

Fig. 63, Sheet 29, is an enlarged fragmentary plan view of a portion of the fabric strip, the forward portions of the spring compression clamps, and a strip support located just beyond the sewing machine that forms the longitudinal seam;

Fig. 64, Sheet 29, is a vertical longitudinal section through the strip support on the line 64—64 of Fig. 63;

Fig. 65, Sheet 29, is a vertical section at right angles to the plane of Fig. 64 on the line 65—65 of Fig. 63;

Fig. 66, Sheet 29, is a view similar to Fig. 63, showing an auxiliary strip support;

Fig. 67, Sheet 29, is a vertical transverse section, similar to Fig. 65, taken on the line 67—67 of Fig. 66;

Fig. 68, Sheet 29, is a sectional detail through the auxiliary strip support on the line 68—68 of Fig. 67;

Fig. 69, Sheet 30, is an enlarged side elevation, partly in section, on the line 69—69 of Fig. 1a of one of the movable sewing machines of the gang stitcher, showing the presser foot lifting mechanism and the thread loop former;

Fig. 70, Sheet 30, is a fragmentary detail view in section on the line 70—70 of Fig. 69;

Fig. 71, Sheet 31, is an enlarged sectional view transversely of the two movable sewing machines on the line 71—71 of Fig. 69, illustrating the thread loop former and its mounting means;

Fig. 72, Sheet 31, is a plan section on the line 72—72 of Fig. 71;

Fig. 73, Sheet 31, is an enlarged plan section taken on the line 73—73 of Fig. 69;

Fig. 74, Sheet 31, is a fragmentary detail in elevation of the needle and needle bar;

Fig. 75, Sheet 31, is a cross-section on the line 75—75 of Fig. 74;

Fig. 76, Sheet 31, is a vertical section on the line 76—76 of Fig. 75;

Fig. 77, Sheet 31, is an enlarged cross-section on the line 77—77 of Fig. 74;

Fig. 78, Sheet 32, is a view partly in elevation, broken out, and partly in section of the overhead drive of the sewing machines of the movable gang stitcher, showing the high and low speed pulleys, their shafts, and geared connection;

Fig. 79, Sheet 3, is a fragmentary section on the line 79—79 of Fig. 78 showing one end support for the high speed pulley shaft;

Fig. 80, Sheet 3, is a cross-section on the line 80—80 of Figs. 78 and 81;

Fig. 81, Sheet 3, is a fragmentary view partly in elevation and partly in section showing the means for connecting the pulley spiders to the shaft;

Fig. 82, Sheet 33, is an enlarged transverse section on the line 82—82 of Fig. 1;

Fig. 83, Sheet 34, is a front elevation of the beater mechanism which shifts the position of the springs in the pockets of the fabric strip, viewed from the arrow 83, Fig. 1;

Fig. 84, Sheet 34, is a side elevation of the beater, viewed from the left of Fig. 83 and in the direction of the arrow 84, Fig. 1;

Fig. 85, Sheet 35, is an enlarged plan section of the beater on the line 85—85 of Fig. 83;

Fig. 86, Sheet 35, is a vertical longitudinal section through a part of the beater mechanism, showing the conveyor chains and chain guides, on the line 86—86 of Figs. 87 and 89;

Fig. 87, Sheet 35, is a horizontal section on the line 87—87 of Fig. 86;

Fig. 88, Sheet 36, is a vertical section through the drive sprockets and shafts of the beater on the line 88—88 of Fig. 83;

Fig. 89, Sheet 36, is an enlarged vertical transverse section through the beater conveyor chains, chain guides, and their supports on the line 89—89 of Fig. 83;

Fig. 90, Sheet 36, is an inner face elevation of one longitudinal half of the beater blade, showing a metal insert therein;

Fig. 91, Sheet 36, is a longitudinal section through the beater blade on the line 91—91 of Figs. 85 and 90;

Fig. 92, Sheet 36, is a cross-section through the beater blade and its shaft, showing the attachment of the blade to the shaft;

Fig. 93, Sheet 37, is a diagrammatic view, in cross-section through the beater conveyor and its support, showing the action of the beater blades on the spring in the pocket of the fabric; the full lines showing the initial position of the spring and pocket when first engaged by the beater blades, and the dotted lines showing the final position of the spring and pocket after having been stroked by the tips of the beater blades;

Fig. 94, Sheet 37, is a view at right angles to Fig. 93, the spring and pocket at the left appearing in full and dotted lines in the same relative positions as in Fig. 93;

Figs. 95, 96, 97 and 98, Sheet 38, are progressive fragmentary views of the fabric showing successive advancing positions of the latter during the spring filling and pocket sewing operations;

Figs. 99 and 100, Sheet 38, are plan views of fragments of the spring-filled fabric before and after the spring has been turned therein, respectively;

Fig. 101, Sheet 38, is a section on the line 101—101 of Fig. 99;

Fig. 102, Sheet 38, is a section on the line 102—102 of Fig. 100;

Fig. 103, Sheet 38, is a section on the line 103—103 of Fig. 99;

Fig. 104, Sheet 38, is a section on the line 104—104 of Fig. 100;

Fig. 105, Sheet 39, is an elevation of the spring flattener and of two duplex cams which operate the same;

Fig. 106, Sheet 40, is an elevation of the spring transfer device and of the duplex cam which operates the same;

Figs. 107 and 108, Sheet 41, are elevations of the spring inserter mechanism and of the duplex spring inserter cams, showing different positions of the latter, Fig. 107 showing the position of the cams at the inception of the spring inserting movement and Fig. 108 showing their position at the completion of the spring inserting movement;

Fig. 109, Sheet 42, is an elevation of the spring detainer and of the duplex spring detainer box cam which is formed on one side of one of the spring inserter cams;

Fig. 110, Sheet 42, is a detail section on the line 110—110 of Fig. 109;

Fig. 111, Sheet 43, is a diagrammatic view showing the two oppositely acting cams which reciprocate the longitudinal gang stitcher slide, each in opposite positions in full and dotted lines, respectively;

Fig. 112, Sheet 44, is a diagrammatic view of the gang stitcher cross-slide actuating cams, each in opposite positions in full and dotted lines, respectively;

Fig. 113, Sheet 45, is an elevation of the high speed clutch shifting cam and striker lever;

Fig. 114, Sheet 45, is a view of the parts shown in Fig. 113, viewed in the direction of the arrow 114, Fig. 113;

Fig. 115, Sheet 46, is an elevation of the low speed clutch shifting and loop former cam, the presser foot and machine stop actuating cam, and the disc on which they are mounted;

Fig. 116, Sheet 46, is a view of the parts appearing in Fig. 115, viewed in the direction of the arrow 116 on Fig. 115;

Fig. 117, Sheet 47, is a diagram showing the manner and order in which the gang stitcher sews the transverse seams forming and separating the pockets;

Fig. 118, Sheet 47, is a detail view in cross-section through the fabric in the vertical plane of a transverse, illustrating the chain stitch character of the seam, and also showing the position of the needle-bar, needle, and chain stitch looper at the instant the machine begins its backward movement, breaking the thread; and Fig. 119 is a plan view of Fig. 118.

General organization

Referring first to Figs. 1, 1a, 2, 2a, and 5 I will first briefly identify the several co-operating mechanisms making up the complete machine, and I will then proceed to a description of the several mechanisms in detail. 1 designates a flat rectangular base plate, on one of the rear corners of which is mounted an automatic spring coiling machine designated as an entirety by A. Mounted on and extending lengthwise of the front end of the platform 1 is a folded fabric guide and carrier designated as an entirety by B, the same including a continuously traveling group of spring clamps which serve to hold the flattened springs compressed between the plies of the fabric while the pockets are being stitched and closed. Opposite the discharge end of the coiler there is located a spring transfer device designated as an entirety by C (Fig. 5), by which the coils are transferred from the coiler to a spring compressor or flattener, designated as an entirety by D, from which latter the flattened springs are forced edgewise by a spring inserter mechanism, designated as a whole by E (Fig. 1a) between the folds of the fabric. Just beyond the inserted mechanism is located a mechanism designated as a whole by F which I term the spring detainer, the function of which is to engage with the flattened spring after the latter has been placed by the inserter between the plies of fabric and hold the spring against withdrawal during the retracting movement of the inserter. Beyond the detainer relatively to the direction of travel of the fabric, is a longitudinal stitcher designated as an entirety by G, which forms a longitudinal seam that unites the free edges of the two-ply strip; and beyond the stationary longitudinal stitcher G is a transverse gang stitcher designated as an entirety by H and comprising, in the form shown, a plurality of sewing machines mounted to travel crosswise of the fabric strip and stitch the longitudinal seams of the spring pockets, said machines simultaneously traveling with the strip until the seams are stitched and then making a quick return movement to engage fresh portions of the strip. Beyond the transverse stitcher H is located a mechanism which I term the beater, designated as an entirety by I, the function of which is to shift the position of the springs in their closed pockets from a position in which their axes are transverse to the pockets to a position in which their axes lie lengthwise of the pockets.

The spring coiler

With the specific structural features of the spring coiler A the present invention is not concerned. Any suitable or approved automatic spring coiling machine may be employed, preferably a machine of the type which delivers light coil springs of uniform diameter. As shown in Fig. 5, the coiler is mounted on a suitable frame structure 2 stepped on the base plate 1, and is driven by suitable gearing from a drive shaft 3 operated from an overhead pulley (not shown) by a belt 4 and pulley 5, this latter being clutched to and unclutched from the shaft 3 by a clutch designated generally by 6 and operated both by hand lever 7 and, automatically, by a normally locked lever 8 actuated by a pull spring 9 when the lock is released electrically by a magnet 10. With the details of this clutch and its actuating levers the present invention is not concerned.

Folded fabric guide and carrier

Opposite one end of the base platform 1 is mounted a reel 11 (Fig. 2a) on which is wound the previously prepared two-ply folded fabric strip, usually of burlap or like material, which, when stitched as hereinafter described, provides the fabric pockets for the springs. On the front portion of the base platform 1 are mounted a pair of standards 12 and 13 having forwardly overhanging upper end portions (Fig. 5) supporting a longitudinally extending bar 14, in the upper face of which bar is a groove or channel 15. Suitably journaled on the outer sides of the upper end portions of the standards 12 and 13 are sprocket wheels 16 and 17, over and between which is trained an endless sprocket chain 18. To the under side of the bar 14 are attached at intervals a plurality of vertically disposed U-shaped brackets 19 (Fig. 62), the upper horizontal limbs of which overhang the bar 14 and have attached thereto a longitudinal guide bar 20, for a purpose later disclosed. Referring to Figs. 61 and 62 (Sheet 28), attached at intervals to links of the conveyor chain 18 are a series of transversely extending lower hinge plates 21, on the upper sides of which are attached thin flat clamp plates 22. The hinge plates 21 slide over the upper surface of the bar 14, as clearly shown in Fig. 62, and hinged to the outer ends of the plates 21 on pintles 23 are a corresponding series of upper hinge plates 24, to the lower sides of which are attached clamp plates 25 overlying and co-operating with the lower clamp plates 22. On the upper sides of the upper hinge plates 24 are mounted blocks 26 which, during the working travel of the clamp plates 22 and 25 slidingly engage the lower surface of the bar 20, so as to maintain the plates 22 and 25 in closed position on the fabric. On each of the upper hinge plates 24 are a pair of outwardly extending arms 27, to the outer ends of which are attached pull springs 28 that are anchored at their lower ends to the lower end of a pin 29 fixed in and depending from the lower hinge plate 21 and overlying the front side of the bar 14. The pull of the springs 28 constantly tends to open the clamps 22, 25 by swinging the clamp 25 upwardly, this tendency being restrained during the working travel of the clamp plates by the bar 20. In the lower clamp plate 22 are inserted four upstanding pointed pins 30 registering with holes 31 in the upper clamp plate, and in the upper clamp plate 25 are inserted a corresponding number of depending pointed pins 32 registering with holes 33 in the lower clamp plate. The purpose of these pins is, of course, to grip the fabric when the clamp plates are closed on the latter and thereby effect the uniform travel of the fabric past the several mechanisms operating thereon, as well as to maintain the fabric in a smooth flat uniform condition during the stitching operations. In each of the upper clamp plates 25 is a hole 34, that co-operates with the spring detainer in a manner hereinafter described. Attached to the top of each clamp plate 25 is an upstanding post 35 for a purpose hereinafter disclosed.

As shown in Figs. 1a, 2a and 5, the receiving end portion 20' of the bar 20 is warped through an angle of approximately ninety degrees and bent slightly upwardly and outwardly, so as to engage with the blocks 26 of the several upper clamp plates, as they round the sprocket wheel 17, and gradually close said clamp plates upon the fabric. Similarly, by reference to Figs. 1 and 2 it will be seen that the other end portion 20ª of the bar 20 is upwardly and outwardly directed and warped, to permit the rise of the upper clamp plates under the pull of their springs as said clamp plates round the sprocket wheel 16.

Referring to Figs. 1a, 3 and 31, mounted on the upright 13 is an upwardly and rearwardly extending bracket arm 36 that supports a shallow channelled guide 37, over which the two-ply fabric strip, designated by S is guided from the reel 11 onto the conveyor. In the crown of the guide 37 is a transverse slot 38, through which the fabric passes downwardly onto the lower clamp plates of the conveyor, being directed onto the latter by a downwardly inclined tongue 39 on the inner end of the guide 37. From the point of the tongue 39, the two plies are divided, the lower ply being engaged by the pins on the lower clamp plates and carried along by the latter, and the upper ply passing over a horizontal spreader plate 40 that, as best shown in Fig. 3, is attached to a post 41 rising from the base plate of the machine. The purpose of the spreader 41 is to separate the free margins of the two-ply fabric to permit the entrance therebetween of the pivoted spring inserter hereinafter described. The portion of the guide bar 20 lying opposite the spreader 40 is sufficiently elevated to permit the upper clamp bars to travel above the spreader plate 40, as clearly shown in Fig. 31.

The clamp plates 22 and 25 are slightly shorter than the width of the two-ply fabric strip; and in order to support the free inner margin of the fabric strip against drooping when engaged by the sewing machines of the transverse stitcher H, I provide beyond the longitudinal stitcher G a pair of fabric margin guiding and supporting devices, the details of which are best shown in Figs. 63 to 68 inclusive on Sheet 29. Describing the first of these devices shown in Figs. 63, 64 and 65, mounted on a longitudinal sub-frame member 42 is a post 43, adjustably mounted on which are a pair of spaced upper and lower horizontal plates 44 and 45, between the free margins of which the marginal portion of the fabric strip S travels, and by which it is supported against drooping. The entrance ends of the strips 44 and 45 are flared, as shown at 44' and 45' to facilitate the entrance of the advance end of the strip therebetween. The second of these devices, located a slight distance beyond the first, is shown in Figs. 66, 67 and 68, and comprises a similar but shorter pair of upper and lower flat plates 46, 47 made from a single piece of sheet-metal folded upon itself and having similar flaring advance ends 46' and 47', said plates being notched at their folded end and mounted on a post 48 by means of a key 49 and clamp screw 50, so as to be readily adjustable on the post. The post 48 is mounted upon a horizontal plate 51, later referred to.

*Spring transfer device*

The spring transfer device includes a substantially vertically disposed elbow-shaped guide at its upper end mounted in the spring coiler at the delivery point of the latter so that the springs, as they emerge from the coiler, encircle the same, and a pivoted swinging arm that engages behind the rear end of the spring and positively pushes the latter outwardly and downwardly lengthwise of the guide into the field of action of a spring compressor or flattener. The details of this spring delivery device are shown in Fig. 4 Sheet 6, Fig. 5 Sheet 7, Fig. 9 Sheet 9, Figs. 23 and 24 Sheet 12, Figs. 25 to 31 Sheet 13, Fig. 105 Sheet 39 and Fig. 106 Sheet 40. As best shown in Figs. 105 and 106, secured at its upper end in the coiling machine between the delivery rolls of the latter, and substantially axially coincident with each spring as it is delivered from the machine, is a horizontally and downwardly extending elbow-shaped guide 52, the lower depending portion of which is narrowed and flattened in one direction and gradually widened in the other to approximately the internal diameter of the spring. The lower end of the guide 52 is free and terminates just above the fixed member of the spring compressor hereinafter described.

Attached to the post 41 is a bracket 53 on which is secured, by screws 54 from beneath, an anvil block 55 formed on its upper face with a rib 56 of a length slightly greater than the external diameter of a spring, so as to form a rest for the lower end of the latter when the spring is in its lowermost position on the guide 52, as shown in dotted lines in Fig. 106. To insure a certain and quick travel of the spring over the guide 52 a pivoted transfer finger is employed, the free end of which engages behind the spring as it emerges from the coiler, and, by a quick swinging movement, pushes the spring endwise over the guide. As herein shown, this finger comprises a rod 57 mounted at its lower end in a socket piece 58 that, in turn, is pivoted on a pin 59 in a transverse slot 60 formed in the head 61 of a rock shaft 62. This shaft is encircled by a bushing 63 mounted in a bearing 64 on a bracket 65 attached to the rear frame of the coiler. Encircling the portion of the shaft 62 and its bushing 63 which projects beyond one side of the bearing 64 is a sleeve 66 formed in its outer end with diametrically opposed notches having similarly inclined cam bottoms 67 and 68, the cam bottoms of said notches having bearing engagement with the socket piece 58 of the finger 57 on opposite sides of the pivot 59 as clearly shown in Fig. 26. Pinned to the other end of the shaft 62 is a brake disc 69, against which a friction brake 70 is pressed by a leaf spring 71 attached to the bracket 65, the purpose of the brake being to prevent overthrow of the finger at the extremes of its movement. On the sleeve 66 is a screw 72 which attaches the sleeve to a sprocket chain 73. As shown in Fig. 106, one end of said chain is connected to a pull spring 74 anchored at 75 to a sub-frame member, while the other end of said chain is anchored at 76 to a cam-actuated lever 77 that is pivoted at 78 to one of the sub-frame members. Keyed to a cam shaft 79 is a cam disc 80 formed on its periphery with diametrically opposed protuberant cams 81 adapted to engage with a cam roller 82 journaled in the lever 77 (see Figs. 7 and 8, Sheet 8). It will thus be seen that the cams 81 oscillate the sleeve 66 in a direction to swing the finger 57 downwardly and propel the spring onto the anvil 55, while the spring 74 oscillates the sleeve 66 in the reverse direction to return the finger 57 to its high position. The notches in the end of the sleeve 66 are wider than the finger socket 58, so that, as said sleeve starts to turn to swing the finger downwardly, the lower cam 68 throws the upper end of the finger 57 inwardly behind the spring; and as the sleeve 66 begins to turn in the reverse direction, the other cam 67 first rocks the finger outwardly beyond the circumference of the spring so that it will clear the latter on its return.

*The spring compressor or flattener*

After the spring has been transferred upright onto the anvil 55, resting at its lower end upon the rib 56 of the latter, a mechanism next to be described compresses and flattens the spring so as to enable the latter to be engaged by a device which inserts it edgewise between the plies of the fabric. The details of this spring flattener are shown mainly in Figs. 15 to 19 inclusive on Sheet 11, and the actuating mechanism thereof is shown in Figs. 2a and 105. Slidable on the post 41 is a sleeve 83, on the lower end of which is a foot 84, best shown in the plan view, Fig. 15. This foot is formed with a slot 85 so located as to straddle the lower flattened and widened portion of the spring guide 52 as the foot rises and falls over the latter. On the under side of the foot and registering with the longitudinal edges of the slot 85 are a pair of ribs 86, which ribs engage the top of the spring and compress the latter on the descent of the slide 83. When the slide is at the limit of its downward movement, the spring is flattened between the ribs 86 on its upper end and the rib 56 on its lower end, as indicated in Fig. 17, in which position it is momentarily held for engagement by a hollow box-like container on the end of the swinging inserter arm hereinafter described. The sleeve 83 is positively actuated in both up and down directions. Articulated to the lower end of the sleeve by a pivot pin 87 and a split coupling 88 that is held closed by a spring 89 (Fig. 19) is a depending pull rod 90 that, as shown in Fig. 105, is pivoted at its lower end to a lever 91 fulcrumed at 92 on a sub-frame member of the machine. Articulated at 93 to the upper end of the sleeve 83 is a cord or chain 94 that passes over a pulley 95 journaled in a bracket 96 mounted on the upper end of the post 41. The lower end of said cord or chain 94 is articulated to the swinging end of a lever 97 that is a companion to the lever 91, being pivoted on the same fulcrum pin 92. Keyed on the shaft 79 are a pair of duplex cams 98 and 99, the cam protuberances of which are disposed ninety degrees apart. Cam 98 engages a cam roller 100 on the lever arm 91, and cam 99 engages a similar roller 101 on the lever arm 97. The combined actions of the two cams manifestly exerts a see-saw action on the connections to the sleeve 83 effecting alternate positive up and down pulls on the latter.

*Spring inserter mechanism*

Practically simultaneously with the completion of the compression and flattening of the spring by the mechanism last described, the flattened spring is engaged and held in flattened condition by the inserter mechanism, which, simultaneously with the rising movement of the compressor foot 84, carries the spring edgewise between the plies of the fabric. This mechanism is shown in general plan view in Figs. 1a and 3, and more in detail in Figs. 4, 6, 9 and 10, 11 to 14 inclusive, 107 and 108, and 109 and 110. Referring first to Figs. 6 and 107, on the base-plate 1 is mounted a post 102 supported laterally in a bearing 103 and, above said bearings, constituting a journal for a vertical sleeve 104. Fast on the upper end of said sleeve is the hub 105 of an arm 106 (Fig. 9). Attached to the free end of said arm and projecting laterally of the latter is a flat substantially rectangular sheet-metal box 107. The front of said box is open and preferably the narrow side walls thereof flare outwardly; and, as most clearly shown in the sectional views Figs. 12, 13 and 14, the top and bottom walls of the box 107 are formed with longitudinal slots 108 and 109 that are slightly wider than the spring-engaging ribs on the upper side of the anvil and lower side of the compressor foot, and permit the box to slide over and envelop the spring while the latter is held between said ribs, as indicated in Fig. 12. On the lower side of the arm 106 is a transverse groove 110 (Fig. 14) in line with the slot 109 of the box, whereby not only the box but the arm can slide over the rib 56 of the anvil. The parts are so timed that, as the spring is fully compressed between the presser foot and the anvil, the box 107 enters between said parts and envelops the spring. The arm continues its movement forwardly, the presser foot rising in time to permit the upper side of the arm to clear the same, and the box containing the flattened spring swings thence beneath the spreader 40 and between the upper and lower plies of the fabric, as illustrated in Fig. 11, coming to rest in the full line position shown in Fig. 11. Preferably, and as herein shown, the box is equipped with a pair of pins or studs 111 extending between its top and bottom walls which abut against the rear edge of the spring and act to center the latter within the box. As shown in the plan views, Figs. 3 and 11, the spring inserter carries the spring a slight distance beyond the spreader 40, and at that point one of the compression plates 25 descends onto the fabric directly over the box 107, in position to hold the spring compressed as soon as the inserter has been withdrawn. The upper plate of the box 107 is preferably equipped with an arcuate tail-piece 112, clearly shown in Fig. 9, of sufficient length to slidingly engage the lower end of the guide 52 during the entire swing of the inserter arm 106, and thus prevent any danger of the inserter arm striking the lower end of the guide 52 during its return movement. The actuating mechanism of the spring inserter is shown in Figs. 6, 107 and 108, and comprises a sprocket wheel 113 fast on the sleeve 104, around which sprocket wheel is trained a sprocket chain 114, shown in plan view in Fig. 1a, the ends of which chain are adjustably connected to the upper ends of a pair of vertically disposed levers 115 and 116 pivoted at 117 on a bracket 118 on the base plate 1. These levers have mounted thereon cam rollers 119 and 120 respectively that co-operate with a pair of duplex cams 121, 122 fast on the cam shaft 79. Twice during each complete rotation of the cams 121 and 122 the inserter arm is given a complete forward and backward oscillating movement, the pull of the cams on the chain 114 being positive in both directions, with a sufficent dwell, indicated by the circular portions of the cam discs between successive forward strokes of the inserter arm to permit a new spring to be delivered and flattened in conditon for engagement by the inserter.

The spring detainer

To permit the withdrawal of the spring inserter without taking the spring back with it, I provide a device which I term the spring detainer to hold the spring in the place at which it has been delivered. This device is shown in top plan view in Figs. 3 and 9 and in side elevation from opposite sides in Figs. 5 and 6, and additional details of the same with its actuating mechanism appear in Figs. 4, 20 and 109. Referring to Fig. 109, 123 designates a horizontal platform supported by a series of vertical sub-frame members and itself supporting the coiler A, as shown in Fig. 5. Vertically pivoted in this platform is a short stud 124, in the upper end of which is mounted, on a horizontal pivot 125, the inner or rear end of a forwardly extending lever arm 126. The forward end of said arm overhangs the path of travel of the fabric and the spring clamps, and is equipped, as best shown in Fig. 20, with a depending pointed pin or spur 127. This pin or spur, as the arm descends, passes through the hole 34 in the upper clamp plate 25, and through the upper ply of the fabric and within the spring contained within the inserter box 107. The extreme forward end portion 126' (Fig. 9) of the arm 126 is, at the instant the pin 127 passes into spring-engaging position, engaged by the upstanding lug 35 on the traveling clamp plate 25, so that, for the short period of time that the pin holds the spring back during the withdrawal movement of the inserter box, the arm 126 is swung sidewise slightly on its vertical pivot 124, against the pull of a return spring 128 (Fig. 6); the return movement of the arm being limited by its abutment against a stop screw 129 mounted in a bracket 130 carried by the platform 123. To actuate the detainer arm 126 in properly timed up and down movements, a duplex box cam 131 is formed in one side of the cam disc 122 (Fig. 109), the box cam 131 being engaged by a roller 132 journaled on a stud 133 mounted in a lever 134. This lever is fulcrumed at one end on a horizontal pivot 135 and at its other end carries an adjustable eye-bolt 136 that is connected by a link rod 137 to a similar eye-bolt 138 mounted in the detainer arm 126. Twice during each complete revolution of the cam disc 131 the detainer arm 126 is given a quick oscillating movement between the full and dotted line positions shown in Fig. 109; the downward movement occurring simultaneously with the completion of the spring inserter movement, and the return or up movement occurring just after the inserter box has cleared the spring on its backward movement, at which instant also the upper clamp plate 25 descends into full clamping engagement with the inserted spring. From this point on the spring is held by the clamp plates 25, 22 during the pocket-stitching operations.

The longitudinal seam stitcher

Slightly beyond the spring detainer last described, relatively to the direction of travel of the fabric, is a mechanism identified generally by G, which serves to stitch together the free marginal portions of the two-ply fabric while the inserted springs are held in position between the clamp plates. This longitudinal stitcher comprises simply a stationary sewing machine designated as an entirety by 139 (Figs. 1a, 2a, 34 and 35) that is mounted upon the upper end of the bracket 42. This sewing machine is driven by a belt 140 from a pulley 141 fast on an overhead pulley shaft 142, the supports and drive of which pulley shaft will be hereinafter more particularly described in connection with the operating mechanism of the transverse gang stitcher. The sewing machine 139 simply stitches a continuous longitudinal pocket-closing seam in advance of the machine which form the transverse stitches defining and separating the spring pockets. The relative position of this longitudinal seam is indicated by a dash line in Fig. 63.

The transverse seam stitcher

Beyond the longitudinal seam stitcher G last described is located the mechanism which defines the spring pockets by sewing parallel transverse seams between adjacent springs and the adjacent edges of the clamp plates which confine said springs flatwise between the plies of the fabric. As herein shown, this mechanism comprises a gang sewing machine including a pair of stitchers mounted to move in unison through actuating mechanism by which the stitchers are first given a combined movement with and crosswise of the traveling fabric, then a quick transverse return movement, followed by a quick longitudinal return movement in a direction opposed to the direction of travel of the fabric so as to reengage with fresh portions of the latter. Referring to Figs. 34, 35, 38, 39 and 40, on the base-plate 1 are mounted a pair of vertical frame members 143 supporting a horizontal table 144. To the front of the uprights 143 is attached a forwardly projecting bracket 145 on which is a horizontal shelf 146 supporting a hardened steel plate 147. Supported on the table 144 is a plate 148 constituting a longitudinal slide formed on its under side with a tongue 149 engaged with a longitudinal groove 150 in the table 144 and with gibs 151 engaged with longitudinal guides 152 on the front and rear longitudinal edges of the table 144, whereby the plate 148 is guided in its sliding movements lengthwise of the table 144. Mounted on the plate 148 to slide crosswise of the latter is an upper plate 153 constituting a cross slide similarly formed on its under side with a central tongue 154 engaged with a central groove 155 in the plate 148 and on its sides provided with gibs 156 engaged with grooves 157 in the side edges of the plate 148. The cross slide 153 carries the base plates 153' (Fig. 41) of a pair of sewing machines each designated as an entirety by 158 arranged side by side in parallel relation; each machine comprising a sewing machine head 159 equipped with the usual needle and presser foot, and a work support 160 underlying the needle and presser foot. On the front edge of the table 144 are forwardly projecting bracket arms 161 on which are mounted a pair of uprights 162 constituting end supports for the horizontal plate 51 hereinbefore referred to. The plates 51 and 147 constitute fixed guides for a cross-head 163 this latter being formed with an integral rearwardly extending arm 164 that is secured to the stitcher cross slide 153 by a screw 165.

Describing next the mechanism for reciprocating the slide 148 lengthwise of the table 144, and referring more particularly to Figs. 36, 37, 39 and 40, in the ends of the slide 148 are secured chains 166 and 167 each of which is guided over a pair of upper and lower pulleys 168, 169 journaled in brackets 170 attached to the ends of the table 144. The lower end of chain 166 is, as shown in Fig. 36, adjustably attached to the free end of a lever 170' that is pivoted at 171 to a bracket 172 on the base-plate 1 and is equipped with a cam follower 173 engaged with the periphery of a cam 174 fast on a cam shaft 79'. It may here be mentioned that the cam shaft 79' constitutes in effect an extension of the cam shaft 79; the two shafts being coupled together by the adjustable coupling shown in Figs. 32 and 33, Sheet 1. As shown in the said figures, the meeting ends of the shaft 79 and 79' are equipped with coupling discs 175, 176 respectively, one of said discs being formed with slots 177 and the other with holes 178, through which slots and holes are passed clamping bolts 179. The purpose of making the cam shaft in two sections angularly adjustable relatively to each other is to facilitate accurate timing of the cams on the shaft section 79 which operate the spring transfer, compression and inserting mechanisms and the cams on the shaft section 79' which operate the slides of the transverse stitching mechanism.

The lower end of chain 167 is, as shown in Fig. 37, adjustably attached to the free end of a lever 180 that is pivoted at 181 to a bracket 182 on the base plate 1 and is equipped with a cam follower 183 engaged with the periphery of a cam 184 fast on the cam shaft 79'. As best shown in the diagrammatic view, Fig. 111, the cams 174 and 184 are symmetrical, and so positioned on the shaft 79' that the active and passive portions of the respective cams will operate simultaneously to maintain a taut condition of the chains 166, 167 and effect positive movements of the slide in both directions without any slack or overthrow. The cam 184 effects the movement of the slide with and at the same speed as the fabric strip, while the cam 174 functions to return the slide at the same speed in the reverse direction.

Describing next the mechanism for effecting the transverse reciprocations of the sewing machines, during the forward movement of which the transverse stitching is effected, and referring mainly to Figs. 38 and 40, keyed on the shaft 79' substantially midway between the cams 174 and 184 are a pair of reversely disposed symmetrical cams 185, 186. Horizontally journaled on a pivot shaft 187 in the base plate 1 and projecting upwardly through a slot in the latter is a block 188, to which are bolted the lower ends of a pair of reversely bent arms 189, 190. These arms embrace the shaft 79' midway between the cams 185, 186 and at their upper ends are bolted to a block 191. To the block 191 is coupled, by a universal joint 192, the rear end of a connecting rod 193, the forward end of which connecting rod is similarly coupled by a universal joint 194 to the cross-head 163. The two arms 189 and 190 bolted together at their upper and lower ends together constitute a yoke, on which are mounted cam followers co-operating with the cams 185, 186. Journaled on and projecting laterally of the arm 190 is a cam follower 195 that rides over the periphery of the cam 185; and similarly mounted on and projecting laterally of the arm 189 is a cam follower 196 that rides over the periphery of the cam 186. As in the case of the cams 174, 184, the active and passive cam portions of the respective cam discs co-operate simultaneously to effect positive forward and rearward reciprocations of the connecting rod 193 without any slack or overthrow. Fig. 112 is a diagrammatic view of the cross slide actuating cams last described, showing in full and dotted lines the rear and forward positions of the cross slide and the corresponding positions of the cams, the yoke, and the connecting rod.

The sewing machines are driven by belts from overhead shafts and pulleys. During the actual stitching the machines are driven at high speed (approximately 2,000 R. P. M.). When each transverse seam is completed, the operation of the machine is arrested; but since it is impractical to suddenly arrest such a high speed movement, I provide means whereby the high speed movement is first changed to a much slower speed (about one-tenth), and this slow speed movement is then arrested by a positive stop during the return travel of the machines to a fresh unstitched portion of the fabric. Referring to Figs. 2, 2a and 78, the shaft 142 is the high speed overhead pulley shaft. This shaft is supported by brackets 197 mounted on the vertical members of an upright frame structure 198, the shaft turning in bearings 199 which, as shown in Fig. 79, Sheet 3, are supported with capacity of tilting by pivot screws 200 mounted in the forked ends of the brackets 197; this being to permit the bearings 199 to accommodate themselves to the transverse vibrating movement of the shaft 142 under the pull of the belts. On the shaft 142 is a wide pulley 201, preferably coupled to the shaft through the agency of collars 202 (Figs. 80 and 81, Sheet 3) keyed to the shaft by set screws 203 and formed with transverse keys or splines 204 locking with corresponding transverse grooves in the hubs of the pulley spiders. This construction readily permits endwise adjustment of the pulley on the shaft. From the pulley 201 a pair of depending belts 205 extend to the high speed driving pulleys 206 of the sewing machines. The shaft 142 is driven by a pulley 207 thereon from a belt 208 trained over an oblique guide pulley 209 and driven by a pulley 210 (Fig. 1a) that is coupled to the pulley 5. A countershaft 211, below and parallel with the shaft 142, is journaled at its ends in pivoted bearings 212 mounted on brackets 213 similar to the bearings and brackets of the shaft 142. A pinion 214 on the shaft 142 meshing with a gear 215 fast on the countershaft 211 drives the latter in a reverse direction at a greatly reduced speed. A wide pulley 216 is mounted on the countershaft 211, and through a pair of crossed belts 217 drives the low speed driving pulleys 218 of the sewing machines. By reference to Fig. 41 Sheet 22 it will be observed that the two pairs of sewing machine drive pulleys 206 and 218 are loosely journaled by anti-friction bearings 219 on short drive shafts 220 that are journaled at one end in anti-friction bearings 221 mounted in upright frame pieces 222 on the cross-slide 153', and at their other ends are coupled to the sewing machine drive shafts 223. The high speed and low speed pulleys 206 and 218 are alternately drivingly connected to the shaft 220 through a sliding clutch sleeve 224 splined on the shaft 220, and co-operating friction clutch mechanism within the pulleys, the details of which are illustrated in Fig. 41 and Figs. 47 to 51 inclusive, but which, since they form no part of the present invention and constitute a known form of clutch, need not herein be further described. The clutch sleeve 224 is shifted by means of an inner ring 225 encircling the sleeve 224 and fitted to an annular recess in the latter, an outer ring 226 encircling and connected to the inner ring by an anti-friction bearing 227, a pair of lateral arms 228 (Fig. 47) on the ring 226, and a clutch shifter yoke 229 fulcrumed at its lower end on a pivot pin 230 in the cross-slide 153' and with its arms pivotally connected at 231 to the ends of the arms 228. As shown in Fig. 47, one of the arms of the yoke is extended above the pivot 231, as shown at 229' and is apertured for the passage therethrough of a shaft 232, the structural details of which are shown in enlarged form in Fig. 54 Sheet 26. The shaft 232 is preferably made in several sections connected by threaded couplings 233 so as to make the shaft adjustable lengthwise, and near one end said shaft is slidably supported in a fixed bearing 234 carried by a standard 235 (Fig. 53) mounted on the cross-slide. Where the shaft 232 extends through the yoke arms 229' it is pivotally pinned to the latter by cross-pins 236, said pins also extending through sleeves 237 encircling the shaft 232 within the holes in the yoke arms, said holes being sufficiently larger in diameter than said sleeves to accommodate the slight oscillating movement of the arms to the endwise reciprocating movement of the rod. The thrust of the rod 232 on the clutch shifter arms 229' is cushioned in both directions by coil springs 238 confined between abutment members 239. When the rod 232 is shifted to the left viewing Figs. 53 and 54 the slow speed pulleys 218 are clutched to the sewing machine shafts; and when the said shaft 232 is shifted in the reverse direction, the high speed pulleys 206 are clutched to the sewing machine shafts.

Cam-actuated strikers are employed to effect the positive shifting movements of the shaft 232. Referring to Fig. 53, to one end of the shaft 232 is pivotally coupled a connecting rod 240, the opposite end of said connecting rod being pivoted to the lower arm 241 of a vertically disposed bell crank lever, the upper arm 242 of which is formed with a rearwardly projecting tail-piece 242' that projects into the path of a striker hereinafter described. The elbow lever is pivoted at 243 on a post 244 mounted on the cross-slide.

Describing now the cam-actuated mechanism for effecting the slow speed throw of the rod 232, and referring to Figs. 53, 55, 56 and 57, in the bracket 170 is secured a horizontal stub shaft 245, on a projecting end of which is journaled the hub 246 of an upwardly extending arm 247. In the upper end of this arm is secured an adjustable striker 248. The striker arm 247 is normally drawn rearwardly by a pull spring 249 (Fig. 34) against a stop screw 250 mounted in a bracket arm 251 attached to and extending above the bracket 170. The striker arm 247 constitutes the long arm of a bell crank lever, the other or shorter arm 252 of which carries a cam follower 253. Referring to Figs. 37 and 115, keyed on the cam shaft 79' is a disc 254, on the periphery of which is a cam 255 that lifts the cam follower 253 once at each revolution of the disc, swinging the lever arm 247 inwardly and, through the striker 248, throwing the clutch shifting rod 232 to the left, viewing Fig. 53, and clutching the low speed pulleys 218 to the sewing machines. This action occurs substantially simultaneously with the completion of the transverse seam. Fast on the shaft 79' is another cam disc 256 (see Figs. 53, and 113 and 114 Sheet 45), on the inner face of which adjacent to its periphery is a cam 257 which, once at each revolution of the disc, engages with a cam follower 258 on the lower end of a lever 259 that is fulcrumed on a pivot pin 260 mounted in a bracket 261 attached to one of the sub-frame members. The upper end of the lever 259 carries an adjustable striker 262 that, when the sewing machines have returned to starting position, strikes the tail-piece 242' of the actuating lever of the clutch-lifting rod 232, and moves said rod to the right, viewing Fig. 53, thereby disconnecting the low speed pulleys 218 and connecting the high speed pulleys 206. A pull spring 263 connected to the lower arm of the lever 259 and anchored at its other end to a bracket 264 holds the cam follower 258 against the inner face of the cam disc 256 in position to be acted upon by the cam 257.

Immediately following the throwing in of the low speed as above described, the sewing movement of each sewing machine is momentarily arrested (the low speed friction clutch slipping to permit the same), and the machines are held idle until they have returned to starting position. Referring to Figs. 42 to 46 on Sheet 23, on each sewing machine drive shaft 220, just outside the pulley bearing 219, is formed a radial stop shoulder 265. Pivoted on a shaft 266 mounted in lugs on the cross-slide is a plunger cylinder 267 formed with a relatively long stem 268, in which latter is formed a rectangular groove or channel 269. Within the cylinder 267 is a plunger 270, encircling which is a compression spring 271 footed at its lower end against a wear sleeve 266' encircling the pivot shaft 266 and at its upper end abutting against an integral head 272 on the plunger 270 that slidingly engages the internal wall of the cylinder. The plunger is formed with a rectangular stem 273 that fits the channel 269 in the cylinder stem and is secured therein by a cover plate 274. The plunger stem 273 projects beyond the upper end of the cylinder stem 268 and lies crosswise of the shaft 220 in the transverse plane of the stop shoulder 265. The plunger stem or stop rod 273 is drawn down to engaging position relatively to the stop shoulder 265 by a pull spring 275. It is normally held out of engagement with the stop shoulder 265 by a square rod 276, which rod, as best shown in Fig. 53, lies in rear of the sewing machines and is slidingly supported in bearing sleeves 277 mounted on brackets 278 secured to the cross-slide 153. Reverting to Figs. 43 and 45, in the side of the rod 276 that lies adjacent to the stop rod 273 is formed a cam recess or notch 279. While the sewing machines are operating on the fabric strip, the slide rod 276 is in a position wherein the cam notch 279 lies to the right of the stop rod, viewing Fig. 53, and the stop rod 273 is held thereby in idle position indicated by dotted lines in Fig. 42. When the rod 276 is moved to the left, viewing Fig. 53, the cam notch 279 is brought into register with the stop bar, and the spring 275 instantly pulls the latter down to a position wherein its end is engaged by the stop shoulder 265 of the sewing machine shaft, thereby arresting the latter under a cushioned impact afforded by the spring 271.

Describing the actuating mechanism of the rod 276, and referring to Figs. 55, 56 and 57, Sheet 26 and also Figs. 115, 116, Sheet 46, on a reduced portion 246' of the hub 246 of the low speed striker arm 247 is journaled the hub 280 of a vertically disposed elbow lever comprising an upwardly extending arm 281 and a short outwardly extending arm 282. On the arm 281 is a lateral branch 283 (Fig. 56) in the end of which is mounted an adjustable striker 284 that is in a position to hit the end of the rod 276 just after the low speed has been thrown in and the machines have started on their return movement across the fabric. The lever arm 281 is rocked to accomplish this by a cam 285 on the inner side of the cam disc 254 slightly in rear of the low speed throw-in cam 255, engaging with a cam follower 286 on the short arm 282 of the lever. The follower is held in position to be engaged by the cam through a pull spring 287 connected to and normally drawing the lever arm 281 rearwardly against an adjustable stop 287'.

The sewing machine stop having been automatically thrown in by the mechanism last described, the machines are idle until they have returned to starting position, at which point the opposite end of the rod 276 strikes a stationary adjustable stop 288 (Fig. 53) mounted in a bracket arm 289 attached to and extending upwardly from the table 144. This shifts the rod 276 to the right, viewing Fig. 53, and causes the stop bar to ride out of the cam notch 279 to idle or inoperative position. This retraction of the stop bar occurs slightly in advance of the throwing in of the high speed sewing machine drive.

Upon the completion of each transverse seam, the presser foot of the machine is automatically raised to clear the fabric on the return travel. Referring to Figs. 69 Sheet 30, and 71 and 73 Sheet 31, 290 designates the presser foot mounted on the lower end of the presser foot lifting bar 291. Attached to the latter is a laterally projecting arm 292 lying in a transverse slot 293 in the rear side of the machine head 159. Straddling the machine arm 158 and attached thereto by a screw 294 is an inverted U-shaped yoke 295, in and between the depending arms of which is mounted a horizontal pivot shaft 296. Pivoted centrally on said shaft, and held against sidewise movement by spacing sleeves 297, is a lever, the forwardly projecting arm 298 of which at its front end underlies the lifting arm 292. The rear arm 299 of said lever extends through a transverse slot 300 in the machine frame, and is formed with a widened tail-piece 301 that has a beveled cam edge 302 (Fig. 70). Referring to Fig. 53 Sheet 25, mounted at one end on the post 244 and at its other end on a post 303 is a horizontal channel bar 304, forming a slideway for a flat bar 305, the latter being confined in the channel by cross strips 306 overlying the open side of the channel. The channel bar 304 is formed with a transverse slot 307 through which the lever tail-piece 301 extends. In the lower edge of the slide bar 305 is formed a notch 308 through which the tail-piece of the presser foot lever also extends, said notch preferably having an inclined cam side 309 corresponding to and co-operating with the beveled cam side 302 of the lever tail-piece. Manifestly, an endwise movement of the slide bar 305 to the left viewing Figs. 53 and 70, will depress the tail-piece of the lever into the lower portion of the slot 307 below the lower edge of the slide bar 305, thereby elevating the presser foot; and the lower edge of the slide bar will hold the presser foot raised until the slide bar is returned to a position in which the notch 308 registers with the notch 307, whereupon the lever is returned to normal working position shown in full lines in Fig. 69 by the usual spring (not shown) in the machine head which holds the presser foot down upon the work. The slide bar 305 is actuated in a direction to raise the presser foot by an adjustable striker 310 mounted in the upper end of the elbow lever arm 281 which, as said arm is rocked by its cam, strikes the right hand end (Fig. 53) of the slide bar and shifts the latter to the left. As the machines return to starting position, the left hand end of the slide bar 305 strikes a stationary adjustable stop 311 mounted in the bracket arm 289. This shifts the bar 305 to the right, viewing Fig. 53, and permits the presser foot to descend. The cams are so timed that this lowering of the presser foot occurs slightly after the sewing machine stop has been thrown out and just before the high speed is thrown in.

The sewing machine stop is thrown in at an instant when the needle bar and needle, as well as the presser foot, are in elevated position, as appears in Fig. 118, Sheet 47, and the looper L is engaged with the last loop of the chain just beyond the edge of the fabric. The quick return of the stitcher to its rear position moves the looper and the needle bar and needle backwardly together. This has a tendency, as soon as a slack portion of the thread hereinafter referred to has been taken up, to tighten the loop marked $b$ about the section of the thread shown at $a$, and as soon as this has occurred the thread breaks at or about the point where it makes its sharpest bend, somewhere between the points marked $a$ and $c$; the several thread tensions serving to prevent the thread from being drawn off the spool, and the auxiliary tension 313 serving to prevent the trailing end of the thread beyond the needle eye from flying back through the latter. In order to insure an ample trailing portion of thread to start the next seam, I preferably equip the machines with an automatic thread take-up mechanism, which gathers a loop of thread from the spools as slack, so that the breaking pull on the thread does not occur until the amount of the slack has been drawn through the eye of the needle.

This take-up mechanism is shown in detail in Figs. 71 and 72, and comprises a pair of horizontal U-shaped frames 315 mounted by their lower limbs on the machine arms 158, being conveniently attached to the latter by the screws 294. The vertical limb of each frame 315 is apertured for the passage of a narrow bar 316 which extends through both of said frames. In said bar is formed a transverse hole 317 for the passage of the thread going to each machine. Mounted in and extending between the upper and lower horizontal limbs of the frame 315 are parallel rods 319 between which the bar 316 passes. A coil compression spring 320 encircles the bar 316 abutting at one end against the vertical limb of one of the frame members 315 and at its other end against a stop collar 321 on the bar; the function of this spring being to return the bar 316 to the left, viewing Fig. 71, after it has been moved to the right in order to form the thread loop. A cross-pin 322 in the end portion of the bar 316 through contact with the rods 319 limits the return movement of the bar. Substantially simultaneously with the throwing in of the machine stop and the raising of the presser foot, the loop former bar 316 is shifted to the right to draw a loop from the overhead spool, as shown by dotted lines in Figs. 71 and 72, by means of a striker arm 323 that is attached to and extends above the lever arm 281 and is formed with a flattened upper end portion 323' (Fig. 37 Sheet 18) that strikes the outer end of the rod 316; the reaction of the spring 320 returning the rod to its original position upon the retreat of the striker arm.

*Cam shaft drive*

The cam shaft, consisting of the coupled sections 79, 79', is continuously driven from the main drive shaft 3 through the agency of a worm wheel 324 (Figs. 2a and 6) fast on the shaft section 79, a worm 325 on a horizontal transverse worm shaft 326, and a sprocket chain drive (Figs. 1a and 5) comprising sprocket wheels 327 and 328 on the main and worm shafts respectively and a sprocket chain 329.

*The beater*

The beater is a term applied to a mechanism located just beyond the delivery end of the fabric conveyor, which serves, through a bearing or stroking action on the opposite edges of the partly flattened spring in the pocket to turn the spring through a right angle from a position in which the axis of the spring is transverse to the pocket to a position wherein the axis of the spring is lengthwise of the pocket; the spring, when thus shifted, instantly expanding under its own elasticity and filling and expanding the pocket. This mechanism, designated as an entirety by I, appears in plan view in Fig. 1 and in front elevation in Fig. 2; while the details are best shown in Figs. 82 to 92 inclusive. Mounted on the end of the base plate 1 a slight distance beyond the delivery end of the fabric conveyor is an upright frame member 330, to the opposite edges of which are attached bearing brackets 331 in which are mounted on each side, an upper pair of fixed horizontal shafts 332, 332' and a lower pair of fixed shafts 333, 333'. On each of the upper pairs of shafts 332, 332' is journaled a pair of connected pulleys 334 (Fig. 88), and on each of the lower pairs of shafts 333, 333' are corresponding connected pulleys 335; one of the pulleys on the adjacent shafts 332' and 333' on one side respectively being formed as sprockets 334' and 335'. Trained around the upper group of pulleys 334 is an endless skeleton conveyor comprising front and rear sprocket chains 336 and 337 connected at uniform intervals by cross-rods 338; and around the lower group of pulleys 335 is trained a similar endless skeleton conveyor comprising front and rear sprocket chains 339, 340 and uniformly spaced connecting rods 341. The chains of the adjacent laps of the two conveyors pass through and are guided and maintained in close parallel relation by inner and outer channel strips 342 and 343 (Fig. 89) mounted and supported on bracket arms 344 attached to and projecting forwardly from the frame 330, the longer of said arms also supporting a horizontal plate 345 located slightly below the upper lap of the lower conveyor; said plate having a central transverse slot 346 (Fig. 85) affording clearance for the lower beater blade, as hereinafter described. The two conveyors are simultaneously driven in opposite directions by a sprocket chain 347 (Fig. 85) engaged with a sprocket wheel 348 (Fig. 88) fast on the hub or connecting sleeve of one pair of sprocket wheels 335, and intermeshing gears 349 and 350 fast on the hubs of the vertically alined sprockets 335 and 334.

Referring to Figs. 83, 84 and 85, attached to the frame 330 are upper and lower forwardly projecting bracket arms 351 and 352, the forward ends of which are formed as bearings 351', 352' for a pair of shafts 353. The inner end portion of each shafts 353 is flattened, as shown in Figs. 91 and 92, and to the same is secured, by a pair of screws 354, a relatively long narrow flat beater blade 355. This blade preferably comprises mating strips of sole leather or rawhide cemented together, with an interposed thin flat steel strip 356 to give increased stiffness throughout the intermediate portion of the blade. The ends of the blade are preferably tapered or beveled, as shown in Fig. 91. Fast on the upper and lower shafts 353 are pulleys 357 and 358 that are driven in the same direction by belts 259 and 360 from a double groove pulley 361 (Figs. 84 and 85) fast on a horizontal shaft 362 journaled in a bearing 363 that is supported on the free end of a bracket arm 364 attached to and projecting rearwardly from the frame 330. The shaft 362 at its opposite end is supported in a bearing 365 (Figs. 1 and 82) and carries a pulley 366 that is driven by a belt 367 (Fig. 2) from a pulley 368 fast on the overhead main pulley shaft 142. The two beater blades revolve in the same direction, as a consequence of which the lower half of the upper blade and the upper half of the lower blade travel crosswise of the beater frame and conveyor simultaneously in opposite directions, their tips passing each other when the two blades are in vertical alinement, as appears in Fig. 84. The distance between the tips of the blades at this point is somewhat less than the diameter of the coil spring. The portion of the fabric strip passing through the beater has, of course, passed beyond the zone of action of the spring clamps or compressors on the fabric conveyor, and the fabric is gripped at points substantially coincident with the transverse seams of the pockets between the rods 338 and 341 and advanced by the latter through the beater. Hence, the flattened springs are free to partially expand in and crosswise of the pockets, as shown in Figs. 93 and 94 Sheet 37. In this partially expanded condition they are struck on diagonally opposite sides and in opposite directions by the lower tip of the upper beater blade and the upper tip of the lower beater blade, and a few strokes of the rapidly revolving blades on each spring, acting through the fabric itself, suffices to turn the springs bodily through a right angle, so that when they emerge from the beater the springs are lying lenghwise of the pockets in substantially fully expanded condition. This action of the beater blades on the springs is graphically illustrated in Figs. 93 and 94; the position of the springs as they enter the beater being further shown in Figs. 99, 101 and 103 Sheet 38, and their changed position as they leave the beater being shown in Figs 100, 102 and 104.

Connecting the discharge end of the fabric conveyor and the receiving end of the beater is a supporting and guiding device herein shown as a shallow pan 369 (Figs. 59 and 58 Sheet 27), which is hinged at one end on a pintle 370 carried by an angle bracket 371 that is in turn attached to an angle bracket 372 which is itself attached to and supported by the standard 12. Attached to the beater frame opposite the discharge end of the beater is a similar pan or chute 373, over which the filled and completed fabric strip passes to the floor or into a suitable receptacle (not shown).

*Fabric conveyor and beater drive*

The rear sprocket 16 of the fabric strip conveyor, and the drive chain 347 of the beater conveyors or clamps are driven from the cam shaft 79′ by gearing shown in Figs. 1 and 82. Keyed on the cam shaft 79′ is a bevel gear 374 which meshes with and drives a bevel gear 375 on the lower end of a vertical shaft 376 that is journaled in a yoke frame 377 forming an extension of the standard 12. Fast on the shaft 376 is a bevel pinion 378 that meshes with and drives a bevel gear 379 fast on a horizontal shaft 380 journaled in bearings on the standard 12, to the front end of which shaft 380 the driving sprocket 16 of the conveyor chain is keyed. The extension of the upright 12 which carries the shaft 380 also forms a support for the bearing 365 of the beater blade drive shaft 362. Keyed on the shaft 380 is a sprocket wheel 381, which constitutes the drive sprocket for the chain 347.

*Operation*

The operations of the several co-operating mechanisms of the complete machine have been quite fully indicated in the descriptions of their structural features and mechanical organizations; and it only remains to briefly set forth the co-operative actions of the several mechanisms in producing the completed product of the entire machine.

In priming the machine, the wire from a reel is entered between the feed rolls of the coiler, and the outer end of the fabric strip on the reel 11 is drawn over the guide 37 and through the slot 38 thereof, and thence downwardly over the inclined tongue 39; the lower ply being caught on the pins of the lower clamp plates, and the upper ply being passed over the horizontal spreader plate 40. The machine is then started in operation, the fabric is advanced with its open edge past the spring inserter mechanism, and as fast as the springs are formed they are successively acted upon by the spring transfer arm, the spring compressor or flattener, and the spring inserter; the springs, as fast as they are inserted between the plies of the fabric, being gripped and held between the conveyor clamp plates. As the loaded fabric advances and the upper ply thereof passes off the spreader plate, the two plies are joined by the longitudinal stitcher, and as the fabric enters the field of action of the transverse stitchers, the latter complete the formation of the pockets by stitching the transverse seams. In the apparatus shown, the two sewing machines constituting the transverse stitcher are located the width of three pockets apart, and in Fig. 117 I have diagrammatically illustrated the operation of these machines in the formation of the transverse pocket seams. In said view, the positions of the successive seams are indicated by the transverse lines numbered 1, 2, 3, 4, etc. At its first transverse movement the machines, indicated in starting position in full lines, form seams numbers 1 and 4. At the second stroke the machines, indicated in starting position in dotted lines, form seams numbers 3 and 6. At the third stroke the machines, indicated in starting position in dot and dash lines, form seams 5 and 8. At the fourth stroke the machines will form seams 7 and 10. at the fifth stroke seams 9 and 12, and so on. It will thus be seen that all of the transverse seams except the second from the end are formed by the described operation; the end portion of the strip beyond the seam numbered 3 being the waste end which, however, may be utilized in subsequent joining of adjacent strips in the building up of the mattress or cushion body.

From the conveyor the loaded strip is advanced by the latter over the bridge 369 into the nip of the beater, in passing through which latter the springs are shifted to lie lengthwise of and expand and fill the pockets, as already described; and from the beater the completed strip slides over the discharge pan 373 to the floor or any suitable receptacle.

The movements of the several co-operating mechanisms are, of course, accurately timed so as to permit continuous and uninterrupted operation of the complete machine.

The foregoing description and illustration relate to a machine that has been built and successfully operated for several months, and has been demonstrated to represent a large economy of time and labor in the manufacture of these spring-loaded fabric strips employed in the manufacture of mattresses, cushions and the like; said strips having heretofore been to a considerable extent manufactured by hand operations. Manifestly, many of the mechanical details of the various mechanisms entering into the machine may be modified or varied without effecting their co-operative action, lessening their utility, or sacrificing any of the advantages flowing therefrom. Hence, the presentation of the invention in the drawings and foregoing description is to be understood as illustrative only of one practical embodiment of the invention and not as limiting the bounds thereof.

No claim is made or intended to be made herein to the coiling mechanism or to the turning or beater mechanism or to any combination of elements containing either of said mechanisms. Said mechanisms which involve a different class of invention and are in a separate art, form the basis of a divisional application which has resulted in United States Patent No. 1,733,660, issued October 29, 1929.

Similarly, other specific mechanisms herein disclosed and forming parts of the general combined machine, are not separately claimed herein, but form the basis for other divisional applications.

I claim:—

1. In the art of spring assembling, the combination of a support for a two-ply strip of fabric, mechanism for interposing a spring between the plies of said strip, and means for effecting relative movement of the strip and said interposing mechanism lengthwise of the strip.

2. In the art of spring assembling, the combination of a support for a two-ply strip of fabric, mechanism for feeding a series of springs and successively interposing same between the plies of said strip, and means for effecting progressive relative movement of the strip and said feeding and interposing mechanism lengthwise of the strip.

3. In the art of spring assembling, the combination of a support for a two-ply strip of fabric, mechanism for feeding a series of springs and successively interposing same in compressed condition between the plies of said strip, and means for effecting progressive relative movement of the strip and said feeding and interposing mechanism lengthwise of the strip.

4. In the art of spring assembling, the combination of a support for a two-ply strip of fabric, means for inserting springs between the plies of said strip, means for feeding springs to said inserter, and means for effecting progressive relative movement of the inserter and the strip lengthwise of the latter.

5. In the art of spring assembling, the combination of means for advancing a two-ply strip of fabric, means for feeding springs, and mechanism for interposing said springs between the plies of said strip in spaced relation.

6. In the art of spring assembling, the combination of means for continuously advancing a two-ply strip of fabric, means for feeding springs, and mechanism for successively interposing said springs between the plies of said fabric in spaced relation during the advancing movement of the fabric.

7. In a mechanism for inserting springs between the folds of a two-ply fabric strip, the combination of a spring inserter, a conveyor serving to carry the strip endwise past said inserter, and means for spreading the folds of the strip at the open edge of the latter at a point opposite said inserter.

8. In a mechanism for inserting springs between the folds of a two-ply fabric strip, the combination of a spring inserter, a conveyor serving to carry the strip endwise past said inserter, and a fixed plate located above the plane of the conveyor over which the upper fold of the strip is guided at a point opposite said inserter whereby to spread the folds of the strip for the insertion of the spring therebetween.

9. In a mechanism for inserting springs between the folds of a two-ply fabric strip, the combination of a delivery reel for said strip, a spring inserter, a conveyor operative to carry the strip endwise from said reel past said inserter, means for guiding said strip from said reel onto said conveyor, and means for spreading the folds of the strip at the open edge of the latter at a point opposite said inserter.

10. In a spring cushion assembling machine, the combination of means for supporting a two-ply fabric strip, means for inserting a coil spring between the plies of said strip, means for retaining the spring between said plies automatically actuated in synchronism with the inserting means, and means for effecting relative movement of the strip on said support and said inserting mechanism in a direction lengthwise of the strip.

11. In a spring cushion assembling machine, the combination with means for advancing a two-ply fabric strip, of means for inserting a flattened coil spring between the plies of said strip, and means for detaining the spring between said plies during the retracting movement of the inserting means.

12. In a spring cushion assembling machine, the combination with means for advancing a two-ply fabric strip, of means for inserting a flattened coil spring between the plies of said strip, means for holding the spring when delivered by said inserting means in flattened condition, and means for detaining the spring between said plies during the retracting movement of the inserting means.

13. In a spring cushion assembling machine, the combination with means for advancing a two-ply fabric strip, of means for inserting a flattened coil spring between the plies of said strip, a pin, and means for causing said pin to penetrate the fabric at a point within the spring whereby to detain said spring at the point of delivery of said inserting means during the retracting movement of the latter.

14. In a spring cushion assembling machine, the combination with means for advancing a two-ply fabric strip, of means for inserting a flattened coil spring between the plies of said strip, a lever pivoted to swing transversely of said strip, a depending pin mounted in the free end of said lever, and means for swinging said lever whereby to cause said pin to penetrate the fabric at a point within the spring and detain the latter during the retracting movement of said inserting means.

15. In a spring cushion assembling machine, the combination of a continuously traveling conveyor, including a series of upper and lower clamp plates adapted to grip and advance a two-ply fabric strip, said upper clamp plates formed with holes and upstanding lugs, a box adapted to contain a flattened coil spring and means for moving the same between the plies of the strip and upper and lower clamp plates, said box being formed with a slotted upper wall, a lever pivoted to swing both transversely and lengthwise of said strip, a depending pin mounted in the free end of said lever, and means for swinging said lever in a direction to cause said pin to pass through the hole in the upper clamp plate, the upper ply of the fabric, and the slot of said box at a point within the spring and detain the latter during the retracting movement of said box; said lever being engaged by said lug and thereby caused to move with said fabric during the spring detaining action of said pin.

16. The improvement in the art of manufacturing strips of connected flexible pockets containing individual springs which consists in first interposing the springs in spaced relation between the plies of a two-ply strip of flexible fabric and subsequently connecting together the plies between said springs.

17. The improvement in the art of manufacturing strips of connected flexible pockets containing individual springs which consists in first interposing the springs in spaced relation between the plies of a two-ply strip of flexible fabric and subsequently sewing together the plies between said springs to form seams extending transversely of the strip thereby to form independent pockets for the individual springs.

18. The improvement in the art of manufacturing strips of connected flexible pockets containing individual springs which consists in first interposing the springs in spaced relation between the plies of a two-ply strip of flexible fabric and subsequently sewing together the plies between said springs to form seams extending transversely of the strip thereby to form independent pockets for the individual springs and in maintaining said springs under compression during and to facilitate the sewing operation.

19. In the art of spring assembling, the combination of a support for a pair of superposed fabric sheets, means for inserting springs between said sheets, and means for effecting relative movement of the inserting mechanism and the pair of sheets.

20. In the art of spring assembling, the combination of a support for a pair of superposed fabric sheets, means for inserting springs between said sheets and means for effecting progressive relative movement of the inserting mechanism and the pair of sheets so as to locate said springs in spaced relation between said sheets.

21. In the art of spring assembling, the combination of a support for a pair of superposed sheets of flexible fabric, means for inserting springs between said sheets and means for moving said support progressively away from the inserting mechanism so as to locate said springs in spaced relation between said sheets.

22. In the art of spring assembling, the combination of a support for a pair of superposed fabric strips, means for inserting springs between said strips, and means for effecting progressive relative movement of said strips into and out of the zone of said inserting mechanism so as to locate said springs in spaced relation between said strips.

23. In the art of spring assembling, the combination of a conveyor for a pair of superposed fabric strips, means for inserting springs between said strips, and means for progressively actuating said conveyor so as to move said strips unidirectionally into and out of the zone of said inserting mechanism.

24. In the art of spring assembling, the combination of a conveyor for a pair of superposed fabric strips, means for inserting springs between said strips, and means for progressively actuating said conveyor so as to move said strips unidirectionally into and out of the zone of said inserting mechanism, said movement being synchronized with the inserting mechanism so as to locate said springs in spaced relation between said sheets.

25. In the art of spring assembling, the combination of a support for a pair of superposed fabric strips, means for introducing springs between spaced lateral margins of the superposed strips and into the space between said strips, and means for effecting relative movement of said strips and said inserting mechanism in a direction longitudinally of the strips so as to locate said springs in spaced relation between said strips.

26. In the art of spring assembling, the combination of a support for a pair of superposed fabric sheets, means for inserting axially compressed springs between said sheets, means for effecting relative movement of the inserting mechanism and the pair of sheets, and means for maintaining the springs in axially compressed condition after insertion thereof and during the subsequent movement of the pair of sheets.

27. In the art of spring assembling, the combination of a conveyor for a pair of superposed fabric strips, means for inserting axially compressed springs between said strips, means for progressively actuating said conveyor so as to move said strips unidirectionally into and out of the zone of said inserting mechanism, and means on the conveyor for temporarily maintaining the springs in axially compressed condition during their movement on said conveyor between said strips after their insertion.

28. In combination, mechanism for inserting axially compressed helical wire springs between the folds of a two-ply fabric strip, and a conveyor for effecting movement of said strip relative to said inserting mechanism.

29. In combination, mechanism for inserting axially compressed helical wire springs between the folds of a two-ply fabric strip, a conveyor for effecting movement of said strip relative to said inserting mechanism, and means for maintaining said springs in axially compressed condition during the movement of said conveyor after insertion.

30. In a machine for manufacturing spring cushion strips of the character described, the combination of mechanism for inserting axially compressed springs between the folds of a two-ply fabric strip, a conveyor for effecting movement of said two-ply strip past said inserting mechanism, and means on said conveyor for holding said springs in axially compressed condition between the folds of said strip.

31. In combination, means for inserting coil springs between the plies of a two-ply strip of fabric, means for effecting movement of said strip relatively to said first-named means, and means for sewing together said plies at the edge of the strip.

32. In combination, means for successively inserting coiled wire springs between the plies of a two-ply strip of fabric, means for effecting continuous movement of said strip relatively to said first-named means, and means for sewing together said plies at the edge of said strip during said movement.

33. In combination, means for inserting coiled wire springs between the folds of a two-ply strip in spaced relation along said strip, means for sewing together the edges of said folds subsequent to the insertion of said springs, and means for maintaining said springs in compressed relation prior to the completion of the said sewing operation.

34. In combination, means for positioning a series of coiled wire springs in spaced relation between the folds of a two-ply strip of fabric, mechanism for effecting relative movement of said strip and said positioning means, and means for connecting the folds of said strip together subsequently to the operation of the positioning means to form spring containing pockets.

35. In a spring cushion assembling machine, the combination of means for moving endwise a two-ply fabric strip, means for inserting coil wire springs in spaced relation between the plies of said strip during said movement, and means for stitching said strip during said movement to form closed pockets wherein said springs are confined.

36. In a spring cushion assembling machine, the combination of means for moving endwise a folded fabric strip having an open edge, means for inserting coil springs in spaced relation through said open edge during the movement of said strip, and means for subsequently stitching said strip during the movement of the latter between said springs and along said open edge to form closed pockets wherein said springs are confined.

37. In a spring cushion assembling machine, the combination of means for moving endwise a two-ply fabric strip, means for inserting flattened coil springs in spaced relation between the plies of said strip during said movement, means for holding said springs in flattened condition, and means for stitching said strip during said movement to form closed pockets wherein said springs are confined.

38. In a spring cushion assembling machine, the combination of means for moving endwise a folded fabric strip having an open edge, means for inserting flattened coil springs edgewise in spaced relation through said open edge during the movement of said strip, means for holding said springs in flattened condition, and means for stitching said strip lengthwise and crosswise to form closed pockets wherein said springs are confined.

39. In combination, means for inserting coiled wire springs between the plies of a two-ply strip of fabric, means for effecting movement of said strip relatively to said first-named means, and means for sewing together said plies during said movement.

40. In combination, means for inserting coiled wire springs between the plies of a two-ply strip of fabric, means for effecting movement of said strip relatively to said first-named means, and means for sewing together said plies during said movement and subsequent to the insertion of said springs.

41. In combination, means for inserting coiled wire springs between the plies of a two-ply strip of fabric, means for effecting movement of said strip relatively to said first-named means, means for sewing together said plies during said movement and subsequent to the insertion of said springs, and means for maintaining said springs under compression during the operation of the sewing mechanism.

42. In combination, means for positioning a series of coiled wire springs in spaced relation between the plies of a two-ply strip of fabric, mechanism for connecting together the plies of said strip subsequent to the operation of the positioning means, and a conveyor for effecting movement of the strip lengthwise of same successively past the positioning mechanism and the sewing mechanism.

43. In combination, means for positioning a series of coiled wire springs in spaced relation between the plies of a two-ply strip of fabric, mechanism for connecting together the plies of said strip subsequent to the operation of the positioning means, and a conveyor for effecting movement of the strip lengthwise of same successively past the positioning mechanism and the sewing mechanism, the arrangement including means for maintaining the springs under compression during the travel of said strip through the field of the sewing mechanism.

44. In a spring cushion assembling machine, the combination of a conveyor operating to support and advance a two-ply fabric strip having an open edge, means for inserting coil springs successively through said open edge between the plies of the strip, and means for stitching together the plies of the strip along the open edge of the latter.

45. In a spring cushion assembling machine, the combination of a continuously moving conveyor operating to support and advance a two-ply fabric strip having an open edge, mechanism for inserting coil springs successively through said open edge between the plies of the strip, and a stationary sewing machine located opposite said open edge and operating to stitch together the plies of the strip along the open edge of the latter.

46. In a spring cushion assembling machine, the combination of a continuously moving conveyor operating to support and advance a two-ply fabric strip having an open edge, means for inserting coil springs successively through said open edge at uniformly spaced points between the plies of the strip, means for stitching together the plies of the strip along the open edge of the latter, and means for cross-stitching the strip between adjacent springs whereby to form closed pockets for the latter.

47. In a spring cushion assembling machine, the combination of a continuously moving conveyor operating to support and advance a two-ply fabric strip having an open edge, means for inserting coil springs successively through said open edge at uniformly spaced points between the plies of the strip, and a sewing machine mounted to move with and simultaneously crosswise of said conveyor for cross-stitching the strip between adjacent springs.

48. In combination, means for positioning a series of springs in spaced relation between the folds of a two-ply strip of fabric, mechanism for effecting relative movement of said strip and said positioning means, and means for forming transverse seams connecting said plies between adjacent springs subsequently to the operation of the positioning means to form partitions between spring-containing pockets.

49. In a spring cushion assembling machine, the combination of means for moving endwise a two-ply fabric strip, means for inserting flattened coiled wire springs in spaced relation between the plies of said strip, means for holding said springs in flattened condition and means for subsequently stitching said strip together between the springs to form partitions of pockets for containing such springs.

50. In a spring cushion assembling machine, means for moving endwise a folded fabric strip having an open edge, means for inserting flattened coil springs edgewise in spaced relation through said open edge, means for holding said springs in flattened condition, and means for stitching said strip crosswise between said springs while the latter are held in said flattened condition, so as to form pocket partitions between said springs.

51. In combination, means for inserting coiled wire springs between the plies of a two-ply strip of fabric, means for effecting movement of said strip relatively to said first-named means, and means for sewing together the plies of said strip between said coiled wire springs subsequent to the operation of the inserting means so as to form partitions between said springs.

52. In combination, means for moving endwise a continuous two-ply fabric strip, a stitching machine, and means for repeatedly moving said stitching machine simultaneously both with and crosswise of said strip, so as to form spaced lines of stitching extending across the strip.

53. Synchronized apparatus for connecting a two-ply strip of fabric along a series of spaced lines each extending perpendicularly across the strip so as to form a series of pockets therein, comprising a sewing head, means for supporting the strip, said means being arranged to permit longitudinal movement of the strip relative to the sewing head, means for operating the sewing head, and means for effecting a plurality of movements of the sewing head relative to the strip and transversely thereof in a continuous sequence, there being provided means operative intermediate said relative movements for positioning the sewing head along said strip at definite spaced points corresponding to the desired lines of stitching.

54. Synchronized apparatus for connecting a two-ply strip of fabric along a series of parallel regularly spaced lines each extending perpendicularly across the strip so as to form a series of pockets therein, comprising a sewing head, means for supporting the strip, said means being arranged to permit successive uni-directional longitudinal movements of the strip relative to the sewing head, means for operating the sewing head, mechanism for shifting said strip and means for effecting a plurality of movements of the sewing head relative to the strip and transversely thereof in a continuous sequence, there being provided means operative intermediate said relative movements for positioning the sewing head along said strip at definite spaced points corresponding to the desired lines of stitching.

55. In combination, means for effecting lengthwise travel of a two-ply fabric strip, a sewing machine, and mechanism for effecting a forward sewing movement of said machine relatively to said strip crosswise of the latter, then an idle return movement crosswise of said strip, and then a movement lengthwise of said strip to starting position; all of said movements occurring during the travel of said strip.

56. In combination, means for effecting lengthwise travel of a two-ply fabric strip, a sewing machine, and mechanism for effecting a bodily sewing movement of said machine across said strip, then an idle bodily return movement across said strip, and then an idle bodily movement lengthwise of said strip to starting position; all of said movements occurring during the travel of said strip.

57. A mechanism for cross-stitching a two-ply fabric strip, comprising, in combination, means for moving the strip endwise, a stationary table, a longitudinal slide on said table, means for reciprocating said slide lengthwise of the strip, a cross-slide on said longitudinal slide, means for reciprocating said cross-slide simultaneously with the reciprocations of said longitudinal slide, and a sewing machine on said cross-slide.

58. A mechanism for cross-stitching a two-ply fabric strip, comprising, in combination, means for continuously moving the strip endwise at a constant speed, a stationary table, a longitudinal slide on said table, means for moving said slide lengthwise of the strip at the same speed as the latter, a cross-slide on said longitudinal slide, means for moving said cross-slide across the strip simultaneously with the movement of said longitudinal slide, and a sewing machine on said cross-slide.

59. A mechanism for cross-stitching a two-ply fabric strip, comprising, in combination, means for continuously moving the strip endwise at a constant speed, a stationary table, a longitudinal slide on said table, a pair of alternately acting cams and mechanism actuated thereby to positively reciprocate said slide lengthwise of the strip at the same speed as the latter, a cross-slide on said longitudinal slide, a pair of alternately acting cams and mechanism actuated thereby to reciprocate said cross-slide across the strip simultaneously with the reciprocations of said longitudinal slide, and a sewing machine on said cross-slide.

60. A mechanism for cross-stitching a two-ply fabric strip, comprising, in combination, means for continuously moving the strip endwise at a constant speed, a stationary table, a longitudinal slide on said table, a pair of alternately acting cams, pivoted levers swung by said cams, pull members connecting the free ends of said levers to the respective ends of said slide, a cross-slide on said longitudinal slide, mechanism for reciprocating said cross-slide across the strip simultaneously with the reciprocations of said longitudinal slide, and a sewing machine on said cross-slide.

61. A mechanism for cross-stitching a two-ply fabric strip, comprising, in combination, means for continuously moving the strip endwise at a constant speed, a stationary table, a longitudinal slide on said table, mechanism for reciprocating said slide lengthwise of the strip at the same speed as the latter, a cross-slide on said longitudinal slide, a pair of alternately acting cams, a pivoted yoke oscillated by said cams, a cross-head on said cross-slide, a connecting rod connected at its ends by universal joints to said yoke and cross-head, and a sewing machine on said cross-slide.

62. In combination, mechanism for effecting movement of a two-ply strip containing spaced wire springs between the plies thereof, and mechanism for forming transverse seams connecting said plies between adjacent springs during the movement of said strip.

63. In combination, mechanism for effecting movement of a two-ply strip containing spaced coiled wire springs between the plies thereof, mechanism for forming a longitudinal seam connecting adjacent edge portions of said plies, and mechanism for forming transverse seams connecting said plies between adjacent springs during the movement of the strip.

64. In combination, sewing mechanism for connecting together the plies of a strip containing a series of coiled wire springs, means for effecting travel of said strip relative to said sewing mechanism, and means for maintaining said springs under compression during the movement of said strip past the sewing mechanism, the arrangement including means permitting gradual expansion of said spring subsequent to the operation of the sewing mechanism.

65. Means for forming spaced transverse lines of stitching in a strip of fabric comprising, in combination, a support for the strip, a stitching mechanism and means for actuating the same, cross-feeding means for effecting a relative reciprocating movement between the stitching mechanism and the strip, means synchronized with the cross-feed for effecting a uni-directional movement of the strip through the field of the stitching mechanism, and means synchronized with the cross-feeding means for automatically starting the operation of the stitching mechanism at the beginning of a stroke of the cross-feeding movement and for stopping the same at the conclusion of such stroke, said mechanisms being so timed as to permit a relative longitudinal movement of the stitching mechanism and the strip for a distance of one of said spaces during the dwell in the operation of the stitching mechanism.

66. Means for forming a continuous series of equi-spaced parallel transverse lines of stitching in a strip of textile fabric which comprises in combination a conveyor for the strip, a sewing mechanism of the needle type, and means for actuating the same, cross-feeding means for reciprocating the stitching mechanism relative to the strip in a direction transverse to the strip, means synchronized with the cross-feed for effecting a uni-directional movement of the strip through and beyond the field of the sewing mechanism, and means synchronized with the cross-feeding means for automatically suspending the operation of the sewing mechanism intermediate working strokes of the sewing mechanism relative to the fabric, all of said mechanisms being so timed as to permit a relative longitudinal movement of the sewing mechanism and the strip for a distance equal to one of said spaces during the dwell in the operation of the sewing mechanism.

67. Means for forming a continuous series of equi-spaced parallel transverse lines of stitching in a strip of textile fabric which comprises in combination a conveyor for the strip, a sewing mechanism of the needle type, and means for actuating the same, cross-feeding means for reciprocating the stitching mechanism relative to the strip in a direction transverse to the strip, means synchronized with the cross-feed for effecting a uni-directional movement of the strip through and beyond the field of the sewing mechanism, and means synchronized with the cross-feeding means for automatically suspending the operation of the sewing mechanism intermediate working strokes of the sewing mechanism relative to the fabric, all of said mechanisms being so timed as to permit a relative longitudinal movement of the sewing mechanism and the strip for a distance equal to one of said spaces during the dwell in the operation of the sewing mechanism, in which the dwell occurs during alternate strokes so that the sewing operation takes place during the cross-feeding in one direction only.

68. Means for forming a continuous series of equi-spaced parallel transverse lines of stitching in a strip of textile fabric which comprises in combination a conveyor for the strip, a sewing mechanism of the needle type, and means for actuating the same, cross-feeding means for reciprocating the stitching mechanism relative to the strip in a direction transverse to the strip, means synchronized with the cross-feed for effecting a uni-directional movement of the strip through and beyond the field of the sewing mechanism, and means synchronized with the cross-feeding means for automatically suspending the operation of the sewing mechanism intermediate working strokes of the sewing mechanism relative to the fabric, all of said mechanisms being so timed as to permit a relative longitudinal movement of the sewing mechanism and the strip for a distance equal to one of said spaces during the dwell in the operation of the sewing mechanism, in which the dwell occurs during alternate strokes so that the sewing operation takes place during the cross-feeding in one direction only, and in which means are provided for arresting the movement of the needle when the same is in elevated position out of engagement with the fabric.

69. Means for forming a continuous series of equi-spaced parallel transverse lines of stitching in a strip of textile fabric which comprises in combination a conveyor for the strip, a sewing mechanism of the needle type, and means for actuating the same, cross-feeding means for reciprocating the stitching mechanism relative to the strip in a direction transverse to the strip, means synchronized with the cross-feed for effecting a unidirectional movement of the strip through and beyond the field of the sewing mechanism, and means synchronized with the cross-feeding means for automatically suspending the operation of the sewing mechanism intermediate working strokes of the sewing mechanism relative to the fabric, all of said mechanism being so timed as to permit a relative longitudinal movement of the sewing mechanism and the strip for a distance equal to one of said spaces during the dwell in the operation of the sewing mechanism, in which the dwell occurs during alternate strokes so that the sewing operation takes place during the cross-feeding in one direction only, and in which means are provided for arresting the movement of the needle when the same is in elevated position out of engagement with the fabric, where the sewing machine is also provided with a presser foot and where there are means for disengaging the presser foot from the work prior to the back or non-working stroke of the reciprocation so as to avoid interference with the fabric in the path of said back stroke.

70. In combination, mechanism for effecting movement of a two-ply strip containing spaced wire springs between the plies thereof, and mechanism for forming transverse seams connecting said plies between adjacent springs.

71. Synchronized apparatus for forming rows of stitches in a strip of fabric, each row extending across the strip, and the rows being spaced uniformly along the strip, which comprises a stitching head, means for supporting the strip arranged to permit longitudinal movement of the strip relative to the stitching head, means for actuating the stitching head, means for reciprocating the stitching head relatively to said strip and cross wise of the latter, control mechanism for rendering the stitching operative during its strokes across the strip in one direction and for rendering the same inoperative after the completion of said stroke, thereby to render the stitching mechanism idle during the return stroke, and mechanism for effecting successive equal movements of the stitching head relative to the strip in a direction longitudinally of the strip.

72. Synchronized apparatus for forming rows of stitches in a strip of fabric, each row extending perpendicularly across the strip, and the rows being spaced uniformly along the strip, which comprises a stitching head, means for supporting the strip arranged to permit longitudinal movement of the strip relative to the stitching head, means for actuating the stitching head, means for reciprocating the stitching head relatively to said strip and crosswise of the latter, control mechanism for operatively engaging the stitching head with the strip during its strokes across the strip in one direction and for disengaging the same after the completion of each operative stroke, thereby to render the stitching mechanism idle during the other alternate strokes, and mechanism for effecting successive equal movements of the stitching head relative to the strip in a direction longitudinally of the strip.

JOHN F. GAIL.